United States Patent
Kobayashi et al.

(10) Patent No.: US 10,120,984 B2
(45) Date of Patent: Nov. 6, 2018

(54) INFORMATION PROCESSING APPARATUS AND INFORMATION PROCESSING METHOD FOR DECODING, REPRODUCING AND PROVIDING ENCRYPTED CONTENT

(71) Applicant: Sony Corporation, Tokyo (JP)

(72) Inventors: Yoshiyuki Kobayashi, Tokyo (JP); Hiroshi Kuno, Kanagawa (JP); Takamichi Hayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 380 days.

(21) Appl. No.: 13/669,700

(22) Filed: Nov. 6, 2012

(65) Prior Publication Data
US 2013/0132719 A1   May 23, 2013

(30) Foreign Application Priority Data
Nov. 17, 2011 (JP) .................. 2011-251733

(51) Int. Cl.
*H04L 29/06* (2006.01)
*G06F 21/10* (2013.01)
*H04L 9/08* (2006.01)
*H04L 9/32* (2006.01)
*G11B 20/00* (2006.01)

(52) U.S. Cl.
CPC .......... *G06F 21/10* (2013.01); *G11B 20/0021* (2013.01); *G11B 20/00086* (2013.01); *G11B 20/00166* (2013.01); *G11B 20/00847* (2013.01); *G11B 20/00898* (2013.01); *H04L 9/0869* (2013.01); *H04L 9/3247* (2013.01); *H04L 9/3268* (2013.01); *H04L 63/0428* (2013.01); *H04L 63/06* (2013.01); *H04L 63/0823* (2013.01); *G06F 2221/0771* (2013.01); *G11B 20/0084* (2013.01)

(58) Field of Classification Search
CPC ... H04L 9/3236; H04L 9/3263; H04L 9/3268; H04L 9/3247; G06F 21/64
USPC .............. 713/155–159, 176–181; 726/26–31
See application file for complete search history.

(56) References Cited

U.S. PATENT DOCUMENTS 5,787,175 A * 7/1998 Carter ........................... 713/165
6,128,740 A * 10/2000 Curry ................. G06Q 20/3821
380/51

(Continued)

Primary Examiner — Christopher Revak
Assistant Examiner — Vadim Savenkov
(74) Attorney, Agent, or Firm — Chip Law Group

(57) ABSTRACT

An information processing apparatus includes a data processing unit which executes processing for decoding and reproducing encrypted content. The data processing unit executes processing for determining whether the content can be reproduced by applying an encrypted content signature file. The encrypted content signature file stores information on issue date of the encrypted content signature file and an encrypted content signature issuer certificate with a public key of an encrypted content signature issuer. In determining whether the content can be reproduced, the data processing unit compares expiration date of the encrypted content signature issuer certificate with the information on issue date of the encrypted content signature file, and does not perform processing for decoding and reproducing the encrypted content when the expiration date is before the issue date, and performs the processing for decoding and reproducing the encrypted content only when the expiration date is not before the issue date.

11 Claims, 35 Drawing Sheets

(56) References Cited

U.S. PATENT DOCUMENTS

| | | | |
|---|---|---|---|
| 6,456,716 B1* | 9/2002 | Arnold | H04L 9/321 380/241 |
| 6,584,565 B1* | 6/2003 | Zamek | H04L 63/04 713/156 |
| 6,801,999 B1* | 10/2004 | Venkatesan | G06F 21/10 380/28 |
| 7,047,404 B1* | 5/2006 | Doonan | G06F 21/64 380/30 |
| 7,325,145 B1* | 1/2008 | England | 713/187 |
| 7,874,015 B2* | 1/2011 | Aaron | 726/30 |
| 8,024,562 B2* | 9/2011 | Gentry | H04L 9/3236 713/158 |
| 8,477,379 B2* | 7/2013 | Viswanathan et al. | 358/3.28 |
| 8,688,588 B2* | 4/2014 | Holtzman | G06F 21/10 705/59 |
| 2002/0126841 A1* | 9/2002 | Arai | 380/46 |
| 2003/0084298 A1* | 5/2003 | Messerges et al. | 713/176 |
| 2004/0093493 A1* | 5/2004 | Bisbee et al. | 713/156 |
| 2005/0228998 A1* | 10/2005 | Chan | H04L 9/3268 713/175 |
| 2006/0200661 A1* | 9/2006 | Doonan | G06F 21/64 713/156 |
| 2006/0206712 A1* | 9/2006 | Dillaway | H04L 9/3247 713/176 |
| 2007/0016783 A1* | 1/2007 | Saito | H04L 9/3268 713/175 |
| 2007/0220259 A1* | 9/2007 | Pavlicic | G06Q 20/02 713/176 |
| 2008/0098239 A1* | 4/2008 | Wada et al. | 713/193 |
| 2008/0256326 A1* | 10/2008 | Patterson et al. | 711/206 |
| 2010/0287373 A1* | 11/2010 | Johnson et al. | 713/170 |
| 2013/0132718 A1* | 5/2013 | Agrawal | 713/158 |
| 2014/0032913 A1* | 1/2014 | Tenenboym | H04L 9/321 713/176 |

* cited by examiner

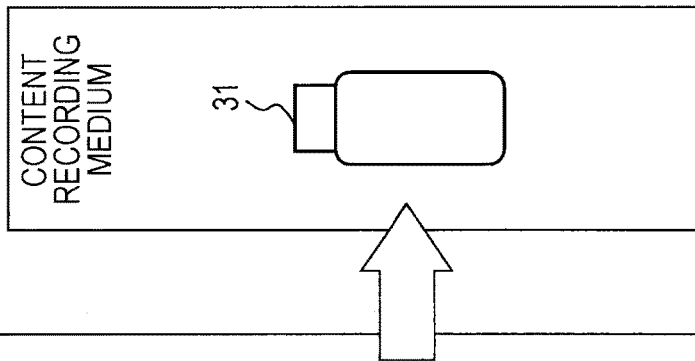
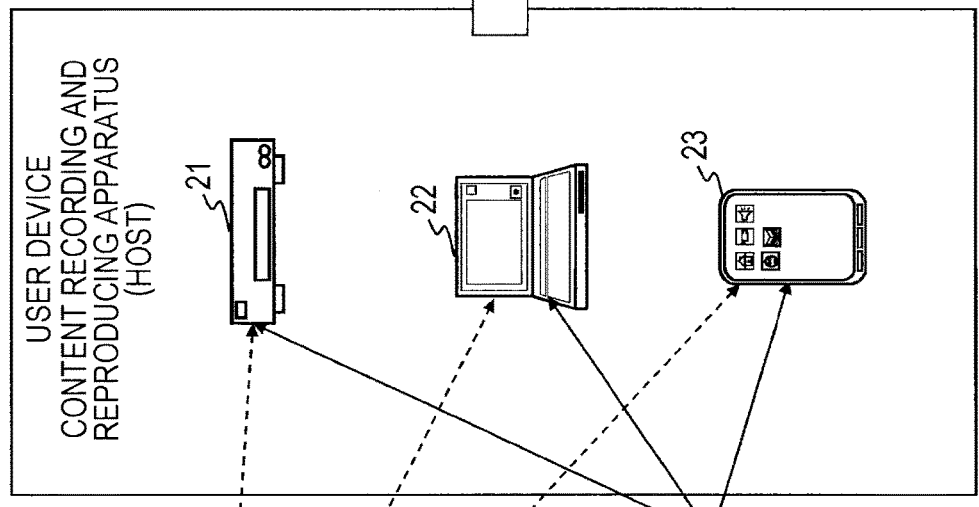
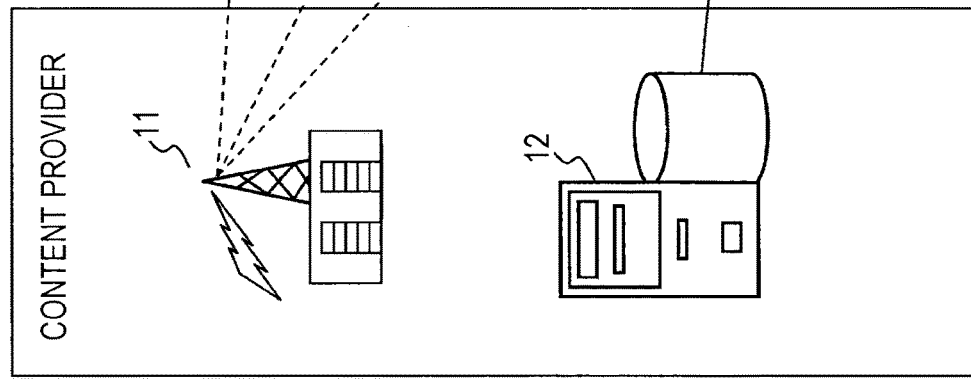

FIG. 9A

| CONTENT HASH LIST COLLECTIONS (Hash List Collections) |
|---|
| ECS ISSUER DATE |
| BLOCK IDENTIFIER (PAD Block Number) |
| SIGNATURE BY ECS ISSUER |
| ECS ISSUER CERTIFICATE |
| CONTENT BLOCK TABLE (Stored Content Block Table) |

FIG. 9B

| ECS CERTIFICATE IDENTIFIER (ECS Certificate ID) |
|---|
| BLOCK IDENTIFIER START NUMBER (Start PAD Block Number) |
| BLOCK IDENTIFIER RANGE (PAD Block Number Counter) |
| USER CERTIFICATE EXPIRATION DATE (Expiration Date) |
| ECS ISSUER PUBLIC KEY |
| SIGNATURE BY LA |

FIG. 12

| VERSION |
| NUMBER OF ENTRIES |
| REVOKED ECS ISSUER CERTIFICATE ID #1 | REVOKED DATE #1 |
| ... |
| REVOKED ECS ISSUER CERTIFICATE ID #N | REVOKED DATE #N |
| SIGNATURE BY LA |

FIG. 21

| PROTECTED AREA | | GENERAL PURPOSE AREA |
|---|---|---|
| BLOCK #0 | BLOCK #1 | |
| SERVER A: Kt(a1) (+) (UR(a1) \|\| ECSSig(a1))hash<br>Kt(a2) (+) (UR(a2) \|\| ECSSig(a2))hash<br>Kt(a3) (+) (UR(a3) \|\| ECSSig(a3))hash | --- | Con(a1), UR(a1), ECS(a1)<br>Con(a2), UR(a2), ECS(a2)<br>Con(a3), UR(a3), ECS(a3) |
| SERVER B: --- | Kt(b1) (+) (UR(b1) \|\| ECSSig(b1))hash<br>Kt(b2) (+) (UR(b2) \|\| ECSSig(b2))hash | Con(b1), UR(b1), ECS(b1)<br>Con(b2), UR(b2), ECS(b2) |

FIG. 22

| | PROTECTED AREA | | GENERAL PURPOSE AREA |
|---|---|---|---|
| | BLOCK #0 | BLOCK #1 | |
| SERVER A | Kt(a1) (+) (UR(a1) \|\| ECSSig(a1))hash<br>Kt(a2) (+) (UR(a2) \|\| ECSSig(a2))hash<br>Kt(a3) (+) (UR(a3) \|\| ECSSig(a3))hash | --- | Con(a1), UR(a1), ECS(a1)<br>Con(a2), UR(a2), ECS(a2)<br>Con(a3), UR(a3), ECS(a3) |
| SERVER B | Kt(b1) (+) (UR(b1) \|\| ECSSig(b1))hash<br>Kt(b2) (+) (UR(b2) \|\| ECSSig(b2))hash | --- | Con(b1), UR(b1), ECS(b1)<br>Con(b2), UR(b2), ECS(b2) |
| SERVER C | --- | Kt(c1) (+) (UR(c1) \|\| ECSSig(c1))hash | Con(c1), UR(c1), ECS(c1) |
| SERVER D | --- | Kt(d1) (+) (UR(d1) \|\| ECSSig(d1))hash<br>Kt(d2) (+) (UR(d2) \|\| ECSSig(d2))hash | Con(d1), UR(d1), ECS(d1)<br>Con(d2), UR(d2), ECS(d2) |

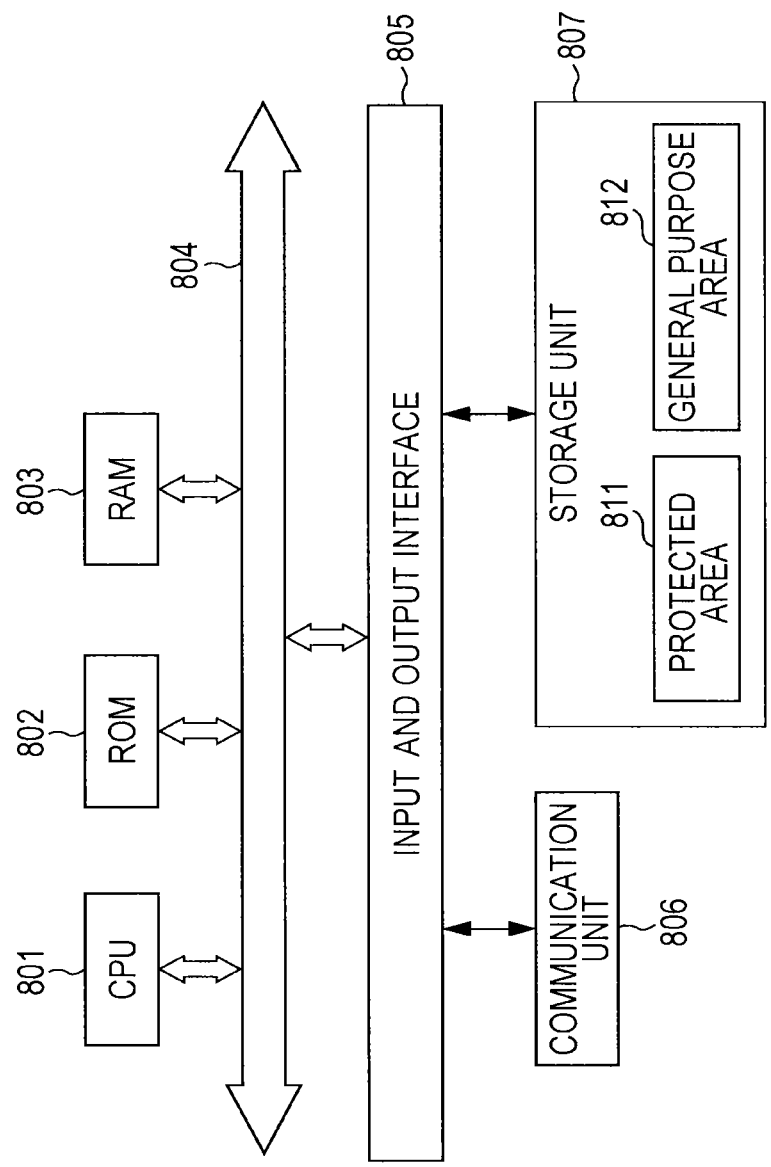

INFORMATION PROCESSING APPARATUS AND INFORMATION PROCESSING METHOD FOR DECODING, REPRODUCING AND PROVIDING ENCRYPTED CONTENT

BACKGROUND

The present disclosure relates to an information processing apparatus, an information storage apparatus, an information processing system, and information processing method and program. Particularly, the present disclosure relates to an information processing apparatus, an information storage apparatus, an information processing system, and information processing method and program which prevent improper use of content.

For example, content such as movie, music, and the like are provided to users via various media such as a DVD (Digital Versatile Disc), a Blu-ray Disc (registered trademark), and a flash memory, a network such as the Internet, or a broadcast wave. The users can reproduce the content using various information processing apparatuses such as a PC, a mobile terminal, a recording and reproducing apparatus such as a BD player, and a television.

However, copyright and distribution rights of most content such as music data and image data to be provided to the users are owned by creators or sellers thereof. Accordingly, content providers perform predetermined content use restrictions in providing content to the users in many cases.

According to a digital recording apparatus and a recording medium, it is possible to repeat recording and reproducing without degrading images and sound, for example, and there is a problem in that delivery of improperly copied content via the Internet or use of improperly copied content such as distribution of so-called pirate discs have been widespread.

In order to prevent such improper copying of data, various techniques for preventing illegal copying in a digital recording apparatus and a recording medium have been put to practical use.

For example, content encryption processing is one example. A key used for decoding encrypted data is given only to a reproducing apparatus which is licensed to have a content use right. A reproducing apparatus which is designed to follow a predetermined operation rule such as a rule that the reproducing apparatus does not perform improper copying is licensed. On the other hand, a reproducing apparatus which is not licensed does not have a key for decoding encrypted data, and therefore, the reproducing apparatus do not decode the encrypted data.

However, even if such content encryption is executed, content is still improperly used in a current situation.

One specific example of improper use of content will be described.

A configuration is assumed in which a content server delivers encrypted content to a user device such as a recording and reproducing apparatus, a PC, or a mobile terminal.

When the content server delivers encrypted content to the user device, the content server delivers data of
(a) encrypted content and
(b) an encryption key applied to encryption and decoding of the encrypted content
to the user device via a network, for example.

For example, when the same content such as the same movie is provided to multiple user devices, the content server executes the two following kinds of processing.

(A) The content server generates and provides differently encrypted content to the user devices by applying different individual encryption keys.
(B) The content server generates and provides same encrypted content which has been encrypted with a same encryption key to the plurality of user devices.

In consideration of security for preventing improper use of content, the above processing (A) is effective.

In order to perform the above processing (A), however, it is necessary to perform processing for setting individual encryption keys for multiple users and generating individually encrypted content, and there is a problem in that processing load on the server such as generation and management of encryption keys, encrypted content generation processing, and the like increases in accordance with the number of users to which the content is delivered.

Accordingly, the above processing (B), namely processing for generating the same encrypted content encrypted with the same encryption key for the same content and providing the encrypted content to the plurality of users is performed in many cases.

For example, one encryption key (=title key) is set for content with a certain title, the one title key is applied to generate the same encrypted content, and a data set of
(a) the encrypted content and
(b) the title key
is delivered to the multiple users.

By performing such processing, the processing load on the content server is reduced.

Hereinafter, an encryption key set in units of content titles will be described as a "title key".

In addition, a title key is applied to encryption and decoding processing of encrypted content with the title. However, if a same data set, that is, a combination of same data of
(a) encrypted content and
(b) title key
is delivered to multiple users, "unauthorized users" who are a part of the users may perform the following processing:
(1) The "unauthorized users" read a title key received from the server and release the read title key to an unspecified number of users; or
(2) The "unauthorized users" uses a title key A corresponding to certain encrypted content A to encrypt completely different content B and deliver a combination of data of
(X) the title key A and
(Y) the encrypted content B encrypted with the title key A
to an unspecified number of users.

There is a possibility in that improper use is executed.

If the above processing (1) is performed, for example, multiple users who obtain the title key improperly released use the content, which has been improperly encrypted with the title key.

In addition, if the above processing (2) is performed, an improper data set created by the "unauthorized users", namely
(X) the title key A and
(Y) the encrypted content B encrypted with the title key A
are obtained from the "unauthorized users", and the multiple users uses the improperly encrypted content B.

As a result, the number of users who legitimately purchase an original legitimate data set, namely
the encrypted content B and
a title key B corresponding to the encrypted content B is reduced, and the benefits of owners of copyrights and owners of distribution rights are significantly damaged.

Further specific description will be given of an example of improper processing.

It is assumed that a content server owns the following data sets of encrypted content (C) and a title key (Kt) from (1) to (3).

(1) (Kt11, C11)
(2) (Kt12, C12)
(3) (Kt13, C13)

Here, Cnn represents a content file, and

Ktnn represents a title key used in encrypting content.

(Kt11, C11) is a data set of a title key (Kt11) and content (C11) encrypted with the title key (Kt11), For example, it is assumed that, an "unauthorized user Ux" purchases all of the above three data sets, namely (1) (Kt11, C11)
(2) (Kt12, C12)
(3) (Kt13, C13).

It is assumed that the purchase processing itself is performed by a predetermined appropriate purchase procedure between a user device of the "unauthorized user Ux" such as a PC and the content sever.

The "unauthorized user Ux" records the above data sets (1) to (3) in a medium such as hard disk of the PC as the user device.

The "unauthorized user Ux" reads the above data sets (1) to (3) from the medium such as hard disk of the PC as the user device PC and decodes all encrypted content with the title keys of its own once to obtain the following data.

Title keys: Kt11, Kt12, Kt13

Decoded content: C11, C12, C13

Although a title key is typically not read to the outside when a legitimate content reproduction program is used in an appropriate reproducing apparatus, there is a possibility in that the title key itself is read by a method of installing an improper program on an apparatus such as a PC, and it is difficult to completely prevent the title key from being read in a current situation.

Furthermore, the "unauthorized user Ux" generates data C11||C12||C13
obtained by coupling the decoded content C11 to C13 and encrypts the coupled data with the title key Kt11.

That is, the "unauthorized user Ux" generates the following data set
(Kt11, C11||C12||C13)
and improperly distributes the data set via a network, for example, sells the data set at an inexpensive price or provides the data set to many users for free.

If such processing is performed, many general users can obtain the above improperly created data set, namely the improper data set of
(Kt11, C11||C12||C13)
from the "unauthorized user Ux".

The data set is configured by
(a) the encrypted content encrypted with the title key Kt11 and
(b) the title key Kt11,
and has the same data configuration as that of the content in the data set provided from the legitimate content provider to the user.

For this reason, an appropriate licensed reproducing apparatus including an appropriate content reproducing program can decode and reproduce the encrypted content [C11||C12||C13] without any problems using the title key Kt11.

As a result, content is not legitimately purchased, and improper use is widespread. Since the number of users who legitimately purchase content of C11 to C13 and the like drops, the benefits of owners of appropriate rights are damaged.

Further specific description will be given. For example, in a case of series content including twelve titles from the first episode to the twelfth episode such as a drama, it is assumed that content purchase units are set in units of episodes as follows:

First episode=(Kt01, C01)
Second episode=(Kt02, C02)
Third episode=(Kt03, C03)
:
Twelfth episode=(Kt12, C12)

In such a case, an "unauthorized user" purchases all twelve titles from the first episode to the twelfth episode in the series, couples the content C01 to C12 of the first to twelfth episodes, generates a data set encrypted again with a title key Kt01 corresponding to the first episode, namely
(Kt01, C01||C02||C03 . . . ||C12)
and release the data set on the network. Otherwise, the unauthorized user performs processing for improperly selling the data set.

In such a case, it becomes possible to obtain, reproduce, and use the improper data set created by the "unauthorized user", namely
(Kt01, C01||C02||C03 . . . ||C12)
by multiple user devices.

For example, it is assumed that a legitimate price of each of the twelve episodes is 2,000 JPY.

In such a case, the price of all twelve episodes is 12×2,000 JPY=24,000 JPY.

The "unauthorized user" sells the improper data set, namely
(Kt01, C01||C02||C03 . . . ||C12)
with the price of 6,000 JPY, for example. In such a case, many users purchase the less expensive content, and as a result, legitimate content sales are interrupted, and the benefits and rights of persons who originally own copyright and sale rights are damaged.

In addition to the above example, it is possible to use a title key Kt11 set corresponding to one piece of certain content C11 for encrypting other various kinds of content Cxx without any relationships as
(Kt11, Cxx), Content Cxx may be various kinds of content, and there is a problem in that all content can be decoded and reproduced with one title key without any limitation.

That is, even if a reproducing apparatus, reproduction of plain text content with which is inhibited, is created, it is possible to decode and reproduce plain text content using the improper data set in the same manner as in legitimately purchased content.

Furthermore, the "unauthorized user" can start services of replacing title keys and encrypting content again and can behave as if the "unauthorized user" were an authorized server.

As described above, it is difficult to prevent improper use of content only with a countermeasure of content encryption processing.

As a method eliminating improper use of content other than the encryption processing, there is a method in which a reproducing apparatus is caused to execute falsity verification on content. By applying this method, it is possible to stop using falsified content when any modification (falsity) is made on content in a distribution process of the improper content, for example.

Specifically, a user device which reproduces content is designed to have a controlled configuration in which the user device is made to execute processing for verifying presence of content falsity, to reproduce the content only when it is confirmed that no falsity exists in the content, and not to reproduce content when it is determined that falsity has been made.

For example, Japanese Unexamined Patent Application Publication No. 2002-358011 discloses a controlled configuration in which a hash value is calculated from a content file to be reproduced, the hash value is compared with a hash value for a cross-check prepared in advance, namely a hash value for a cross-check calculated in advance based on appropriate content data, it is determined that the content has not been falsified when the newly calculated hash value coincides with the hash value for a cross-check, and processing moves on to content reproduction processing.

However, if a capacity of the content data as original data for calculating the hash value is large in executing the processing for calculating the hash value based on the content as described above, significantly large processing load and long processing time are necessary for the calculation. Recently, video image data has higher quality, and the amount of data per content ranges from several GB to several tens of GB in many cases. There is a problem in that it is necessary that the user device has a significantly high data processing ability and a problem in that the content reproduction processing is not effectively performed due to long content verification time if the user device which reproduces the content is made to perform such processing for calculating a hash value of content based on large capacity data.

In addition, Japanese Patent No. 4576936 discloses a configuration in which a hash value for each hash unit set as classified data of stored content on an information recording medium is recorded in a content hash table and the content hash table is stored with content on the information recording medium.

With such a disclosed configuration, an information processing apparatus which reproduces content executes processing for cross-checking the hash values based on one or more randomly selected hash units. With such a configuration, it is possible to calculate a hash value based on hash units with less amount of data, to perform cross-check processing regardless of the amount of content data, and to thereby efficiently verify content by the user device which reproduces the content.

However, the configuration disclosed in Japanese Patent No. 4576936 is on the assumption of processing for content stored on an information recording medium. Although the disclosed configuration can be applied to a case in which a hash value can be recorded with content in manufacturing the information recording medium, for example, there is a problem in that it is difficult to apply the configuration to content downloaded from a server, for example.

Both Japanese Unexamined Patent Application Publication No. 2002-358011 and Japanese Patent No. 4576936 put emphasis on content falsity verification, and there is a problem in that distribution of improperly copied content with no falsity is not controlled at all.

As described above, encryption and falsity verification processing of content in the related art do not exhibit a sufficient effect of preventing distribution of improperly copied content and divulging of content encryption keys in a current situation.

SUMMARY

It is desirable to provide an information processing apparatus, an information storage apparatus, an information processing system, and information processing method and program which can effectively prevent improper use of content.

According to a first embodiment of the present disclosure, there is provided an information processing apparatus including: a data processing unit which executes processing for decoding and reproducing encrypted content, wherein the data processing unit executes processing for determining whether or not the content can be reproduced by applying an encrypted content signature file set corresponding to the content to be reproduced, wherein the encrypted content signature file is a file which stores thereon information on issue date of the encrypted content signature file and an encrypted content signature issuer certificate with a public key of an encrypted content signature issuer as an apparatus which generates the encrypted content signature file, wherein in the processing for determining whether or not the content can be reproduced, the data processing unit compares the expiration date of the encrypted content signature issuer certificate recorded in the encrypted content signature issuer certificate with the information on the issue date of the encrypted content signature file, does not perform processing for decoding and reproducing the encrypted content when the expiration date of the encrypted content signature issuer certificate is before the issue date of the encrypted content signature file, and performs the processing for decoding and reproducing the encrypted content only when it is confirmed that the expiration date of the encrypted content signature issuer certificate is not before the issue date of the encrypted content signature file.

Moreover, in the information processing apparatus according to the embodiment of the present disclosure, when it is confirmed that the expiration date of the encrypted content signature issuer certificate is not before the issue date of the encrypted content signature file, the data processing unit may further refer to a revocation list which records therein information on invalidation of the encrypted content signature issuer certificate and perform the processing for decoding and reproducing the encrypted content under a condition that it is confirmed that an identifier of the encrypted content signature issuer certificate is not registered in the revocation list.

Moreover, in the information processing apparatus according to the embodiment of the present disclosure, when it is confirmed that the expiration date of the encrypted content signature issuer certificate is not before the issue date of the encrypted content signature file, the data processing unit may further refer to a revocation list which records therein information on invalidation of the encrypted content signature issuer certificate, and obtain invalidated (revoked) date of the encrypted content signature issuer certificate from the revocation list and perform the processing for decoding and reproducing the encrypted content under a condition that it is confirmed that the issue date of the encrypted content signature file is before the invalidated (revoked) date when an identifier of the encrypted content signature issuer certificate is registered in the revocation list.

Moreover, in the information processing apparatus according to the embodiment of the present disclosure, the encrypted content signature file may be a file which includes a hash value of content and an electronic signature for data including key information to be applied to decoding of the content and information on issue date of the encrypted content signature file, and the data processing unit may execute the processing for determining whether or not the content can be reproduced after it is confirmed that no falsity has been made in the encrypted content signature file by executing signature verification on the electronic signature.

Moreover, in the information processing apparatus according to the embodiment of the present disclosure, an electronic signature of a license issuer may be set in the encrypted content signature issuer certificate, and the data processing unit may execute the processing for determining whether or not the content can be reproduced after it is confirmed that no falsity has been made in the encrypted content signature issuer certificate by executing signature verification on the electronic signature.

According to a second embodiment of the present disclosure, there is provided an information processing apparatus including: a data processing unit which executes processing for providing encrypted content to a user device, wherein the data processing unit executes processing for determining whether or not the content can be provided by applying an encrypted content signature file set corresponding to encrypted content, wherein the encrypted content signature file is a file which stores thereon information on issue date of the encrypted content signature file and an encrypted content signature issuer certificate with a public key of an encrypted content signature issuer as an apparatus which generates the encrypted content signature file, wherein in the processing for determining whether or not the content can be provided, the data processing unit compares expiration date of the encrypted content signature issuer certificate recorded in the encrypted content signature issuer certificate with the information on issue date of the encrypted content signature file, executes the processing for determining whether or not the content can be provided with reference to a revocation list which records therein information on invalidation of the encrypted content signature issuer certificate when it is confirmed that the expiration date of the encrypted content signature issuer certificate is not before the issue date of the encrypted content signature file, and performs the processing for determining whether or not the content can be provided with reference to information on the expiration date of the encrypted content signature issuer certificate when it is confirmed that the expiration date of the encrypted content signature issuer certificate is before the issue date of the encrypted content signature file.

Moreover, in the information processing apparatus according to the embodiment of the present disclosure, when it is confirmed that the expiration date of the encrypted content signature issuer certificate is not before the issue date of the encrypted content signature file, the data processing unit may compare the expiration date of the encrypted content signature issuer certificate with actual time and may not perform the processing for providing the encrypted content to the user device if the expiration date of the encrypted content signature issuer certificate is before the actual time.

Moreover, in the information processing apparatus according to the embodiment of the present disclosure, when it is confirmed that the expiration date of the encrypted content signature issuer certificate is not before the issue date of the encrypted content signature file, the data processing unit may compare the expiration date of the encrypted content signature issuer certificate with the actual time, compare the issue date of the encrypted content signature file with the actual time when the expiration date of the encrypted content signature issuer certificate is not before the actual data, and may not perform the processing for providing the encrypted content to the user device when the issue date of the encrypted content signature file is before the actual time.

Moreover, in the information processing apparatus according to the embodiment of the present disclosure, when it is confirmed that the issue date of the encrypted content signature file is not before the actual time, the data processing unit may further execute the processing for determining whether or not the content can be provided with reference to the revocation list which records therein the information on invalidation of the encrypted content signature issuer certificate.

Moreover, in the information processing apparatus according to the embodiment of the present disclosure, the data processing unit may refer to the revocation list which records therein the information on invalidation of the encrypted content signature issuer certificate and execute the processing for providing the encrypted content to the user device under a condition that it is confirmed that an identifier of the encrypted content signature issuer certificate is not registered in the revocation list.

Moreover, in the information processing apparatus according to the embodiment of the present disclosure, the data processing unit may execute the processing for determining whether or not the content can be provided with reference to the revocation list which records therein the information on invalidation of the encrypted content signature issuer certificate, and obtain invalidated (revoked) date of the encrypted content signature issuer certificate from the revocation list and execute the processing for providing the encrypted content to the user device under a condition that it is confirmed that the issue date of the encrypted content signature file is before the invalidated (revoked) date when an identifier of the encrypted content signature issuer certificate is registered in the revocation list.

According to a third embodiment of the present disclosure, there is provided an information processing system including: a user device which executes processing for reproducing content; a content provider which executes processing for providing the content to the user device; and an encrypted content signature issuer which executes processing for providing an encrypted content signature file to the content provider, wherein the content provider sends content hash list collections including hash values based on configuration data of the content and a content encryption key or a hash value of the encryption key to the encrypted content signature issuer, wherein the encrypted content signature issuer generates signature data for data as a target of the signature, namely data including the content hash list collections, the hash value of the content encryption key, and information on date on which the encrypted content signature file is generated, generates an encrypted content signature file including the generated signature data and the content hash list collections, and sends the encrypted content signature file to the content provider, wherein the content provider executes processing for determining whether or not the content can be provided by applying the information on the date on which the encrypted content signature file is generated, and wherein the user device executes processing for determining whether or not the content can be reproduced by applying the information on date on which the encrypted content signature file is generated.

According to a fourth embodiment of the present disclosure, there is provided an information storage apparatus including: a storage unit which stores encrypted content and an encryption key to be applied to the decoding of the encrypted content, wherein the storage unit includes a protected area, which stores thereon a converted encryption key as conversion data of the encryption key, for which access restriction is set, and a general purpose area which stores thereon the encrypted content, wherein the general purpose area stores thereon an encrypted content signature file set corresponding to the encrypted content, wherein the encrypted content signature file is a file which stores thereon information on issue date of the encrypted content signature file and an encrypted content signature issuer certificate with a public key of an encrypted content signature issuer as an apparatus which generates the encrypted content signature file, and wherein a reproduction apparatus which executes processing for reading and reproducing the encrypted content from the storage unit is made to determine whether or not the content can be reproduced by applying the information on issue date of the encrypted content signature file.

Moreover, in the information processing apparatus according to the embodiment of the present disclosure, the encrypted content signature file may include an electronic signature for the information on issue date, and the reproduction apparatus which executes the processing for reading and reproducing the encrypted content from the storage unit may be made to execute verification processing on the electronic signature of the encrypted content signature file and determine whether or not the content can be reproduced by applying the information on issue date under a condition that the verification is successfully made.

According to a fifth embodiment of the present disclosure, there is provided an information processing method implemented in an information processing apparatus, wherein the information processing apparatus includes a data processing unit which executes processing for decoding and reproducing encrypted content, wherein the data processing unit executes processing for determining whether or not the content can be reproduced by applying an encrypted content signature file set corresponding to the content to be reproduced, wherein the encrypted content signature file is a file which stores thereon information on issue date of the encrypted content signature file and an encrypted content signature issuer certificate with a public key of an encrypted content signature issuer as an apparatus which generates the encrypted content signature file, wherein in the processing for determining whether or not the content can be reproduced, the data processing unit compares expiration date of the encrypted content signature issuer certificate recorded in the encrypted content signature issuer certificate with the information on the issue date of the encrypted content signature file, does not perform processing for decoding and reproducing the encrypted content when the expiration date of the encrypted content signature issuer certificate is before the issue date of the encrypted content signature file, and performs the processing for decoding and reproducing the encrypted content only when it is confirmed that the expiration date of the encrypted content signature issuer certificate is not before the issue date of the encrypted content signature file.

According to a sixth embodiment of the present disclosure, there is provided an information processing method implemented in an information processing apparatus, wherein the information processing apparatus includes a data processing unit which executes processing for providing encrypted content to a user device, wherein the data processing unit executes processing for determining whether or not the content can be provided by applying an encrypted content signature file set so as to correspond to the encrypted content, wherein the encrypted content signature file is a file which stores thereon information on issue date of the encrypted content signature file and an encrypted content signature issuer certificate with a public key of an encrypted content signature issuer as an apparatus which generates the encrypted content signature file, wherein in the processing for determining whether or not the content can be provided, the data processing unit compares expiration date of the encrypted content signature issuer certificate recorded in the encrypted content signature issuer certificate with the information on issue date of the encrypted content signature file, executes the processing for determining whether or not the content can be provided with reference to a revocation list which records therein information on invalidation of the encrypted content signature issuer certificate when it is confirmed that the expiration date of the encrypted content signature issuer certificate is not before the issue date of the encrypted content signature file, and performs the processing for determining whether or not the content can be provided with reference to information on the expiration date of the encrypted content signature issuer certificate when it is confirmed that the expiration date of the encrypted content signature issuer certificate is before the issue date of the encrypted content signature file.

According to a seventh embodiment of the present disclosure, there is provided a program which causes an information processing apparatus to execute information processing, wherein the information processing apparatus includes a data processing unit which executes processing for decoding and reproducing encrypted content, wherein the program causes the data processing unit to execute processing for determining whether or not the content can be reproduced by applying an encrypted content signature file set corresponding to the content to be reproduced, wherein the encrypted content signature file is a file which stores thereon information on issue date of the encrypted content signature file and an encrypted content signature issuer certificate with a public key of an encrypted content signature issuer as an apparatus which generates the encrypted content signature file, wherein in the processing for determining whether or not the content can be reproduced, the program causes the data processing unit to execute processing for comparing expiration date of the encrypted content signature issuer certificate recorded in the encrypted content signature issuer certificate with the information on the issue date of the encrypted content signature file, not to perform processing for decoding and reproducing the encrypted content when the expiration date of the encrypted content signature issuer certificate is before the issue date of the encrypted content signature file, and perform the processing for decoding and reproducing the encrypted content only when it is confirmed that the expiration date of the encrypted content signature issuer certificate is not before the issue date of the encrypted content signature file.

According to an eighth embodiment of the present disclosure, there is provided a program which causes an information processing apparatus to execute information processing, wherein the information processing apparatus includes a data processing unit which executes processing for providing encrypted content to a user device, wherein the program causes the data processing unit to execute processing for determining whether or not the content can be provided by applying an encrypted content signature file set so as to correspond to the encrypted content, wherein the encrypted content signature file is a file which stores thereon information on the issue date of the encrypted content signature file and an encrypted content signature issuer certificate with a public key of an encrypted content signature issuer as an apparatus which generates the encrypted content signature file, wherein in the processing for determining whether or not the content can be provided, the program causes the data processing unit to compare the expiration date of the encrypted content signature issuer certificate recorded in the encrypted content signature issuer certificate with the information on the issue date of the encrypted content signature file, execute the processing for determining whether or not the content can be provided with reference to a revocation list which records therein information on invalidation of the encrypted content signature issuer certificate when it is confirmed that the expiration date of the encrypted content signature issuer certificate is not before the issue date of the encrypted content signature file, and perform the processing for determining whether or not the content can be provided with reference to information on the expiration date of the encrypted content signature issuer certificate when it is confirmed that the expiration date of the encrypted content signature issuer certificate is before the issue date of the encrypted content signature file.

The program disclosed herein is a program which can be provided by a recording medium or a communication medium providing the program in a computer-readable format to an information processing apparatus or a computer system capable of executing various program codes, for example. By providing such a program in a computer-readable format, processing in accordance with the program is realized on the information processing apparatus or the computer system.

Other purposes, features, and advantages of this disclosure will become apparent by the following detailed description based on embodiments of the disclosure and appended drawings which will be described later. In this specification, a system means a logical collective configuration of a plurality of apparatuses, and apparatuses as components are not necessarily in a same case body.

According to a configuration of an embodiment of the disclosure, an apparatus and a method which can effectively prevent improper use of content are realized.

Specifically, an encrypted content signature file to be applied to processing for determining whether or not content can be reproduced is set. The encrypted content signature file is a file which stores thereon issue date information and a certificate of an encrypted content signature issuer as a file generating apparatus, expiration date recorded in the certificate of the encrypted content signature issuer is compared with issue date information of the encrypted content signature file in the processing for determining whether or not the content can be reproduced, the processing for decoding and reproducing encrypted content is not performed when the expiration date of the certificate of the encrypted content signature issuer certificate is before the issue date of the encrypted content signature file, and the processing for decoding and reproducing the encrypted content is executed only when it has been confirmed that the expiration date of the certificate of the encrypted content signature issuer is not before the issue date of the encrypted content signature file.

With the use of the date information of the encrypted content signature file, setting can be made such that valid content before revocation processing is available, for example.

BRIEF DESCRIPTION OF THE DRAWINGS

FIGS. 1A to 1C are diagrams illustrating outlines of content providing processing and use processing;

FIGS. 9A and 9B are diagrams illustrating a configuration example of an encrypted content signature file (ECS file);

FIG. 12 is a diagram illustrating a configuration example of an ECS issuer certificate revocation list;

FIG. 21 is a diagram illustrating a configuration example of data recorded in the memory card;

FIG. 22 is a diagram illustrating a configuration example of data recorded in the memory card;

FIG. 35 is a diagram illustrating a hardware configuration of an information processing apparatus as a memory card.

DETAILED DESCRIPTION OF EMBODIMENTS

Figure 2:
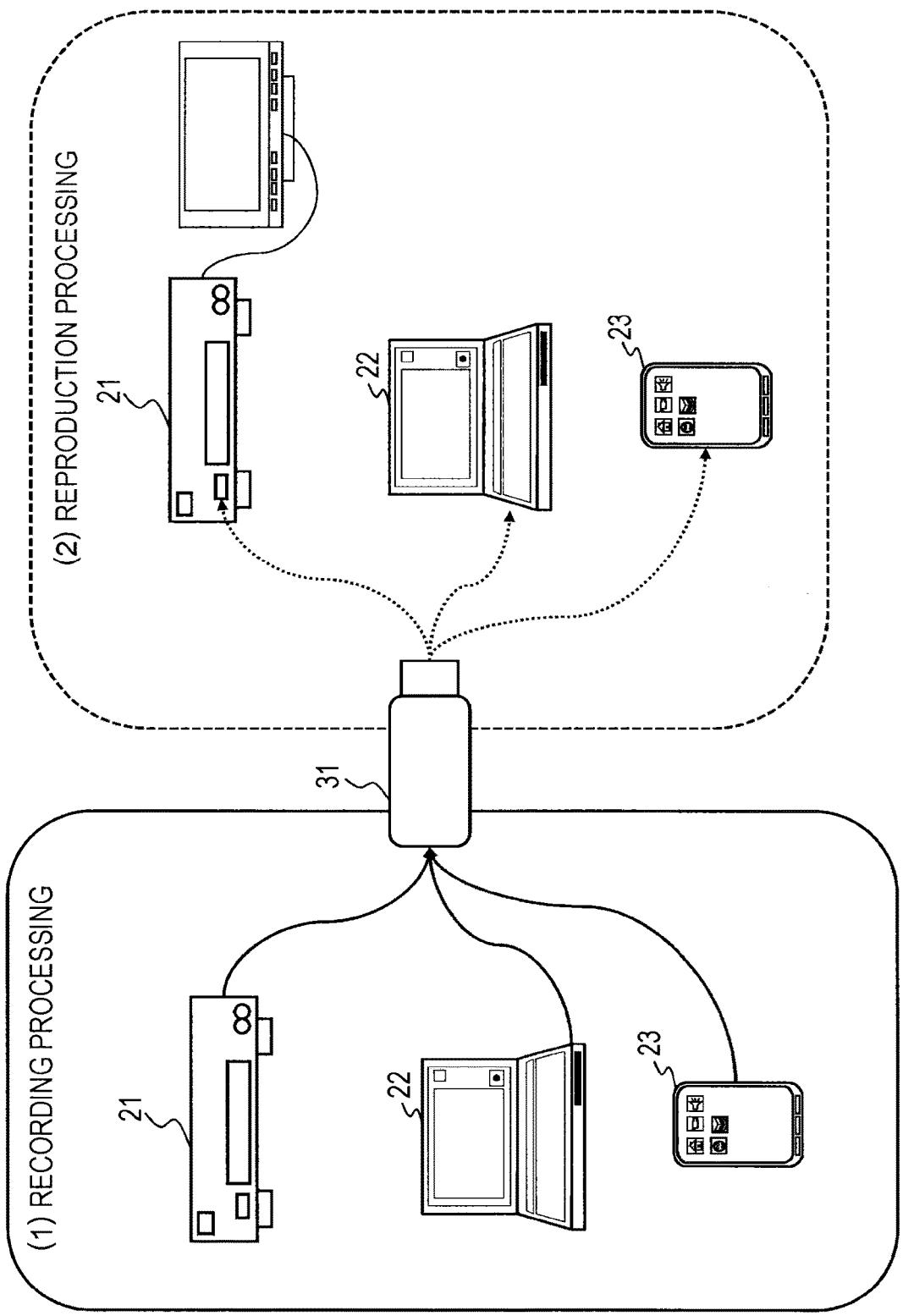
FIG. 2 is a diagram illustrating a use state of content recorded in a memory card.

Hereinafter, detailed description will be given of an information processing apparatus, an information storage apparatus, an information processing system, and information processing method and program according to the disclosure with reference to the drawings. In addition, the description will be given of the following items.
1. Outlines of Processing for Providing Content and Processing for Using Content
2. Concerning Configuration Example and Use Example of Memory Card
3. Concerning Certificate Including Information on Access Permission to Protected Area
4. Concerning Example of Processing for Accessing Memory Card by Applying Certificate of Each Apparatus
5. Concerning Content Providing System Using Encrypted Content Signature (ECS) Issuer
6. Concerning Configuration Example of ECS File
7. Concerning Configuration of ECS Issuer Certificate Revocation List
8. Concerning Processing for Generating Encrypted Content Signature File (ECS File)
9. Concerning Processing by Applying Date Information in ECS File and ECS Issuer Certificate
10. Concerning Configuration of Associating Encryption Key and ECS Issuer Signature
11. Concerning Processing for Applying Block Identifier Recorded in Encrypted Content Signature (ECS) File
12. Concerning Hardware Configuration Example of Each Apparatus
13. Conclusion of Configuration according to the Disclosure
[1. Outlines of Processing for Providing Content and Processing for Using Content]

Hereinafter, detailed description will be given of an information processing apparatus and information processing method and program of this disclosure with reference to the drawings.

First, description will be given of outlines of processing for providing content and processing for using the content with reference to FIGS. 1A to 1C.

FIG. 1A shows an example of a content provider, FIG. 1B shows an example of a content recording and reproducing apparatus (host), and FIG. 1C shows an example of a content recording medium.

The content recording medium in FIG. 1C is a medium, in which a user records content, which is used in processing for reproducing content. Here, a memory card 31 is exemplified as an information storage apparatus such as a flash memory.

In addition, although description will be given of representative examples in which content provided by a content provider is encrypted content in the following embodiments, the configuration disclosed herein is not limited to a case in which the provided content is encrypted content and can be applied to a case of unencrypted plain text content.

The user records and uses various kinds of content such as music and movie in the memory card 31. Such content includes content as a target of use control such as content as a target of copyright management, for example.

The content as a target of use control means content for which unregulated copying or distribution of copied data are inhibited, content for which use period is limited, or the like. In addition, when content under the use control is recorded in the memory card 31, usage rule corresponding to the content is recorded together.

In the usage rule, information relating to content usage such as a permitted content use period, permitted number of copying times, and the like are recorded.

The content provider provides a content usage rule in accordance with content.

The content provider in FIG. 1A is a content provider of music, movie, and the like. In FIG. 1A, a broadcasting station 11 and a content server 12 are shown as the content providers.

The broadcasting station 11 is a television station, for example, which provides various kinds of broadcast content on ground waves or satellite waves via a satellite to a user device [the content recording and reproducing apparatus (host) in FIG. 1B].

The content server 12 is a server which provides content such as music or movie via a network such as the Internet.

The user can mount the memory card 31 as the content recording medium in FIG. 1C on the content recording and reproducing apparatus (host) in FIG. 1B, receive content provided by the broadcasting station 11 or the content sever 12 via a receiving unit of the content recording and reproducing apparatus (host) itself in FIG. 1B or a receiving apparatus connected to the content recording and reproducing apparatus (host), and record the content in the memory card 31.

Figure 10:
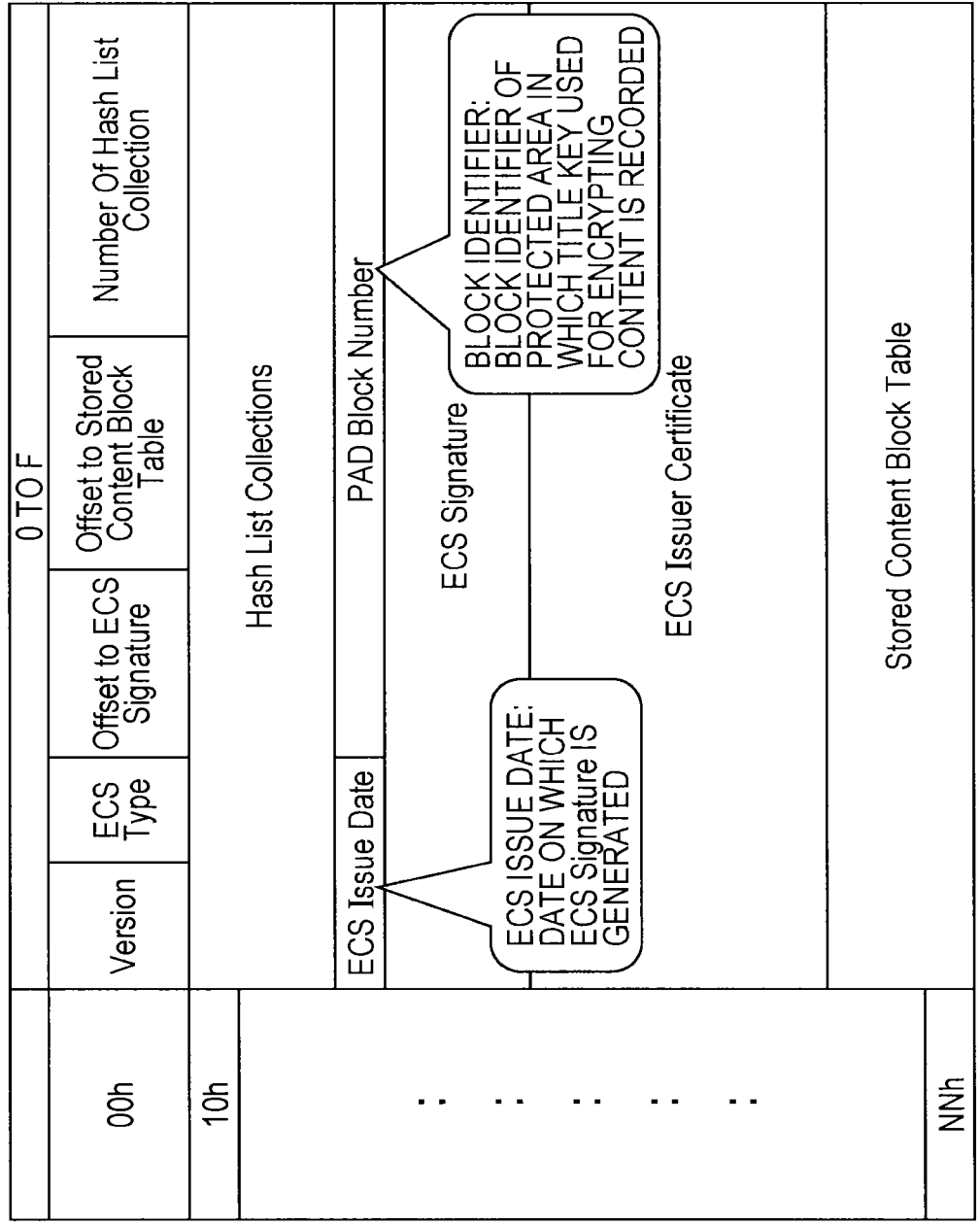
FIG. 10 is a diagram illustrating a configuration example of the encrypted content signature file (ECS file)

The content recording apparatus (host) in FIG. 1B mounts thereon the memory card 31 as the content recording medium in FIG. 10 and records the content received from the broadcasting station 11 or the content server 12 as the content provider in FIG. 1A in the memory card 31.

Examples of the content recording and reproducing apparatus (host) in FIG. 1B include a recording and reproducing dedicated device (CE device: Consumer Electronics device) 21 provided with a hard disk and a DVD or BD disc such as a DVD player. Furthermore, the examples include a PC 22 and a mobile terminal 23 such as a smart phone, a mobile phone, a mobile player, or a tablet terminal. All of these examples are designed such that the memory card 31 as the content recording medium in FIG. 10 can be mounted thereon.

The user uses the recording and reproducing dedicated device 21, the PC 22, the mobile terminal 23, or the like, receives the content such as music or movie from the broadcasting station 11 or the content server 12, and records the content in the memory card 31.

A use state of content recorded in the memory card 31 will be described with reference to FIG. 2.

The memory card 31 used as the information storage apparatus is a recording medium which is detachably attached to a content reproducing device such as a PC and can be freely detached from an apparatus which records the content and attached to another user device.

That is, the memory card 31 executes
(1) recording processing and
(2) reproduction processing
as shown in FIG. 2.

In addition, there is also an apparatus which executes only one of recording and reproduction.

In addition, it is not necessary that a same apparatus executes both the recording processing and the reproduction processing, and user can freely select and use a recording apparatus and a reproducing apparatus.

In addition, the restricted content recorded in the memory card 31 is recorded as encrypted content in many cases, and the content reproducing apparatus such as a recording and reproducing dedicated device 21, the PC 22, or the mobile terminal 23 executes decoding processing based on a predetermined sequence and then reproduces the content.

In addition, the content reproducing apparatus performs reproduction processing in a use permission state recorded in the usage rule set corresponding to the content.

The content recording and reproducing apparatus (host) in FIG. 1B stores thereon a program (host application) for executing content use based on the usage rule and the content decoding processing, and the content reproduction is executed based on the program (host application).

[2. Concerning Configuration Example and Use Example of Memory Card]

Next, description will be given of a configuration example and a use example of the memory card such as a flash memory used as the content recording medium.

Figure 3:
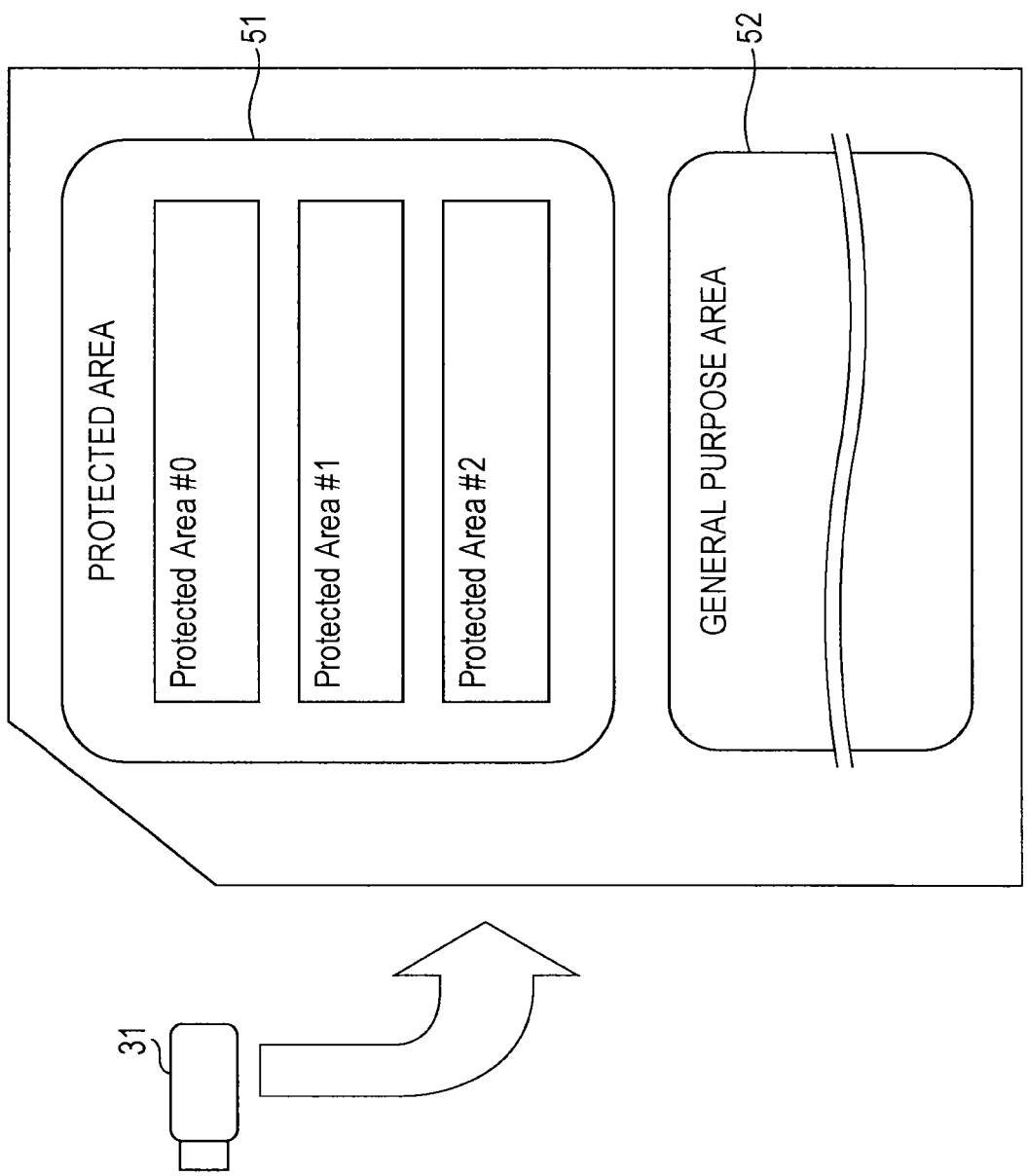
FIG. 3 is a diagram illustrating a specific configuration example of a storage area in the memory card.

A specific configuration example of a storage area in the memory card 31 will be shown in FIG. 3.

The storage area in the memory card 31 is configured by two areas, namely
(a) protected area 51 and
(b) general purpose area 52
as shown in FIG. 3.

The (b) general purpose area 52 is an area which the recording and reproducing apparatus used by the user can freely access and record content, a usage rule corresponding to the content, other general content management data, and the like in.

For example, the general purpose area 52 is an area which the server and the recording and reproducing apparatus of the user can freely write data to and read data from.

On the other hand, the (a) protected area 51 is an area which does not permit free access.

The protected area 51 is divided into blocks (#0, #1, #2, . . . ) as a plurality of divided areas, and an access right is set in units of blocks.

For example, when the recording and reproducing apparatus used by the user, the server connected via the network, or the like tries to write or read data, a data processing unit of the memory card 31 determines whether or not reading or writing can be performed in units of blocks in accordance with each apparatus based on the program stored in advance in the memory card 31.

The memory card 31 is provided with the data processing unit for executing the program stored in advance and an authentication processing unit which executes authentication processing, and the memory card 31 first performs the authentication processing on an apparatus which tries to write or read data in or from the memory card 31.

In the step of the authentication processing, an apparatus certificate such as a public key certificate is received from the counterpart apparatus, namely an access requesting apparatus.

For example, when the access requesting apparatus is the server, a server certificate owned by the server is received, and it is determined whether or not access can be permitted in units of blocks (divided area) of the protected area 51 using information described in the certificate.

In addition, when the access requesting apparatus is a host device, for example, a recording and reproducing apparatus (host) as the user device which records and reproduces the content, a host certificate owned by the recording and reproducing apparatus (host) is received, and it is determined whether or not access to each block (divided area) of the protected area 51 can be permitted using information described in the certificate.

The access right determination processing is performed in units of blocks (#0, #1, #2, . . . shown in the drawing) in the protected area 51 shown in FIG. 3. The memory card 31 causes the server or the host to execute processing (processing for reading/writing data or the like) permitted in units of blocks.

Information on restriction of reading/writing from/in the medium (PADRead/PADWrite) is set in units of apparatuses which try to access the content, for example, in units of the content server or the recording and reproducing apparatus (host). The information is recorded in the server certificate corresponding to each apparatus or the host certificate.

In addition, the "certificate" will be simply referred to as "Cert" in the following description.

As described above, the memory card 31 verifies the data recorded in the Server Cert or the Host Cert based on a prescribed program stored in advance in the memory card 31 and performs processing for permitting access only to an access permitted area.

[3. Concerning Certificate Including Information on Access Permission to Protected Area]

Next, description will be given of a configuration example of a certificate to be presented to the memory card when the server or the host device (=recording and reproducing apparatus) as the user device accesses the aforementioned protected area 51 in the memory card 31 with reference to FIGS. 4 and 5.

As described above, the memory card 31 performs the authentication processing on the apparatus which tries to write or read data to or from the memory card 31. In the step of the authentication processing, the apparatus certificate (the Server Cert or the Host Cert, for example) such as a public key certificate is received from the counterpart apparatus, namely the access requesting apparatus, and it is determined whether or not the access to each divided area in the protected area 51 is permitted using the information described in the certificate.

A configuration example of the host Cert stored on the user device (host device) such as the recording and reproducing dedicated device 21, the PC 22, the mobile terminal 23 or the like shown in FIG. 1B will be described as one example of the apparatus certificate used in the authentication processing, with reference to FIG. 4.

The host Cert is provided to each user device (host device) by an authentication station as a public key certificate issuer, for example. For example, the host Cert is a certificate of the user device, which is issued for the user device (host device) for which the authentication station permits the content use processing and is a certificate in which a public key and the like are stored. The host cert is configured as data, falsity of which is prevented, by setting a signature by a secret key of the authentication station.

In addition, the apparatus certificate can be stored on a memory in the apparatus in advance when the apparatus is manufactured, based on checking of the apparatus about a type of the apparatus, for example. If the apparatus certificate is obtained after the user purchases the apparatus, a configuration is applicable in which processing for checking the type of the apparatus, types of available content, and the like based on a predetermined sequence between the apparatus and the authentication station or another management station and the certificate is issued to the apparatus and stored on the memory in the apparatus.

In addition, the server which accesses the protected area in the memory card 31 owns the server Cert, which has the same configuration as that of the host certificate, in which a server public key and memory card access permission information are recorded.

Figure 4:
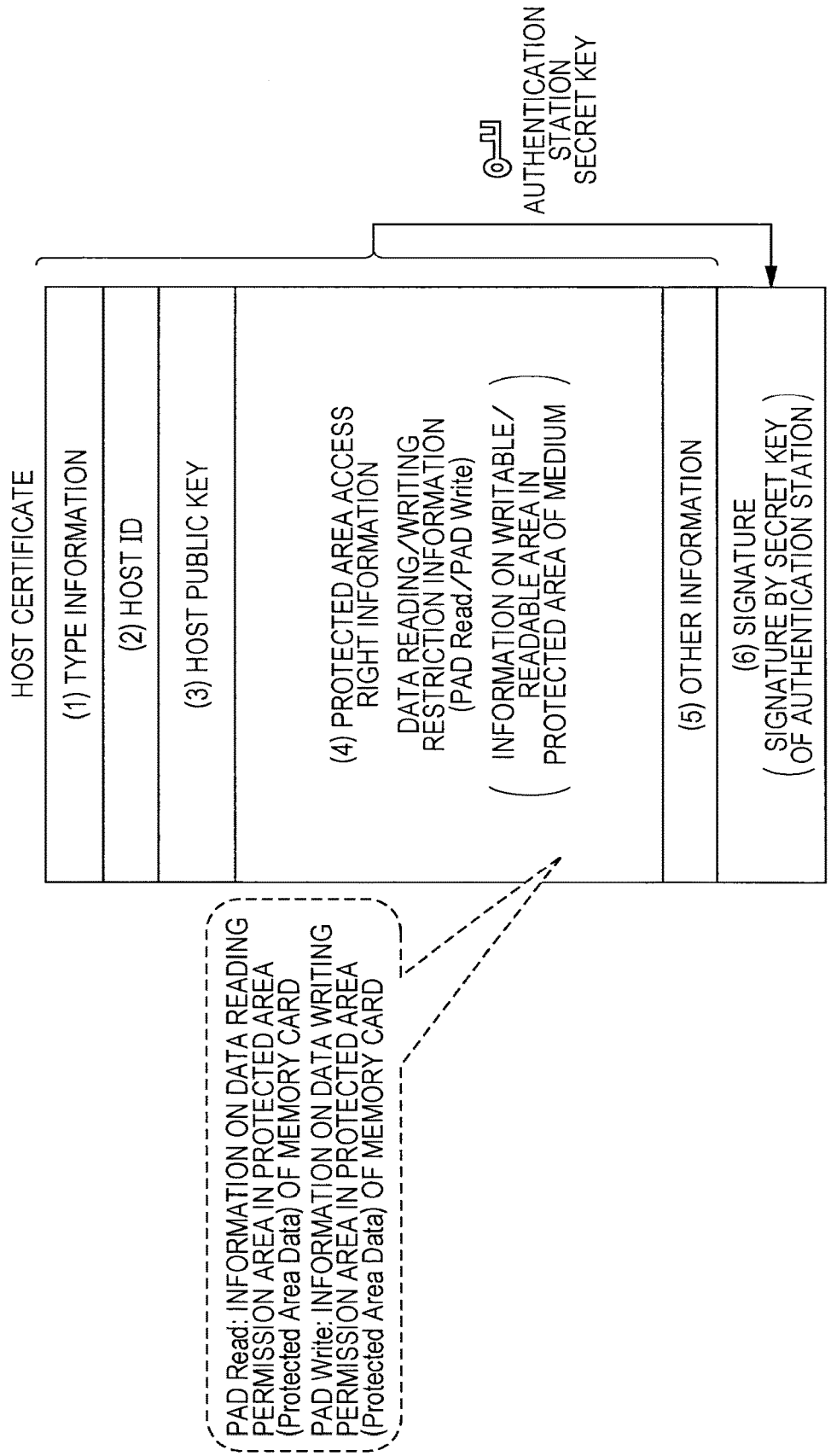
FIG. 4 is a diagram illustrating a host certificate.

FIG. 4 shows a specific example of the host Cert provided by the authentication station to each host device (user device).

The host Cert includes the following data as shown in FIG. 4.
(1) type information
(2) host ID (user device ID)
(3) host public key
(4) protected area access right information (information on restriction of reading/writing from/in protected area in medium (PAD read/PAD write)
(5) other information
(6) signature Hereinafter, above data (1) to (6) will be described.
(1) type information The type information is information representing a type of a certificate and a type of the user device, and for example, data representing that the certificate is a host certificate, information representing a type of the apparatus such as a PC or a music player are recorded therein.
(2) host ID The host ID is an area in which an apparatus ID as device identification information is recorded.
(3) host public key The host public key is a public key of the host device. The host public key and a secret key provided to the host device (user device) configure a key pair based on a public key encryption scheme.
(4) protected area access right information (information on restriction of reading/writing from/in protected area in a medium (PAD read/PAD write)

In the protected area access right information, information in units of blocks (divided areas) in the protected area 51 set in the storage are in a content recording medium, for example, in the memory card 31 shown in FIG. 3, for which data reading or data writing is permitted.

The access right is recorded as an access right in units of blocks (divided areas) in the protected area.
(5) other information, (6) signature In the host certificate, various kinds of information are recorded as well as the above (1) to (4), and signature data for the information (1) to (5) is recorded.

The signature is executed by the secret key of the authentication station. When the information recorded in the host certificate, for example, the host public key is extracted and used, signature verification processing is first executed by applying the public key of the authentication station to confirm that no falsity has been made on the host certificate, and the certificate storage data such as the host public key are used under a condition that the confirmation has been made.

FIG. 4 shows a host certificate in which information on permission of access to the protected area in the memory card by the user device (host device), and a certificate [server certificate (for example, a public key certificate on which the server public key is stored)] in which information on permission of access to the protected area in the memory card in the same manner as in the host certificate shown in FIG. 4 is provided to the server, which accesses the protected area, such as a content providing server which provides content to the memory card, for example.

A configuration example of the server Cert provided to the server will be described with reference to FIG. 5. In addition, the server in the following description includes all content providers shown in FIG. 1A, namely, all apparatuses such as the broadcasting station 11 and the content server 12 which provide content to the user device.

The server Cert is provided to an apparatus of a content server or the like which provides content, for example, by the authentication station which is a public key certificate issuer. For example, the server Cert is a server certificate issued for a server which is permitted by the authentication station to perform content provision processing, and is a certificate on which server public key and the like are stored. The server Cert is configured as data, falsity of which is prevented, by setting a signature with the secret key of the authentication station.

Figure 5:
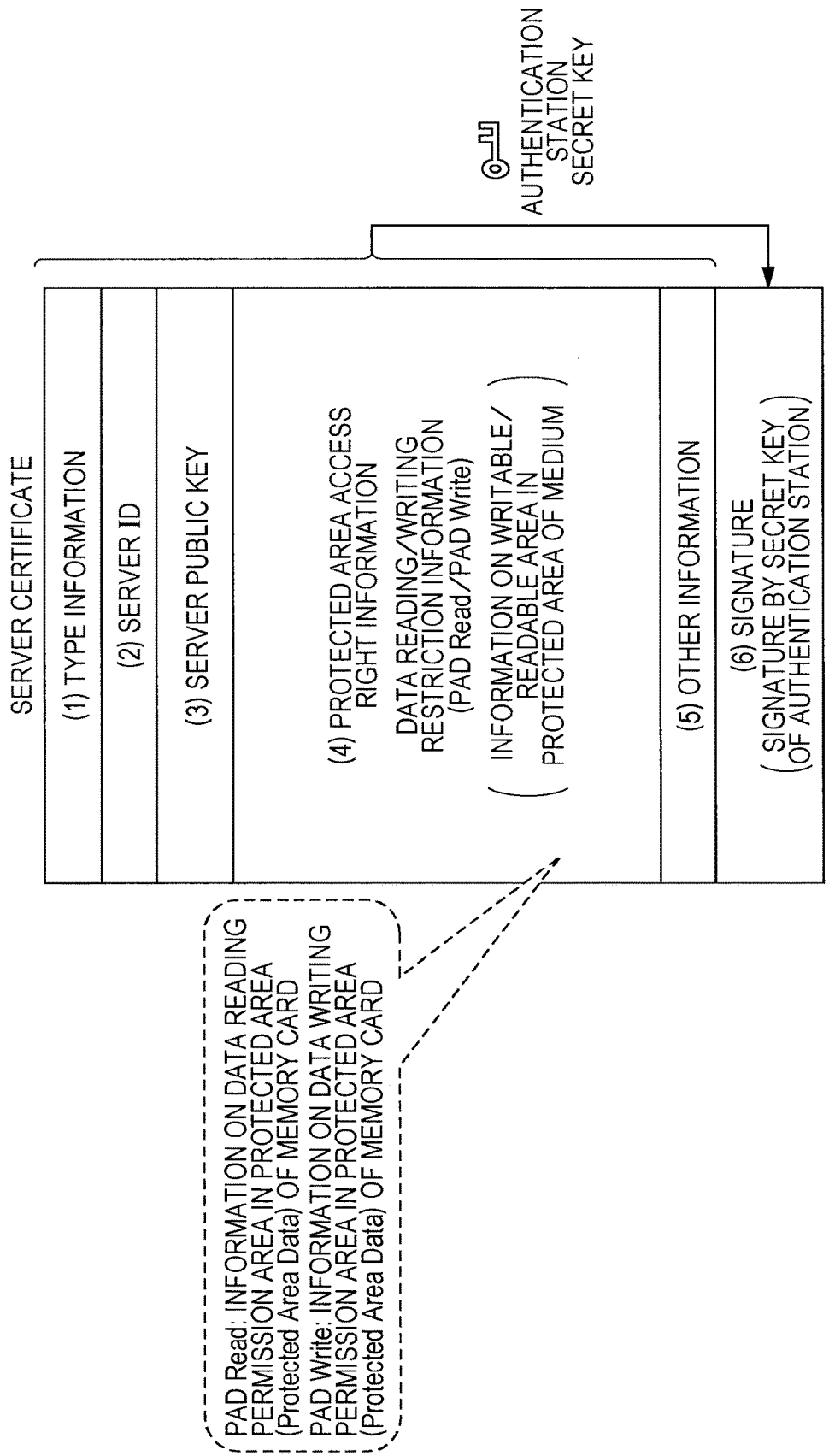
FIG. 5 is a diagram illustrating a server certificate.

FIG. 5 shows a specific example of the server Cert provided to each content server by the authentication station.

As shown in FIG. 5, the server certificate includes the following data, namely
(1) type information,
(2) server ID,
(3) server public key,
(4) information on restriction of reading/writing from/in medium (PAD Read/PAD Write)
(5) other information, and
(6) signature
in the same manner as the host certificate described above with reference to FIG. 4.

The above information is the same as that described above with reference to FIG. 4, and detailed description will be omitted.

In addition, in relation to (4) information on restriction of reading/writing from/in medium (PAD Read/PAD Write), an access right (data reading/writing permission information) in units of blocks (divided areas) in the protected area 51 in the memory card 31 is recorded in units of servers.

In addition, when the information recorded in the server certificate, for example, the server public key is extracted and used, signature verification processing is first executed by applying the public key of the authentication station to confirm that no falsity has been made on the server certificate, and the certificate storage data such as the server public key is used under a condition that the confirmation has been made.

[4. Concerning Example of Processing for Accessing Memory Card by Applying Certificate of Each Apparatus]

As described above with reference to FIGS. 4 and 5, it is necessary to present the certificate as shown in FIG. 4 or 5 to the memory card when the server or the host device (the user device such as the recording and reproducing apparatus) accesses a block in the protected area 51 in the memory card 31.

The memory card checks the certificate shown in FIG. 4 or 5 and determines whether or not access can be permitted in units of blocks in the protected area 51 in the memory card 31 shown in FIG. 3.

The host device owns the host certificate described above with reference to FIG. 4, for example, and the server which provides content or the like owns the server certificate described above with reference to FIG. 5.

When each of these apparatuses accesses the protected area in the memory card, it is necessary to present the certificate owned by each of the apparatuses to the memory card and allow the memory card to determine whether the access can be permitted based on verification.

Figure 6:
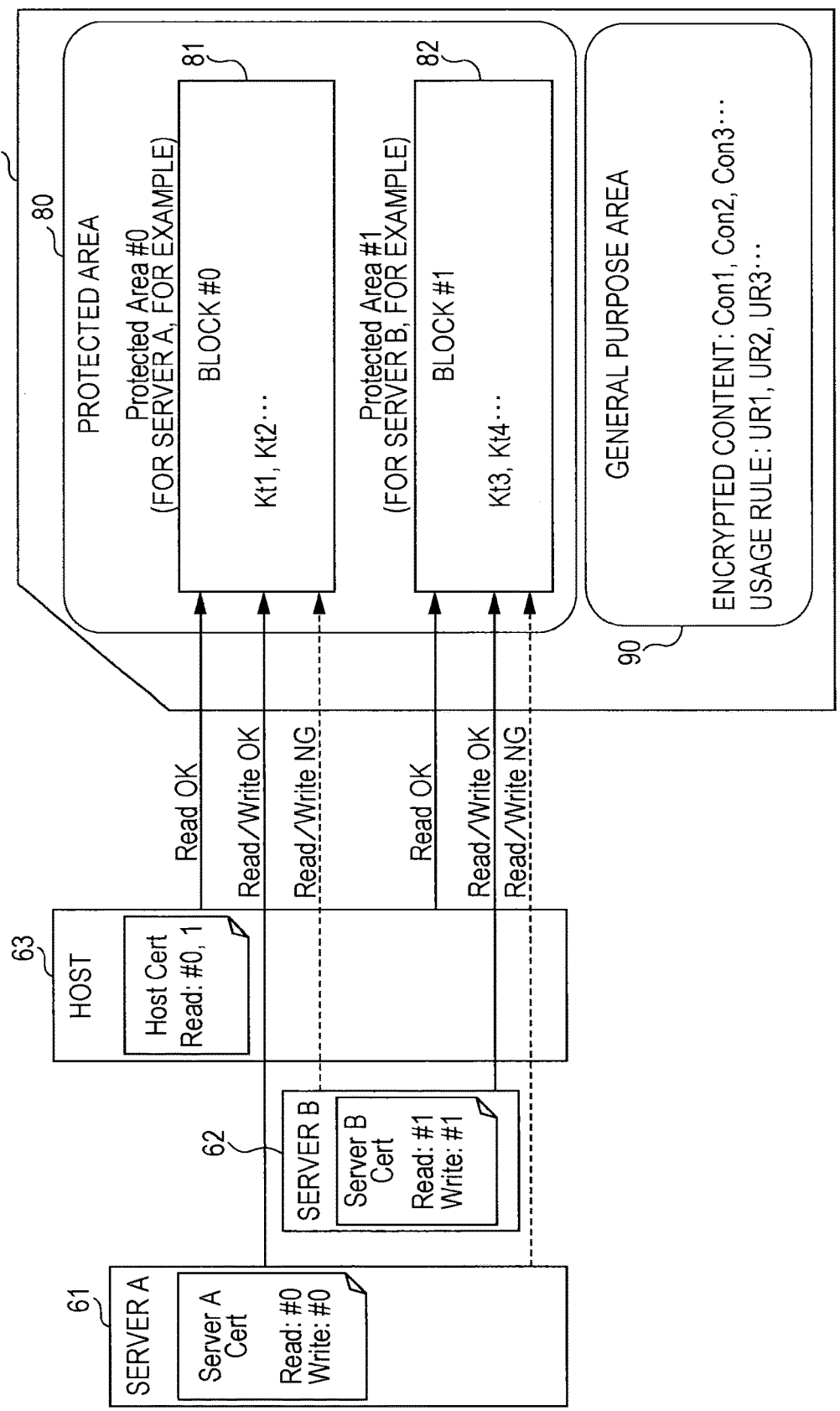
FIG. 6 is a diagram illustrating a specific configuration example of data stored on a memory card and an example of access control processing.

Referring to FIG. 6, description will be given of an access restriction setting example in a case where the access requesting apparatus to the memory card is the server and in a case where the access requesting apparatus is the host device such as the recording and reproducing apparatus.

In FIG. 6, a server A61, a server B62, a host device 63, a memory card 70, which are access requesting apparatus to the memory card, are shown in this order from the left side.

The server A61 and the server B62 provide encrypted content (Con1, Con2, Con3, . . . ) as content recorded in a memory card 70, for example.

These servers further provide title keys (Kt1, Kt2, . . . ) as keys for decoding the encrypted content and usage rules (UR1, UR2, . . . ).

The host device 63 is a device which performs processing for reproducing content stored on the memory card 70.

The host device 63 reads the encrypted content (Con1, Con2, Con3, . . . ) and usage rules (UR1, UR2, . . . ) recorded in a general purpose area 90 in the memory card 70. Furthermore, the host device 63 reads the title keys (Kt1, Kt2, . . . ) applied to content decoding processing from the blocks (divided areas) 81 and 82 in a protected area 80, executes decoding processing with the title keys, and uses the content based on the usage rules.

The memory card 70 includes the protected area 80 and the general purpose area 90, and the encrypted content, the usage rules, and the like are recorded in the general purpose area 90.

The title keys, as keys necessary for reproducing the content, are recorded in the protected area 80.

As described above with reference to FIG. 3, the protected area 80 is divided into a plurality of blocks (divided areas).

In the example shown in FIG. 6, only two blocks, namely
block #0 (protected area #0) 81 and
block #1 (protected area #1) 82
are shown.

In the protected area 80, other multiple blocks are set.

Various block setting states are applicable.

In the example shown in FIG. 6, the block #0 (protected area #0) 81 is a block only for the server A61, namely an area for storing a title key for decoding content provided by the server A61.

The block #1 (protected area #1) 82 is a block only for the server B62, namely an area for storing a title key for decoding content provided by the server B62.

In such setting, the server A61 which provides content records a title key necessary for decoding the provided content in the block #0 (protected area #0) 81.

In such a case, writing permission area information (PAD Write) recorded in the server certificate of the server A61 is configured as a certificate for which permission for writing in the block #0 (protected area #0) is set.

In the example shown in the drawing, permission for reading is also set in the block for which permission for writing is set.

In addition, the server B62 records a title key necessary for decoding the provided content in the block #1 (protected area #1) 82.

In such a case, writing permission area information (PAD Write) recorded in the server certificate of the server B62 is configured as a certificate for which permission for writing in the block #1 (protected area #1) 82 is set.

In addition, a host certificate owned by the host device 63 as a reproducing apparatus which reads the title keys recorded in the blocks #0 and #1 and reproduces the content is configured as a certificate for which permission for reading from the blocks #0 and #1 is set.

In this example, permission of writing to the blocks #0 and #1 is not set for the host certificate.

However, setting is made such that a title key corresponding to deleted content can be deleted in deleting the content, and therefore, permission for writing may be set for the deletion processing.

In addition, when it is necessary that the host device 63 writes data in the protected area in other processing, permission for writing may be set for the host certificate.

When a request for accessing the protected area 80 from the access requesting apparatus such as the server which provides the content or the host which uses the content is received, the data processing unit of the memory card 70 refers to the apparatus certificate of each apparatus, confirms access permission information in units of blocks, and determines whether to permit the access to each block.

The memory card 70 determines a type of writing or reading request data in accordance with an input of requesting data writing or data reading from the access requesting apparatus and selects a block (#0, #1, #2, . . . ) as a block in which the data is written or as a block from which the data is read.

The access control information is recorded in the certificate (the server certificate, the host certificate, or the like) of each access requesting apparatus as described above with reference to FIGS. 4 and 5, and the memory card first performs signature verification on the certificate received from the access requesting apparatus, confirms validity of the certificate, and then reads the access control information described in the certificate, namely the following information:
reading permission area information (PAD Read); and
writing permission area information (PAD Write).

The memory card permits and executes only the processing permitted for the access requesting apparatus based on the above information.

[5. Concerning Content Providing System Using Encrypted Content Signature (ECS) Issuer]

As described above with reference to FIGS. 1A to 1C, the content provided to the user device is provided from the content provider. However, the content provide itself may deliver improperly copied content in some cases. Hereinafter, description will be given of a configuration in which impropriety by a configuration other than the user device such as improper processing by the server can also be prevented.

Figure 7:
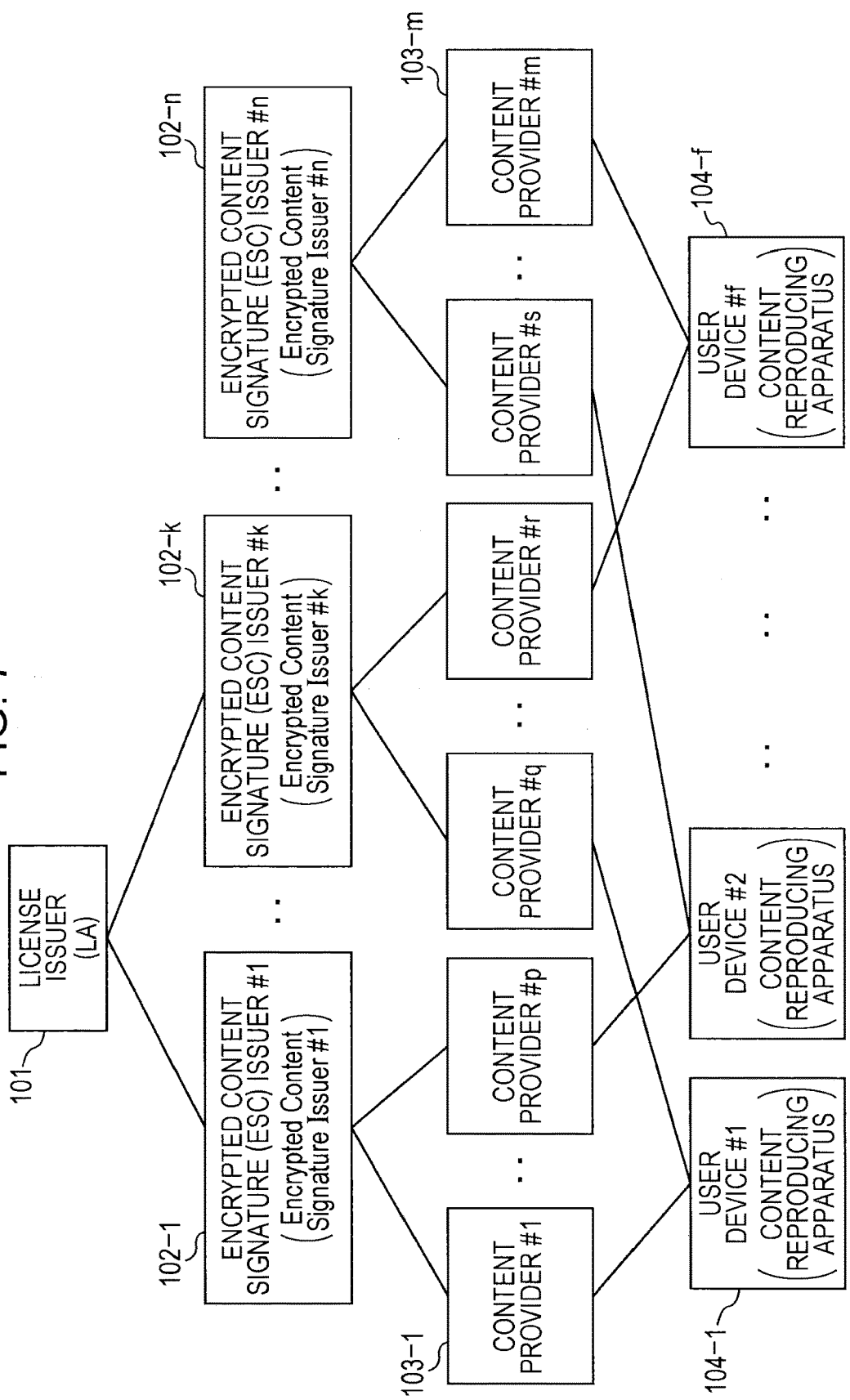
FIG. 7 is a diagram illustrating an overall configuration of an information processing system of the disclosure to prevent improper use of content.

Referring to FIG. 7, an overall configuration of the information processing system of the present disclosure in order to prevent improper use of content will be described.

FIG. 7 shows an overall configuration example of the information processing system. In FIG. 7, the following four apparatuses are shown in a hierarchical structure:

(A) a license issuer (LA) 101;
(B) encrypted content signature (ECS) issuers 102-1 to n;
(C) content providers (content servers) 103-1 to m; and
(D) user devices (content reproducing apparatuses) 104-1 to f.

The (C) content providers (content servers) 103-1 to m shown in FIG. 7 correspond to the broadcasting station 11, the content server 12, and the like shown in FIG. 1A.

In addition, the (D) user devices (content reproducing apparatuses) 104-1 to f shown in FIG. 7 correspond to the user devices such as the recording and reproducing dedicated apparatus 21, the PC 22, the mobile terminal 23, and the like shown in FIG. 1B.

The (C) content providers (content servers) 103-1 to m include various information processing apparatuses such as apparatuses, which send content or record content in a medium, of a content server, a broadcasting station, or a medium providing company which provides media such as discs with content stored thereon. Multiple content providers may be present.

The (D) user devices (content reproducing apparatuses) 104-1 to f are apparatuses which receive or read content such as a movie or music or other various kinds of content from the content providers (content servers) 103-1 to m via the Internet, broadcasting waves, or a medium such as a disc and execute reproduction processing thereof. Specifically, various information processing apparatuses such as a PC, a mobile terminal, a DVD player, a BD player, and a television which can reproduce content are included.

The (B) encrypted content signature (ECS) issuers 102-1 to n generate encrypted content signature files (ECS files) corresponding to the content provided by the (C) content providers (content servers) 103-1 to m.

In providing new content such as movie content to the user apparatus 104, for example, the (C) content providers (content servers) 103-1 to m request the encrypted content signature (ECS) issuers 102 to generate encrypted content signature files (ECS files) corresponding to the content.

The (B) encrypted content signature (ECS) issuers 102-1 to n generate encrypted content signature files (ECS files) in response to the request and provide the encrypted signature content files (ECS files) to the (C) content providers (content servers) 103.

In addition, a specific configuration and generation processing of the encrypted content signature file (ECS file) will be described later in detail.

The (C) content provider (content server) 103 receives the encrypted content signature file (ECS file) from the (B) encrypted content signature (ECS) issuer 102 and provides the encrypted content signature file (ECS file) with the encrypted content to the (D) user device (content reproducing apparatus) 104.

The (D) user device (content reproducing apparatus) 104 performs signature verification processing on the encrypted content signature file (ECS file) before reproducing the content, and decoding and reproducing of the content are permitted only when it is confirmed that the signature verification processing has been successfully made.

In addition, the user device (content reproducing device) 104 stores thereon a reproduction processing program based on a sequence for executing decoding and reproducing content under a condition of the signature verification of the encrypted content signature file (ECS file), and processing for determining whether or not content can be reproduced, such as signature verification performed on the encrypted content signature file (ECS file) and content reproduction are executed based on the reproduction processing program.

For example, when the signature verification performed on the encrypted content signature file (ECS file) has not been successfully made, reproduction of the content is inhibited.

The license issuer (LA) 101 provides licenses as permission of issuing ECS files to the encrypted content signature (ECS) issuers 102-1 to n.

The license issuer (LA) 101 confirms validity of the (B) encrypted content signature (ECS) issuers 102-1 to n based on a prescribed license issuing sequence, and when it confirms the validity, issues license to the encrypted content signature (ECS) issuers.

In addition, the license is specifically a public key certificate with a signature by a secret key of the license issuer (LA) 101, for example. On the public key certificate, a public key of the encrypted content signature (ECS) issuer 102 is stored. In addition, (A) the license issuer (LA) 101 also provides a secret key corresponding to the public key stored on the public key certificate to the encrypted content signature (ECS) issuer 102.

Next, description will be given of processing executed by the (A) license issuer (LA) 101, the (B) encrypted content signature (ECS) issuer 102, and the (C) content provider (content server) 103 with reference to FIG. 8.

Figure 8:
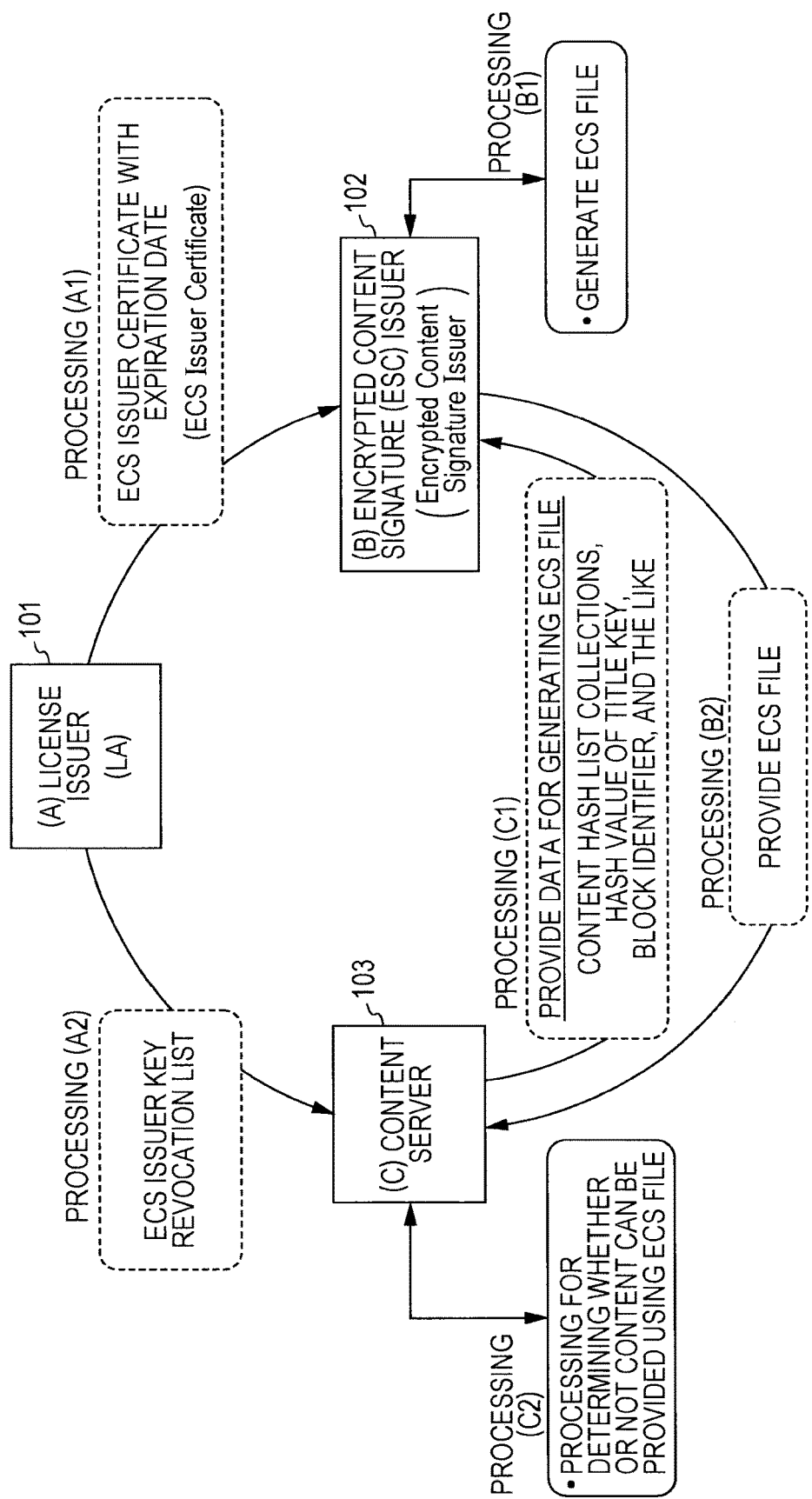
FIG. 8 is a diagram illustrating a data flow between apparatuses applied to prevent improper use of content.

FIG. 8 is a diagram showing the three apparatuses, namely the (A) license issuer (LA) 101, the (B) encrypted content signature (ECS) issuer 102, and the (C) content provider (content server) 103 and representative processing executed by each of the apparatuses.

The processing executed by the license issuer (LA) 101 is shown as processing (A1) and (A2).

The license issuer (LA) 101 executes the following processing, namely
the processing (A1) in which the license issuer (LA) 101 provides an ECS issuer certificate with an expiration date to the encrypted content signature (ECS) issuer 102 and the processing (A2) in which the license issuer (LA) 101 provides an ECS issuer key revocation list to the content provider 103.

The processing executed by the encrypted content signature (ECS) issuer 102 is shown as processing (B1) and (B2).

The encrypted content signature (ECS) issuer 102 executes the following processing, namely
the processing (B1) in which the encrypted content signature (ECS) issuer 102 generates an encrypted content signature file (ECS file) and the processing (B2) in which the encrypted content signature (ECS) issuer 102 provides the encrypted content signature file (ECS file) to the content provider 103.

The processing executed by the content provider 103 is shown as processing (C1) and (C2).

The content provider 103 executes the following processing, namely
the processing (C1) in which the content provider 103 provides data for generating an ECS file such as content hash list collections, a hash value of a title key, a block identifier, and the like to the encrypted content signature (ECS) issuer 102 and
the processing (C2) in which the content provider 103 performs processing for determining whether or not content can be provided using the ECS file.

[6. Concerning Configuration Example of ECS File]

Next, description will be given of a configuration example of an ECS file generated by the encrypted content signature (ECS) issuer 102.

FIGS. 9A and 9B show a data configuration example of the ECS issuer certificate which is also set as configuration data of the ECS file.

The ECS file is a file generated by the encrypted content signature (ECS) issuer 102, which is a file storing thereon the content hash list collections received from the content provider 103, the hash value of the title key, the block identifier, and the like as configuration data.

As shown in FIG. 9A, the ECS file is a file including data of
(1) content hash list collections,
(2) ECS issue date,
(3) block identifier (PAD block number),
(4) signature by ECS issuer,
(5) ECS issuer certificate, and
(6) content block table (stored content block table).

The (1) content hash list collections are data generated by the content provider (content server) 103 and received by the encrypted content signature (ECS) issuer 102. The (1) content hash list collections are data including a hash value, which is generated based on content configuration data generated based on content provided to the user apparatus, specifically content such as a movie reproduced by the user apparatus, and attribute information thereof (information on offset representing a position or the like of a content block as a generation source of the hash value, length, and the like).

The (2) ECS issue date is information on date on which the ECS file is generated by the encrypted content signature (ECS) issuer 102.

The information on date corresponds to date on which the (4) signature by ECS issuer is generated.

The (3) block identifier (PAD block number) is data delivered from the content provider (content server) 103 to the encrypted content signature (ECS) issuer 102 and is a block identifier of a protected area in a medium which stores a title key as an encryption key corresponding to the content provided to the user device 104 by the content provider 103. The (3) block identifier (PAD block number) is a block identifier of the protected area in the medium, which can be used by the content provider 103.
(4) signature by ECS issuer (ECS signature)

As described above with reference to FIGS. 3, 6, and the like, a block in the protected area in the medium, which can be used by the content provider, is set in advance, and access permitted block information is recorded.

The (4) signature by ECS issuer is an electronic signature of the ECS issuer.

Data as a target of the signature is configuration data including the content hash list collections, the ECS issue date, the block identifier, the title key (hash value), and the like.
(5) ECS issuer certificate The (5) ECS issuer certificate is a public key certificate corresponding to the ECS issuer 102, which stores a public key and the like of the ECS issuer 102 as shown in FIG. 9B. The configuration thereof will be described later.
(6) content block table (stored content block table)

The (6) content block table (stored content block table) is set as a field in which correspondence information between each hash list and content is recorded when hash lists corresponding to a plurality of content items are recorded in the content hash list collections.

Next, description will be given of a data configuration of the ECS issuer certificate shown in FIG. 9B.

The ECS issuer certificate is generated by the license issuer (LA) 101 and provided to the ECS issuer 102. The ECS issuer 102 provides data necessary for generating the ECS issuer certificate to the license issuer (LA) 101 and requests generation of the ECS issuer certificate.

The license issuer (LA) 101 generates the ECS issuer certificate in response to the request.

As shown in FIG. 9B, the ECS issuer certificate is a file including data of
(1) ECS certificate ID,
(2) block identifier start number (start PAD block number),
(3) block identifier range (PAD block number counter),
(4) issuer certificate expiration date,
(5) ECS issuer public key, and
(6) signature by LA.

The (1) ECS certificate ID is an identification of the ECS certificate.

The (2) block identifier start number (start PAD block number) is a start number of an access permitted block in the protected area in the medium, which the ECS issuer 102 can permit the content provider 103 to access.

The (3) block identifier range (PAD block number counter) is information representing a range from the start number of the access permitted block in the protected area in the medium, which the ECS issuer 102 can permit the content provider 103 to access.

The (4) issuer certificate expiration date is information on an expiration date of the certificate of the issuer.

The (5) ECS issuer public key is a public key of the ECS issuer.

The (6) signature by LA is an electronic signature of the license issuer (LA) shown in FIGS. 7 and 8. The (6) signature by LA is an electronic signature which is generated based on the above configuration data (1) to (5) of the ECS issuer certificate.

Figure 11:
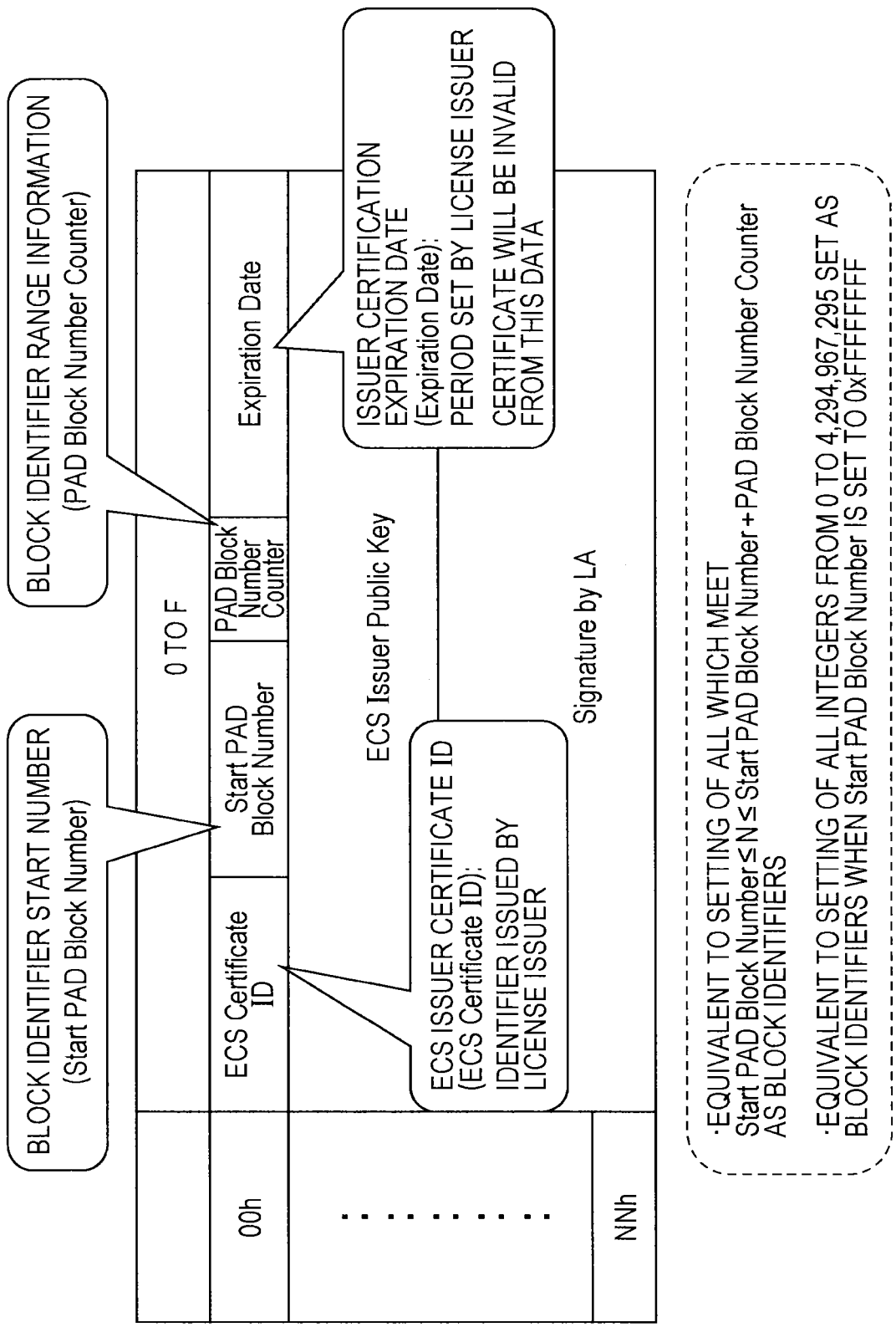
FIG. 11 is a diagram illustrating a configuration example of an ECS issuer certificate included in the encrypted content signature file (ECS file)

FIG. 10 is a diagram showing syntax of the ECS file, and FIG. 11 is a diagram showing syntax of the ECS issuer certificate.

In addition, two data items recorded in the ECS issuer certificate, namely
(2) block identifier start number (start PAD block number) and
(3) block identifier range (PAD block number counter)
are information representing an access permitted block in the protected area in the medium, which the ECS issuer 102 can permit the content provider 103 to access.

Specifically, the information is equivalent to setting all which satisfy block identifier start number N block identifier start number+block identifier range as block identifiers.

In addition, setting of
block identifier start number=0xFFFFFFFF
represents that all blocks in the protected area in the medium are access permitted blocks.

Although the above description was given of the configuration in which the ECS file includes the ECS issuer certificate in the examples described with reference to FIGS. 9 to 11, another configuration is also applicable in which the ECS file does not include the ECS issuer certificate and the ECS file and the ECS issuer certificate are configured as individual files.

[7. Concerning Configuration of ECS Issuer Certificate Revocation List]

Next, description will be given of a configuration of the ECS issuer certificate revocation list with reference to FIG. 12.

The ECS issuer certificate revocation list (ECS issuer key revocation list) is a list issued by the license issuer (LA) 101 as described above with reference to FIG. 8. The list is used by the content provider 103, for example.

The license issuer (LA) 101 invalidates the ECS issuer certificate (see FIG. 9B) with a public key of the ECS issuer, which has been determined to be improper, stored thereon and generates the ECS issuer certificate revocation list as a list in which an identifier (ID) of the invalidated ECS issuer (specifically, the ECS issuer certificate) is registered.

As shown in FIG. 12, the ECS issuer certificate revocation list stores the following data thereon. That is, data of (1) version,
(2) number of entries,
(3) ID of revoked (invalidated) ECS issuer certificate,
(4) revocation date of revoked ECS issuer certificate, and
(5) electronic signature of license issuer (LA) 101 are stored.

The (5) electronic signature of license issuer (LA) 101 is a signature for the data (1) to (4).

In addition, when an improper ECS issuer is newly found, the ID of the ECS issuer is added to the ECS issuer revocation list, and an updated list of new version is successively issued and provided to the content provider 103.

[8. Concerning Processing for Generating Encrypted Content Signature File (ECS File)]

Next, description will be given of processing for generating the encrypted content signature file (ECS file) with reference to FIG. 13.

The encrypted content signature file (ECS file) is generated by the encrypted content signature (ECS) issuer 102 based on a generation request from the content provider (content server) 103.

When the content provider (content server) 103 provides new content such as movie content to the user device 104, the content provider (content server) 103 requests the generation of an encrypted content signature file (ECS file) corresponding to the content to the encrypted content signature (ECS) issuer 102.

The encrypted content signature (ECS) issuer 102 generates the encrypted content signature file (ECS file) in response to the request and provides the encrypted content signature file (ECS file) to the content provider (content server) 103.

Figure 13:
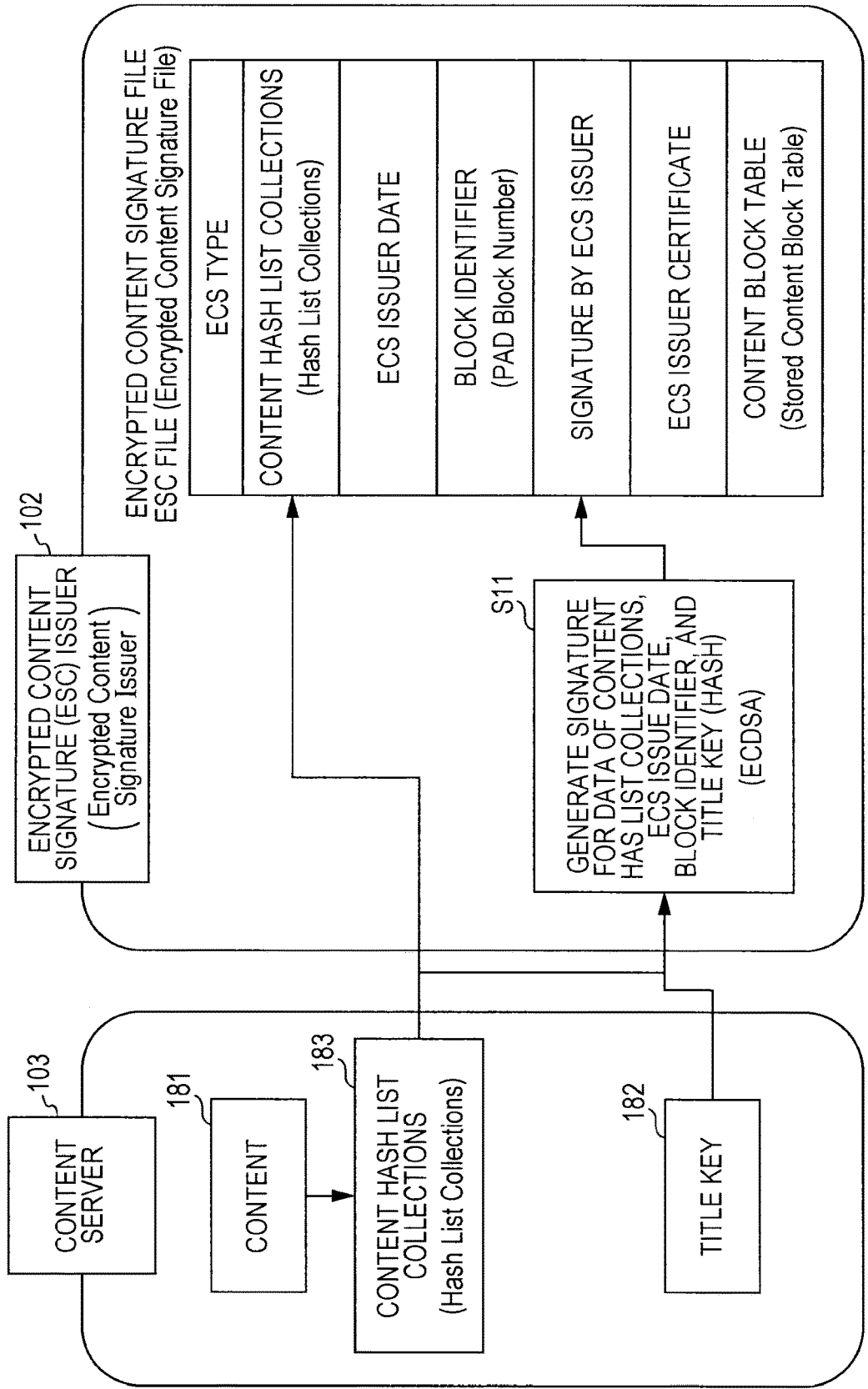
FIG. 13 is a diagram illustrating outlines of processing for generating the encrypted content signature file (ECS file) and a data configuration.

FIG. 13 is a diagram illustrating processing executed by the content provider (content server) 103 and the encrypted content signature (ECS) issuer 102 in the processing for generating the encrypted content signature file (ECS file).

The content provider (content server) 103 generates content hash list collections 183 including hash values generated based on the configuration data (content block) of the content 181 as shown in FIG. 13 in requesting the generation of a new encrypted content signature file (ECS file).

In addition, the content hash list collections 183 is generated as content hash list collections which store hash values generated based on the configuration data (content block) of the encrypted content provided to the user device 104.

The content provider (content server) 103 provides the generated content hash list collections 183 to the encrypted content signature (ECS) issuer 102.

Furthermore, the content provider (content server) 103 also provides a title key 182 as an encryption key to be applied to encrypt content 181 or a hash value of the title key to the encrypted content signature (ECS) issuer 102.

The content hash list collections 183 are data including the hash values, which are generated based on content configuration data generated based on content provided to the user device, specifically content such as a movie reproduced by the user device, and attribute information thereof.

In addition, the attribute information includes information on positions of content blocks for which the hash values have been calculated, for example.

In Step S11 shown in FIG. 13, the encrypted content signature (ECS) issuer 102 generates a signature for data received from the content provider (content server) 103 and the configuration data of the ECS file, specifically data of the content hash list collections,
the ECS issue date,
the block identifier, and
the title key (hash).

In generating signature data, a signature is generated by applying a secret key owned by the encrypted content signature (ECS) issuer 102. For example, the signature is generated based on an ECDSA algorithm.

The generated signature is set as the configuration data of the encrypted content signature file (ECS file) as shown in FIG. 13.

As described above with reference to FIGS. 9A and 9B, an encrypted content signature file (ECS file) 200 generated by the encrypted content signature (ECS) issuer 102 includes the following data as configuration data. That is, the encrypted content signature file (ECS) is a file including data of
(1) content hash list collections,
(2) ECS issue date,
(3) block identifier (PAD block number),
(4) signature by ECS issuer,
(5) ECS issuer certificate, and
(6) content block table (stored content block table).

[9. Concerning Processing by Applying Date Information in ECS File and ECS Issuer Certificate]

Next, description will be given of processing by applying date information in the ECS file and the ECS issuer certificate.

As described above with reference to FIGS. 9A and 9B, various kinds of date information are recorded in
(1) the ECS file generated by the ECS issuer 102 to be provided to the content provider and
(2) the ECS issuer certificate generated by the license issuer (LA) 101 to be provided to the ECS issuer 10.

For example, the ECS issue date is recorded in the ECS file.

In addition, the issuer certificate expiration date is recorded in the ECS issuer certificate.

The content provide 103 executes the processing for determining whether or not the content can be provided to the user device 104 by applying the date information recorded in the ECS file and the ECS issuer certificate and the ECS issuer certificate revocation list described above with reference to FIG. 12.

In addition, the user device which receives content from the content provider 103 also executes the processing for determining whether or not the content can be reproduced by the user device 104 by applying the date information recorded in the ECS file and the ECS issuer certificate and the ECS issuer certificate revocation list described above with reference to FIG. 12.

Hereinafter, the processing will be described.

First, description will be given of processing sequences for generating the encrypted content signature file (ECS file) and providing and using content with reference to the sequence diagrams shown in FIGS. 14 and 15.

Figure 14:
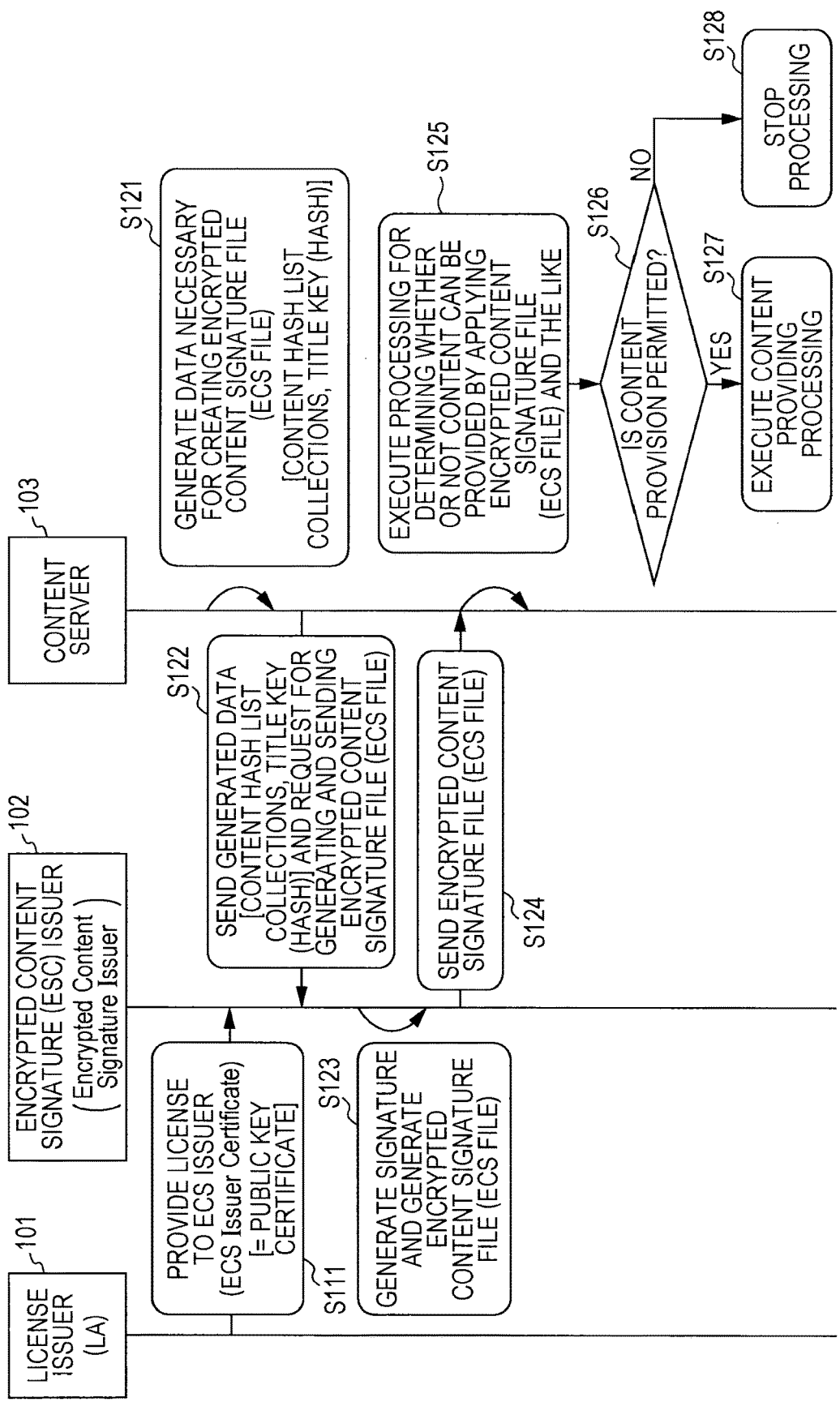
FIG. 14 is a sequence diagram illustrating generation of the encrypted content signature file (ECS file), provision of content, and a use processing sequence.

FIG. 14 shows
the license issuer 101,
the encrypted content signature (ECS) issuer 102, and the content provider 103 in this order from the left side, and processing in Steps S111 and S121 to S128 is shown as time-series processing.

The processing steps will be described.

Step S111

Step S111 is processing in which the license issuer 101 issues a license (ECS issuer certificate) for the encrypted content signature (ECS) issuer 102.

As described above with reference to FIG. 8 and the like, the license issuer 101 provides a license as permission of issuing the ECS file, namely an ECS issuer certificate to the encrypted content signature (ECS) issuer 102.

The license issuer (LA) 101 confirms the validity of the encrypted content signature (ECS) issuer 102 based on a prescribed license issuing sequence, and when it is confirmed the validity, issues the ECS issuer certificate to the encrypted content signature (ECS) issuer.

The ECS issuer certificate is a public key certificate with the data configuration described above with reference to FIG. 9B. The ECS issuer certificate stores thereon the public key of the encrypted content signature (ECS) issuer 102. In addition, the (A) license issuer (LA) 101 also provides a secret key corresponding to the public key stored on the ECS issuer certificate to the encrypted content signature (ECS) issuer.

Steps S121 to S124 are sequences for the processing for generating the encrypted content signature file (ECS file) described above with reference to FIG. 13.

The processing is sequentially executed in accordance with the provided content in order that the content provider 103 obtains the encrypted content signature file (ECS file) corresponding to new content in providing the new content to the user device.

The processing is executed between the encrypted content signature (ECS) issuer 102 and the content provider 103.

First, in Step S121, the content provider 103 generates data necessary for generating the encrypted content signature file (ECS file).

Specifically, the processing for generating the content hash list collections 183 described above with reference to FIG. 13 and the like are executed.

As described above, the content hash list collections are data including the hash values, which are generated based on the content configuration data generated based on the content provided to the user device, specifically the content such as a movie reproduced by the user device, and the attribute information thereof.

The attribute information includes information on positions of content blocks for which the hash values have been calculated, for example.

In addition, the content provider 103 also generates the title keys to be applied to content encryption and decoding processing and the hash values of the title keys as data to be provided to the encrypted content signature (ECS) issuer 102.

Next, in Step S122, the content provider 103 sends the generated data to the encrypted content signature (ECS) issuer 102 and requests generation and transmission of the encrypted content signature file (ECS file).

Next, in Step S123, the encrypted content signature (ECS) issuer 102 performs processing for generating a signature on the data received from the content provider 103.

That is, the processing for generating the signature in Step S11 described above with reference to FIG. 13 is executed.

Furthermore, the encrypted content signature file (ECS file) with the data configuration described above with reference to FIG. 9A is generated, and in Step S124, the generated encrypted content signature file (ECS) file is sent to the content provider 103.

As described above with reference to FIG. 9A, the encrypted content signature file (ECS file) includes the data of (1) content hash list collections, (2) ECS issue date, (3) block identifier (PAD block number), (4) signature by ECS issuer, (5) ECS issuer certificate, and (6) content block table (stored content block table).

The content provider 103 receives the encrypted content signature file (ECS file), and in Step S125, executes processing for determining whether or not the content can be provided in order to determine whether or not the content to which the encrypted content signature file (ECS file) has been applied is permitted.

When it is determined in Step S126 that the provision of the content is permitted, processing for providing the content to the user device is executed in Step S127.

When it is determined in Step S126 that the provision of the content is not permitted, the processing proceeds to Step S128, and the processing for providing the content is stopped.

In addition, the processing in Steps S125 to S128 will be described later in detail with reference to FIG. 16 and subsequent drawings.

Next, description will be given of sequences for providing the content from the content provider 103 to the user device 104 and for reproducing the content by the user device 104 with reference to FIG. 15.

Figure 15:
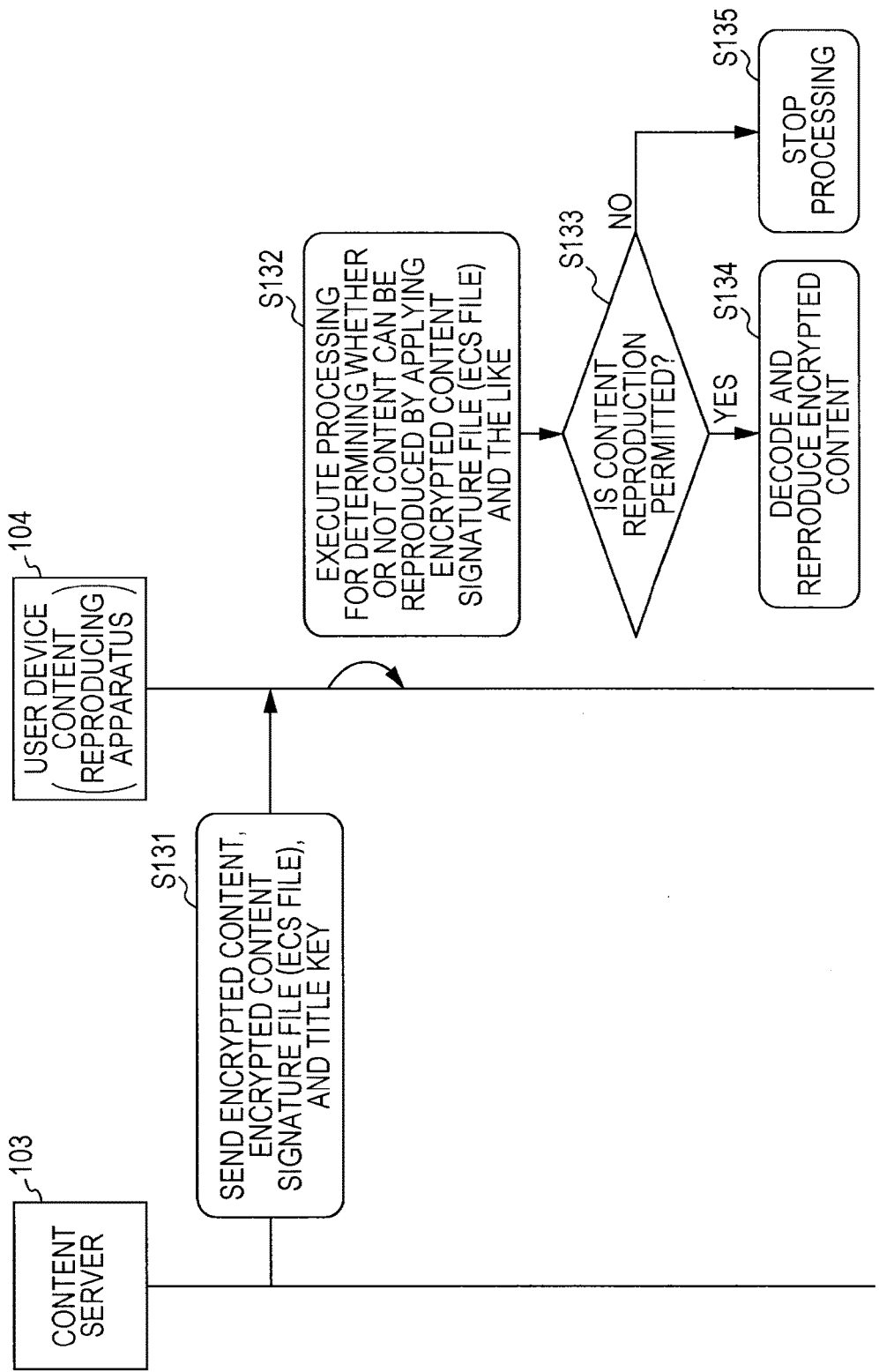
FIG. 15 is a sequence diagram illustrating generation of the encrypted content signature file (ECS file), provision of content, and a use processing sequence.

FIG. 15 shows the content provider 103 and the user device 104 in this order from the left side.

First, in Step S131, the content provider 103 sends data of (1) encrypted content, (2) encrypted content signature file (ECS file), and (3) title key to the user device.

It is assumed that the user device 104 has requested the content provider 103 to transmit the content as pre-processing of the processing in Step S131. The content provider 103 provides the content in accordance with the request from the user device.

In addition, the (1) encrypted content sent by the content provider 103 in Step S131 is content encrypted with the "(3) title key" set corresponding to the content.

In addition, the (2) encrypted content signature file (ECS FILE) is a file generated corresponding to the above (1) encrypted content, which stores thereon the configuration data of the encrypted content signature file (ECS file) described above with reference to FIGS. 9A and 9B.

The user device 104 receives the data and stores the data on a medium such as hard disk.

Thereafter, the processing in Step 132 and subsequent steps shown in FIG. 15 is executed in executing the processing for reproducing the content.

In Step S132, the user device 104 reads the encrypted content signature file (ECS file) corresponding to the content to be reproduced and executes the processing for determining whether or not the content can be reproduced in order to determine whether or not the reproduction of the content is permitted by applying the encrypted content signature file (ECS file).

When it is determined in Step S133 that the reproduction of the content is permitted, the processing for reproducing the content is executed in Step S134.

When it is determined in Step S133 that the reproduction of the content is not permitted, the processing proceeds to Step S135, and the processing for reproducing the content is stopped.

The processing in Steps S132 to S135 will be described later in detail with reference to FIG. 18.

Next, description will be given of a detailed sequence of the processing in Step S125 to S128 by the content provider described above with reference to FIG. 14, namely the processing for determining whether or not the content can be provided by applying the encrypted content signature file (ECS file) with reference to the flowcharts shown in FIGS. 16 and 17.

Figure 16:
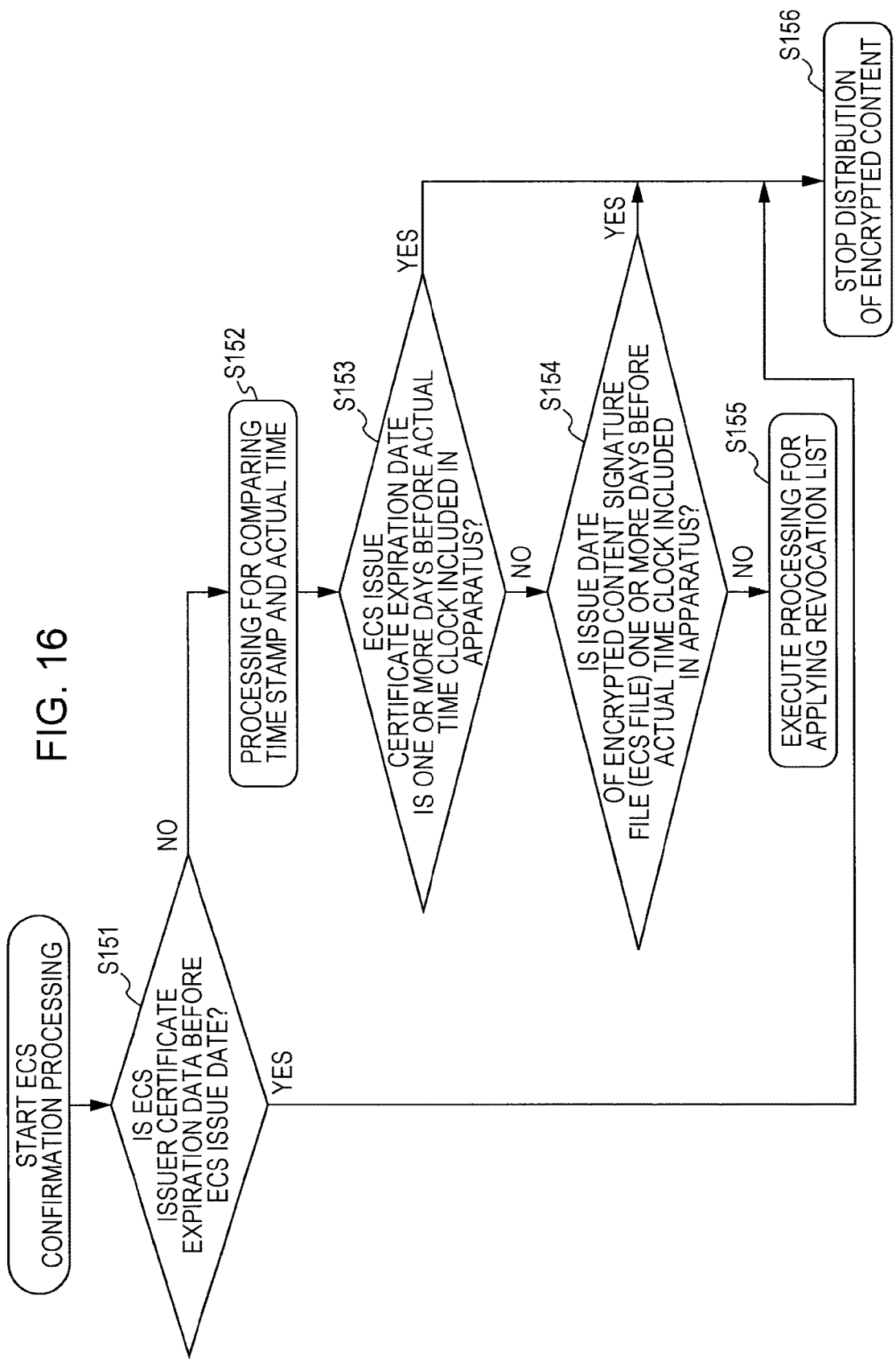
FIG. 16 is a diagram showing a flowchart illustrating a sequence of processing for determining whether or not content can be provided by applying date data recorded in the encrypted content signature file (ECS file)
Figure 17:
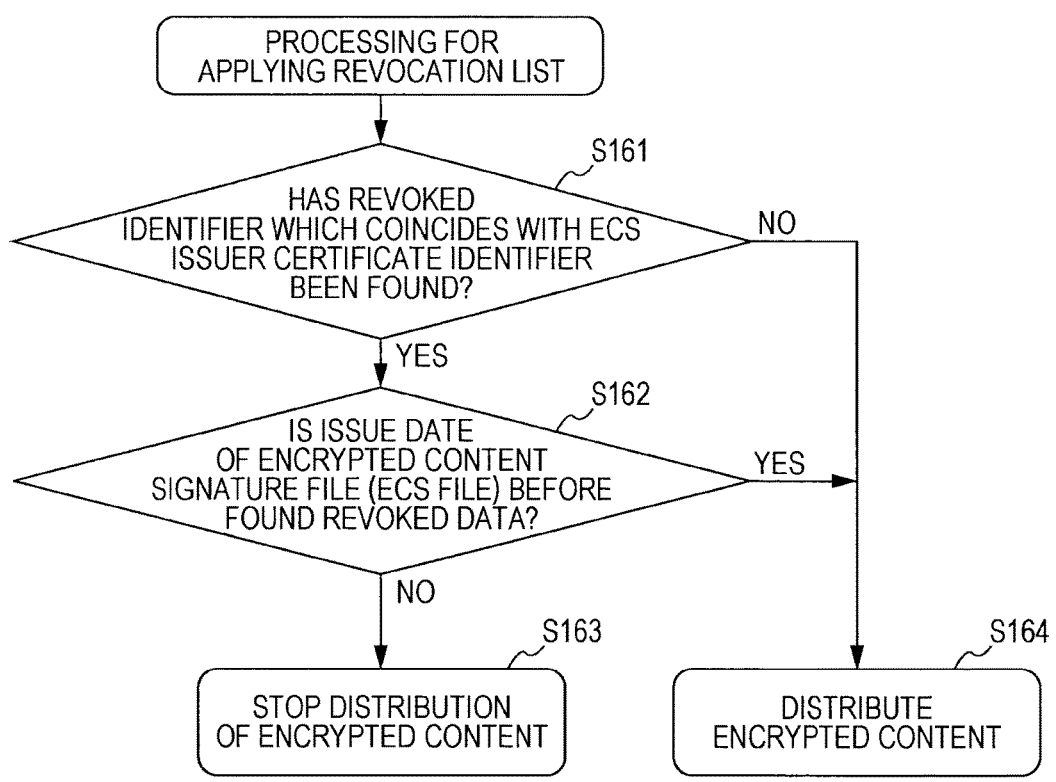
FIG. 17 is a diagram showing a flowchart illustrating a sequence of the processing for determining whether or not content can be provided by applying date data recorded in the encrypted content signature file (ECS file)

As pre-processing of Step S151 in the flowchart shown in FIG. 16, the content provider executes signature verification by applying the ECS issuer signature set in the encrypted content signature file (ECS file) received from the encrypted content signature file (ECS file) issuer.

When the signature verification is successfully made, and the validity of the encrypted content signature file (ECS file) is confirmed, the content provide further executes the signature verification on the ECS issuer certificate stored on the encrypted content signature file (ECS file). Under a condition that these two kinds of signature verification are successfully made, the processing in Step S151 and subsequent steps is executed.

When at least one of the above two kinds of signature verification is not successfully made, validity of the encrypted content signature file (ECS file) or validity of the ECS issuer certification is not confirmed, and therefore, the processing in Step S151 and subsequent steps is not executed. In such a case, the processing for providing content is also not executed.

When the two kinds of signature verification performed on the encrypted content signature file (ECS file) and the ECS issuer certificate are successfully made, and validity of the encrypted content signature file (ECS file) and validity of the ECS issuer certificate are confirmed, the content provider executes processing in Step S151.

The content provider reads the ECS issue date as data recorded in the encrypted content signature file (ECS file). Moreover, the content provider reads the ECS issuer certificate expiration date as data recorded in the ECS issuer certificate.

Furthermore, the content provider compares the data information and determines whether or not the ECS issuer certificate expiration date is before the ECS issue date.

If the ECS issuer certificate expiration date is before the ECS issue date (Yes), the content provider moves on to Step S156 and stops distribution of the encrypted content.

If the ECS issuer certificate expiration date is not before the ECS issue date (No), the content provider moves on to Step S152 and starts the processing for determining whether or not the content can be provided by applying the time information (time stamp) recorded in the encrypted content signature file (ECS file) and the ECS issuer certificate in Step S153 and subsequent steps.

In Step S153, the content provider compares the ECS issuer certificate expiration date with a time clock owned by the content provider or the actual time obtained from reliable time information providing server.

If the ECS issuer certificate expiration date is one or more days before the actual time, the content provider moves on to Step S156 and stops the processing for providing the content.

On the other hand, if the ECS issuer certificate expiration date is not one or more days before the actual time, the processing proceeds to Step S154.

In Step S154, the content provider compares the ECS issue date with the time clock owned by the content provider or the actual time obtained from the reliable time information providing server.

If the ECS issue date is one or more day before the actual time, the content provider moves on to Step S156 and stops the processing for providing the content.

On the other hand, if the ECS issue date is not one or more days before the actual time, the processing proceeds to Step S155.

Next, description will be given of the processing for determining whether or not content can be provided by applying the revocation list, which is executed in Step S155 and subsequent steps, with reference to the flowchart shown in FIG. 17.

In addition, it is assumed that the content provider has obtained in advance the ECS issuer public key revocation list described above with reference to FIG. 12. For example, the ECS issuer public key revocation list can be obtained from the license issuer (LA) 101.

In Step S161, the content provider obtains an ECS certificate identifier from the ECS issuer certificate and determines whether or not the identifier (ID) is registered in the ECS issuer public key revocation list.

When the identifier is not registered in the ECS issuer public key revocation list (No), it is confirmed that the ECS issuer certificate has not been invalidated (revoked) and is still valid, and in such a case, the content provider moves on to Step S164 and executes the processing for providing the content.

On the other hand, it is determined in Step S161 that the ECS certificate identifier (ID) is registered in the ECS issuer public key revocation list (Yes), the processing proceeds to Step S162.

In Step S162, data items relating to two dates, that is, the data, on which the ECS issuer certificate was invalidated (revoked), which is registered in the ECS issuer public key revocation list, namely the revoked date and ECS issue date as data recorded in the encrypted content signature file (ECS file) are compared.

When the ECS issue date as the data recorded in the encrypted content signature file (ECS file) is before the revoked date (Yes), the content provider moves on to Step S164 and executes the processing for providing the content.

This is because it is possible to determine that the processing is based on a proper ECS issuer certificate before revocation.

On the other hand, when the ECS issue date as the data recorded in the encrypted content signature file (ECS file) is not before the revoked date in Step S162 (No), the content provider moves on to Step S163 and stops the processing for providing the content.

This is because it is possible to determine that the processing is based on an improper ECS issuer certificate after revocation.

Next, detailed description will be given of the processing for determining whether or not reproduction of the content by applying the encrypted content signature file (ECS file) in the user device 104 described above with reference to Steps S132 to S135 in FIG. 14 can be permitted, with reference to the flowchart shown in FIG. 18.

Figure 18:
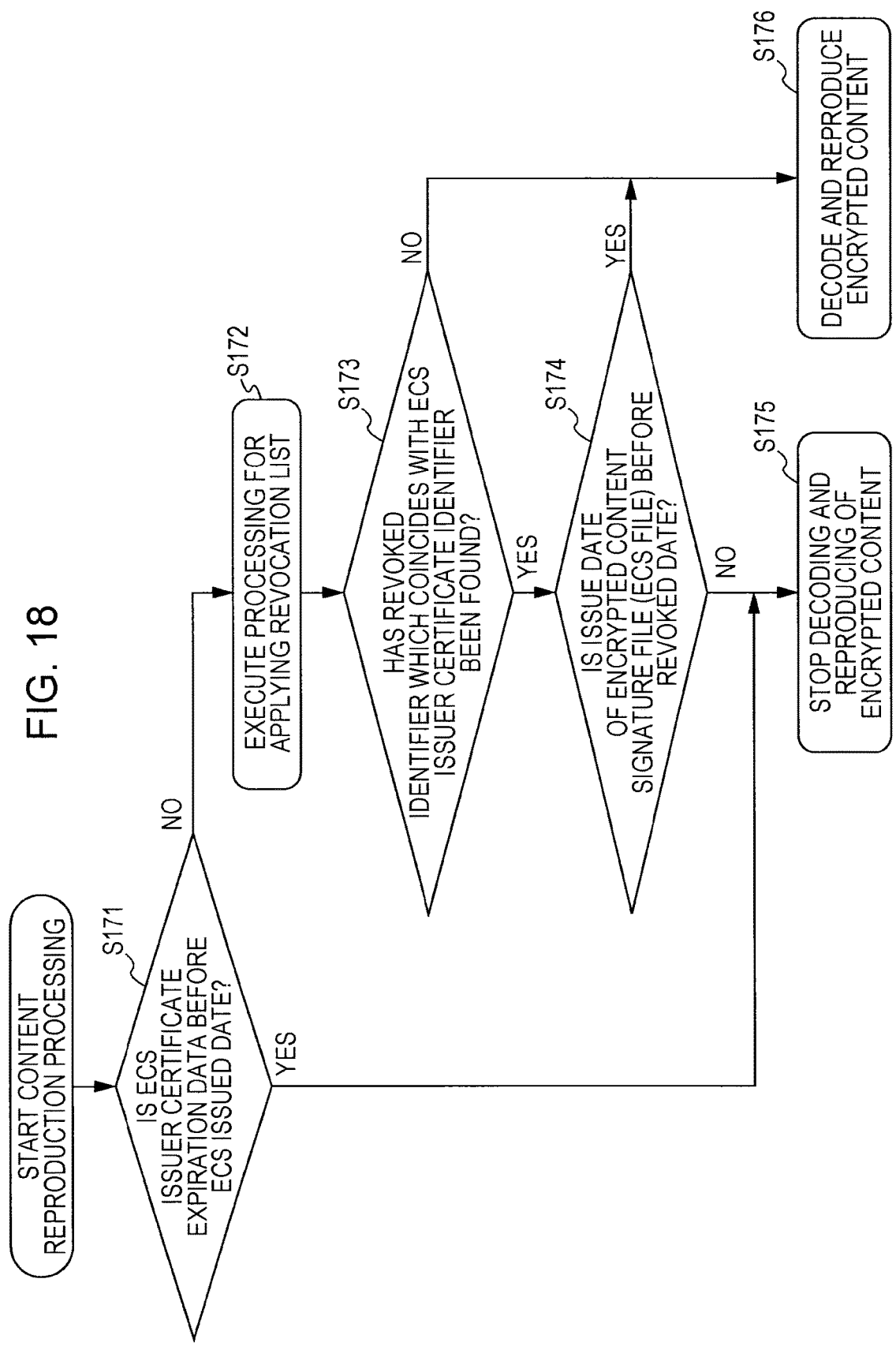
FIG. 18 is a diagram showing a flowchart illustrating a sequence of processing for determining whether or not content can be reproduced by applying date data recorded in the encrypted content signature file (ECS file)

Before Step S171 shown in FIG. 18, the user device executes the signature verification by applying the ECS issuer signature set in the encrypted content signature file (ECS file) received from the content provider.

When the signature verification is successfully made, and validity of the encrypted content signature file (ECS file) is confirmed, the user device further executes the signature verification on the ECS issuer certificate stored on the encrypted content signature file (ECS file). Under a condition that these two kinds of signature verification are successfully made, the processing in Step S171 and subsequent steps is performed.

When at least one of the two kinds of signature verification is not successfully made, validity of the encrypted content signature file (ECS file) or validity of the ECS issuer certificate is not confirmed, and therefore, the processing in Step S171 and subsequent steps is not executed. In such a case, the processing for reproducing the content is also not executed.

When the two kinds of signature verification performed on the encrypted content signature file (ECS file) and the ECS issuer certificate are successfully made, and validity of the encrypted content signature file (ECS file) and validity of the ECS issuer certificate are confirmed, the user device executes the processing in Step S171.

In Step S171, the user device reads the ECS issue date as data recorded in the encrypted content signature file (ECS file).

Moreover, the user device reads the ECS issuer certificate expiration date as data recorded in the ECS issuer certificate.

Furthermore, the user device compares the date information items and determines whether or not the ECS issuer certificate expiration date is before the ECS issue date.

When the ECS issuer certificate expiration date is before the ECS issue date (Yes), the processing proceeds to Step S175, and processing for decoding and reproducing the content is not executed.

This is because the ECS issuer certificate is confirmed to be an expired ECS issuer certificate.

On the other hand, when the ECS certificate issuer expiration date is not the ECS issue date in Step S171 (No), the processing proceeds to Step S172, and the processing for determining whether or not the content can be provided by applying the revocation list in Step S173 and subsequent steps.

In addition, it is assumed that the user device obtains in advance the ECS issuer public key revocation list described above with reference to FIG. 12. For example, the user device can obtain the ECS issuer public key revocation list from the license issuer (LA) 101, for example.

In Step S173, the user device obtains the ECS certificate identifier from the ECS issuer certificate and determines whether or not the identifier (ID) is registered in the ECS issuer public key revocation list.

When the identifier is not registered (No), it is confirmed that the ECS issuer certificate has not been invalidated (revoked) and is still valid, and in such a case, the user device moves on to Step S176 and executes the processing for reproducing the content.

Before starting the processing for reproducing the content, processing for obtaining and generating a title key to be applied to the decoding of the encrypted content, and further, processing for cross-checking the hash value by applying the content hash list included in the encrypted content signature file are executed. When the cross-checking is successfully made, and it is confirmed that no falsity has been made in the content, the reproduction of the content is permitted.

On the other hand, when it is determined in Step S173 that the ECS certificate identifier (ID) is registered in the ECS issuer public key revocation list (Yes), the processing proceeds to Step S174.

In Step S174, two data items relating to the date, namely the date on which the ECS issuer certificate registered in the ECS issuer public key revocation list was invalidated (revoked), that is, revoked date and the ECS issue date as data recorded in the encrypted content signature file (ECS file)

are compared.

When the ECS issue date as data recorded in the encrypted content signature file (ECS file) is before the revoked date (Yes), the processing proceeds to Step S176, and the processing for reproducing the content is executed.

This is because it can be determined that the processing is based on a proper ECS issuer certificate before revocation.

On the other hand, when the ECS issue date as data recorded in the encrypted content signature file (ECS file) is not before the revoked date in Step S173 (No), the processing proceeds to Step S175, and the processing for reproducing the content is stopped.

This is because it can be determined that the processing is based on an improper ECS issuer certificate after revocation.

[10. Concerning Configuration of Associating Encryption Key and ECS Issuer Signature]

Next, description will be given of a configuration associating the encryption key and the ECS issuer signature.

As described above with reference to FIGS. 3 and 6, the user device 104 records and uses content and the like in a memory card configured by a flash memory, for example.

As described above with reference to FIG. 3, the storage area in the memory card 31 is configured by two areas, namely (a) the protected area 51 and (b) the general purpose area 52.

The (b) general purpose area 52 is an area which a recording and reproducing apparatus used by the user can access, and content, a usage rule corresponding to the content, other general content management data, and the like are recorded therein.

The general purpose area 52 is an area which the server or the recording and reproducing apparatus of the user can freely write data to or read data from.

On the other hand, the (a) protected area 51 is an area which does not permit free access.

The protected area 51 is divided into a plurality of blocks (#0, #1, #2, . . . ) as divided areas, and an access right is set in units of blocks.

For example, when the recording and reproducing apparatus used by the user or the server connected via a network tries to write or read data, the data processing unit of the memory card 31 determines whether or not reading or writing can be performed in units of blocks for each apparatus based on a program stored on the memory card 31 in advance.

The memory card 31 is provided with the data processing unit for executing the program stored in advance and the authentication processing unit for executing authentication processing and performs the authentication processing on the apparatus which tries to write data to or read data from the memory card 31.

In the step of the authentication processing, an apparatus certificate such as a public key certificate is received from the counterpart apparatus, namely the access requesting apparatus.

For example, when the access requesting apparatus is the server, the server certificate owned by the server, which was described above with reference to FIG. 5, is received, and it is determined whether or not access can be permitted in units of blocks (divided areas) in the protected area 51 using the information described in the certificate.

In addition, when the access requesting apparatus is a host device, for example, a recording and reproducing apparatus (host) as a user device which records and reproduces the content, the host certificate owned by the recording and reproducing apparatus (host), which was described above with reference to FIG. 4, is received, and it is determined whether or not access to each block (divided area) in the protected area 51 can be permitted using the information described in the certificate.

The processing for determining the access right is performed in units of blocks (#0, #1, #2, . . . ) in the protected area 51 shown in FIG. 3. The memory card 31 causes the server or the host to execute only the processing (data reading/writing processing and the like) permitted in units of blocks.

Description will be given of a data recording configuration example when a medium is mounted on the user device 104 to record content received from the content provider 103 with reference to FIG. 19.

Figure 19:
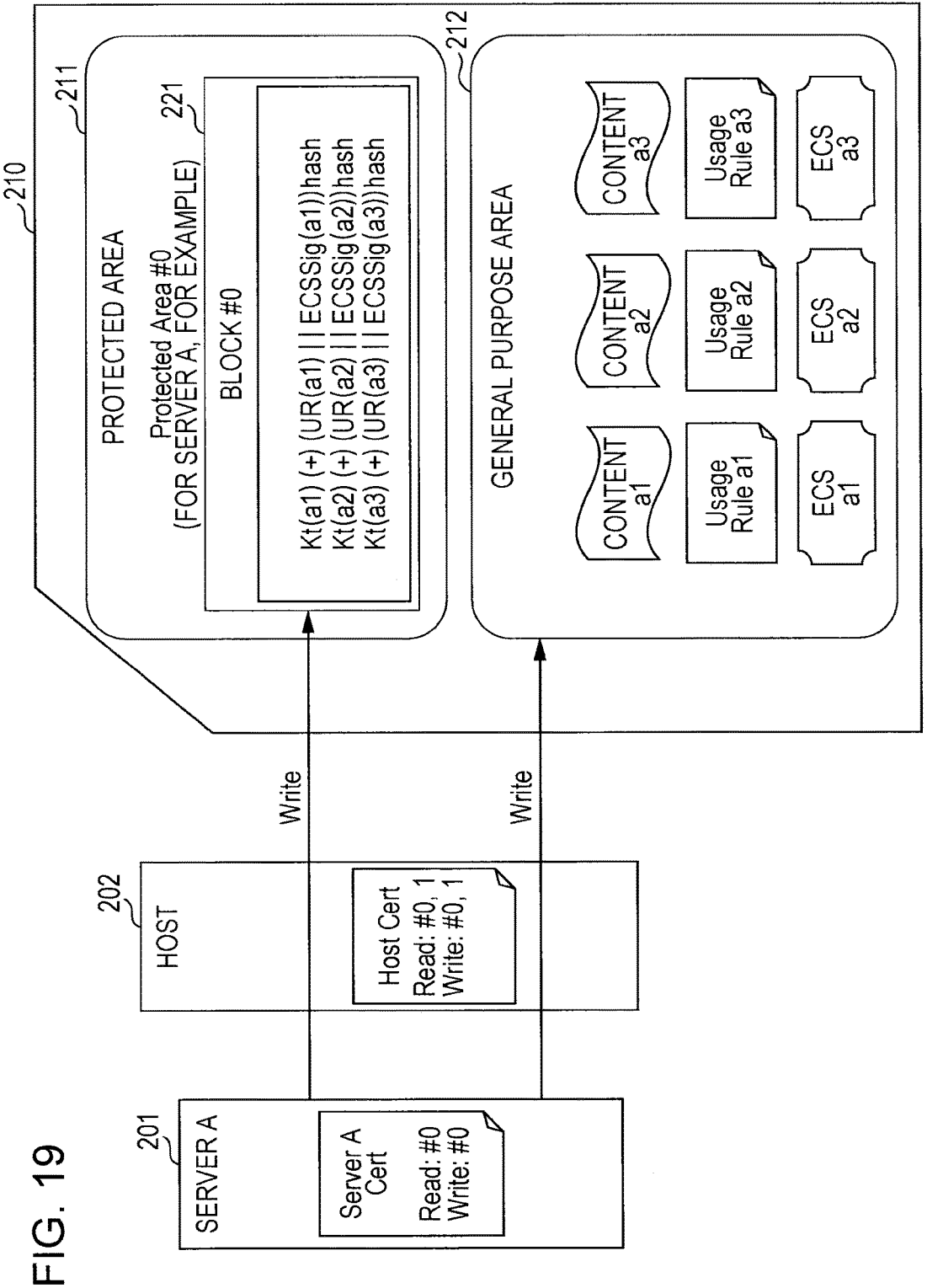
FIG. 19 is a diagram illustrating an example of processing for recording data in a memory card by a server.

FIG. 19 shows an example of processing in which a server A201 as the content provider provides the encrypted content to a memory card 210 mounted on a host 202 as the user device and records the encrypted content therein.

The memory card 210 includes
a protected area 211 and
a general purpose area 212.

The server A201 as the content provider records a title key to be applied to encryption and decoding of the provide content in a predetermined block in the protected area in performing the processing for providing the encrypted content.

The server A201 owns the server certificate described above with reference to FIG. 5.

First, the server A201 executes processing to mutually authenticate the memory card 210. On this occasion, the server certificate is output to the memory card 210.

The memory card 210 confirms information on a protected area access right recorded in the server certificate received from the server A201.

Only when it is determined that the server A201 has the access right (writing right) to the block #0 in the confirmation processing, the server A201 can write data in the block #0 in the protected area 211 set in the memory card 210.

As shown in the drawing, the server A201 stores the title key to be applied to the decoding of the provided content on the block #0, 221 in the protected area 211.

In addition, the title key itself is not stored as it is on the protected area, and an exclusive OR between hash values of coupled data of
(a) the usage rule and
(b) the signature by the ECS issuer as configuration data of the ECS file described above with reference to FIGS. 9A and 9B and
a title key Kt is stored thereon.

For example, a title key Kt (a1) for content (a1) is stored as the following title key conversion data on the protected area.

$$\text{Kt}(a1)(+)(\text{UR}(a1)\|\text{ECSSig}(a1))\text{hash,}$$

where UR (a1) represents a usage rule corresponding to the content a1, and
ECSSig (a1) represents the signature by the ECS issuer as configuration data of the ECS file corresponding to the content a1.

In addition, each of symbols as operators means as follows. That is,
(+) represents exclusive OR, and
∥ represents data coupling, and a∥b means coupled data of data a and data b.

hash means a hash value, and (a∥b) hash means a hash value of the coupled data of the data a and the data b.

In the example shown in FIG. 19, the server A records the following content, the usage rules, and the ECS files in the general purpose area 212 in the memory card.

That is, sets of
the content Con (a1), Con (a2), and Con (a3),
the usage rules UR (a1), UR (a2), and UR (a3) corresponding to the above content, and
the ECS files ECS (a1), ECS (a2), and ECS (a3) corresponding to the above content are recorded.

Furthermore, the server A records the following data in the block #0, 221 in the protected area 211 in the memory card.

That is, exclusive OR (XOR) results between the title keys corresponding to the content and the hash values of the coupled data between the usage rules corresponding to the content and the ECS issuer signatures, namely $$\text{Kt}(a1)(+)(\text{UR}(a1)\|\text{ECSSig}(a1))\text{hash}$$

$$\text{Kt}(a2)(+)(\text{UR}(a2)\|\text{ECSSig}(a2))\text{hash}$$

$$\text{Kt}(a3)(+)(\text{UR}(a3)\|\text{ECSSig}(a3))\text{hash}$$

are recorded therein.

While FIG. 19 shows the processing example by the server A201, another server B stores same title key conversion data, for example, data of $$\text{Kt}(bx)(+)(\text{UR}(bx)\|\text{ECSSig}(bx))\text{hash}$$

of content provided by the server B on a predetermined block, for example, a block #1 in the protected area, which is permitted as an area for storing a title key corresponding to content (bx) provided by the server B.

Figure 20:
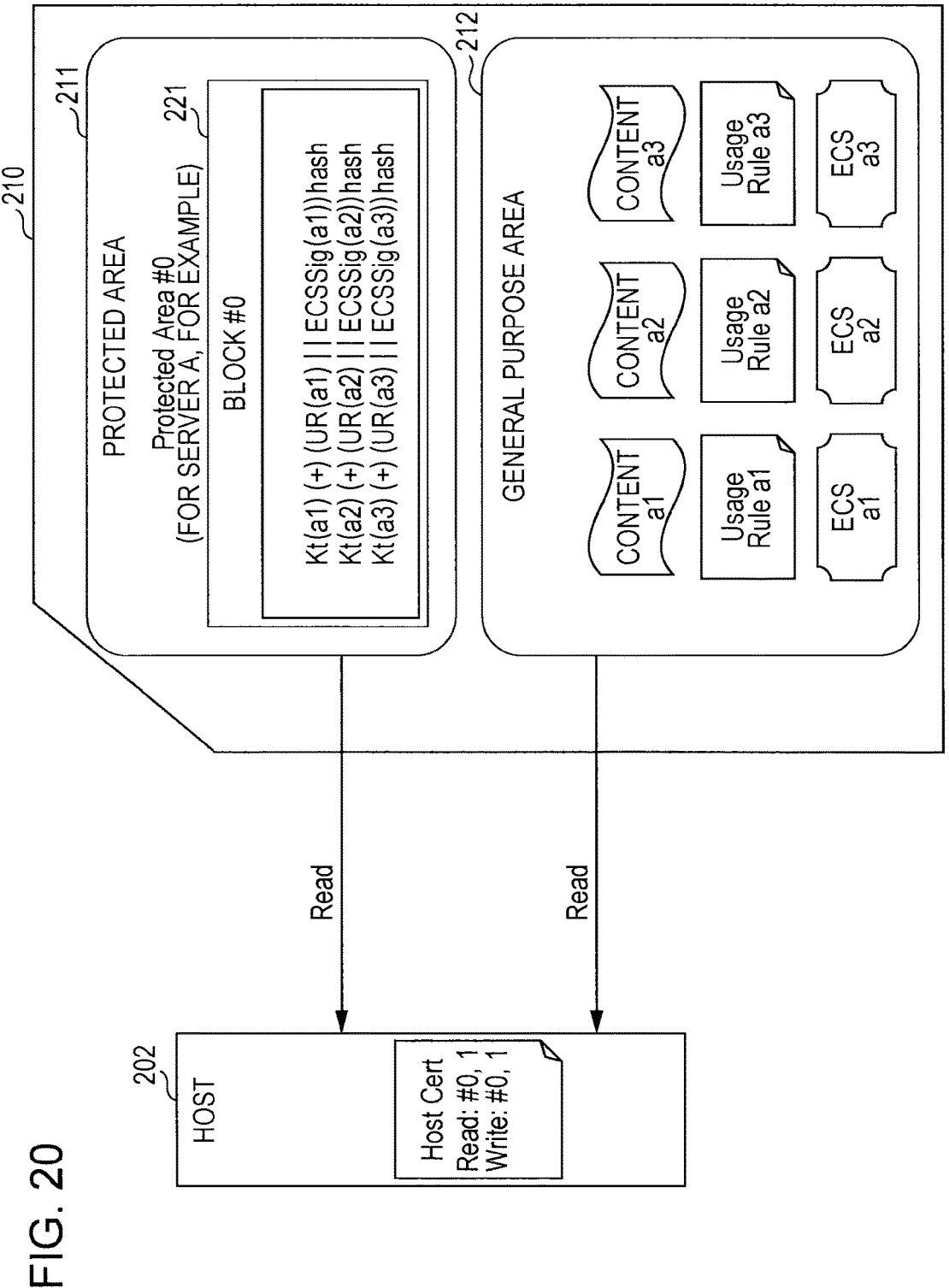
FIG. 20 is a diagram illustrating an example of processing for reading data recorded in the memory card by a host.

FIG. 20 shows the user device (host) 202 which uses the content and the memory card 210 which stores the content and the like thereon.

The user device (host) 202 owns the host certificate described above with reference to FIG. 4.

First, the user device (host) 202 executes the processing for mutually authenticating the memory card 210. On this occasion, the user device (host) 202 outputs the host certificate to the memory card 210.

The memory card 210 confirms the information on the protected area access right recorded in the host certificate received from the user device (host) 202.

Only when it is determined that the user device (host) 202 owns the access right (reading right) to the block #0 in the confirmation processing, the user device (host) 202 can read data from the block #0 in the protected area 211 set in the memory card 210.

After the mutual authentication and the access right are confirmed, the user device (host) 202 executes the following processing in order to use the content.

First, the user device (host) 202 obtains content Con (xy) to be used, a corresponding usage rule UR (xy), and an ECS file ECS (xy) from the general purpose area 212 in the memory card.

Next, referring to the usage rule UR (xy), it is confirmed on which block in the protected area the title key of the content Con (xy) to be used is stored.

An identifier of the block in which the content Con (xy) to be used is recorded in the usage rule UR (xy).

When the block storing the title key in the protected area 211 is specified, processing for reading data recorded in the block is performed.

For example, the following data is read from the selected block.

$$Kt(xy)(+)(UR(xy)\|ECSSig(xy))hash$$

Next, processing for coupling
the use rule UR (xy) and
the ECS issuer signature (xy) stored on the ECS file ECS (xy),
which are read from the general purpose area 212, and processing for calculating the hash value are performed.
That is, $$(UR(xy)\|ECSSig(xy))hash$$

is calculated.

The calculation result is represented as P (xy).

Thereafter, a title key Kt (xy) is obtained by performing the following calculation.

$$[\text{data read from block (title key conversion data)}] (+) P(xy) =$$
$$(Kt(xy) (+) (UR(xy) \| ECSSig(xy)) \text{hash}) (+) P(xy) =$$
$$(Kt(xy) (+) (UR(xy) \| ECSSig(xy)) \text{hash})$$
$$(+) (UR(xy) \| ECSSig(xy)) \text{hash}) = Kt(xy)$$

The title key Kt (xy) is obtained by the calculation processing, and the encrypted content is decoded and used with the obtained title key.

An example of data recorded in the memory card will be described with reference to FIG. 21.

FIG. 21 shows examples of data written in the memory card by two different servers, namely a server A and a server B.

The server A owns an access right to the block #0 in the protected area in the memory card.

The server B owns an access right to the block #1 in the protected area in the memory card.

Each of the servers records data as well as content in the memory card which is mounted on the host device as the user device.

The content provided by the server A is assumed to be Con (a1), Con (a2), and Con (a3).

The content provided by the server B is assumed to be Con (b1) and Con (b2).

As shown in FIG. 21, the server A records the following data in the general purpose area in the memory card.
content Con (a1), Con (a2), and Con (a3)
usage rules UR (a1), UR (a2), and UR (a3) corresponding to the above content
ECS files ECS (a1), ECS (a2), and ECS (a3) corresponding to the above contents Furthermore, the server A records the following data in the block #0 in the protected area in the memory card.
That is, the data of
conversion data of title keys Kt (a1), Kt (a2), and Kt (a3) to be applied to decoding of the content, and $$Kt(a1)(+)(UR(a1)\|ECSSig(a1))hash$$

$$Kt(a2)(+)(UR(a2)\|ECSSig(a2))hash$$

$$Kt(a3)(+)(UR(a3)\|ECSSig(a3))hash$$

is recorded therein.

On the other hand, the server B records the following data in the general purpose area in the memory card.
content Con (b1) and Con (b2)
usage rules UR (b1) and UR (b2) corresponding to the above content
ECS files ECS (b1) and ECS (b2) corresponding to the above content Furthermore, the server B records the following data in the block #1 in the protected area in the memory card.
That is, the data of
conversion data of title keys Kt (b1) and Kt (b2) to be applied to the decoding of the content, and $$Kt(b1)(+)(UR(b1)\|ECSSig(b1))hash$$

$$Kt(b2)(+)(UR(b2)\|ECSSig(b2))hash$$

are recorded.

When each of the servers records data in the block in the protected area in the memory card, the memory card confirms the access rights based on the aforementioned record in the server certificates and conforms rights to write data in the blocks, and only when the access rights are confirmed, data writing is executed.

FIG. 22 shows examples of data recording when the server A and the server B own access rights to the block #0 in the protected area in the memory card, and a server C and a server D own access rights to the block #1 in the protected area in the memory card.

The server A records the following data in the general purpose area in the memory card.
content Con (a1), Con (a2), and Con (a3)
usage rules UR (a1), UR (a2), and UR (a3) corresponding to the above content
ECS files ECS (a1), ECS (a2), and ECS (a3) corresponding to the above contents Furthermore, the server A records the following data in the block #0 in the protected area in the memory card.
That is, the data of
conversion data of title keys Kt (a1), Kt (a2), and Kt (a3) to be applied to decoding of the content, and $$Kt(a1)(+)(UR(a1)\|ECSSig(a1))hash$$

$$Kt(a2)(+)(UR(a2)\|ECSSig(a2))hash$$

$$Kt(a3)(+)(UR(a3)\|ECSSig(a3))hash$$

are recorded therein.

The server B records the following data in the general purpose area in the memory card.
Content: Con (b1) and Con (b2)
usage rules: UR (b1) and UR (b2) corresponding to the above content
ECS files: ECS (b1) and ECS (b2) corresponding to the above content Furthermore, the server B records the following data in the block #0 in the protected area in the memory card.

That is, the data of
conversion data of title keys Kt (b1) and Kt (b2) to be applied to decoding of the content, and $$Kt(b1)(+)(UR(b1)\|ECSSig(b1))hash$$

$$Kt(b2)(+)(UR(b2)\|ECSSig(b2))hash$$

is recorded.

The server C records the following data in the general purpose area in the memory card.
Content: Con (c1)
usage: rule UR (c1) corresponding to the above content
ECS file ECS: (c1) corresponding to the above content Furthermore, the server C records the following data in the block #1 in the protected area in the memory card.

That is, the data of
conversion data of title key Kt (c1) to be applied to decoding of the content, and $$Kt(c1)(+)(UR(c1)\|ECSSig(c1))hash$$

is recorded.

The server D records the following data in the general purpose area in the memory card.
Content: Con (d1) and Con (d2)
usage rule: UR (d1) and UR (d2) corresponding to the above content
ECS file: ECS (d1) and ECS (d2) corresponding to the above content Furthermore, the server D records the following data in the block #1 in the protected area in the memory card.

That is, the data of
conversion data of title keys Kt (d1) and Kt (d2) to be applied to decoding of the content, and $$Kt(d1)(+)(UR(d1)\|ECSSig(d1))hash$$

$$Kt(d2)(+)(UR(d2)\|ECSSig(d2))hash$$

is recorded.

When a user device (host) which reproduces content selects content to be reproduced from the general purpose area, it is necessary to specify a block in the protected area on which a title key thereof is stored.

The information for specifying the block is obtained from the usage rule (UR) corresponding to each content.

Figure 23:
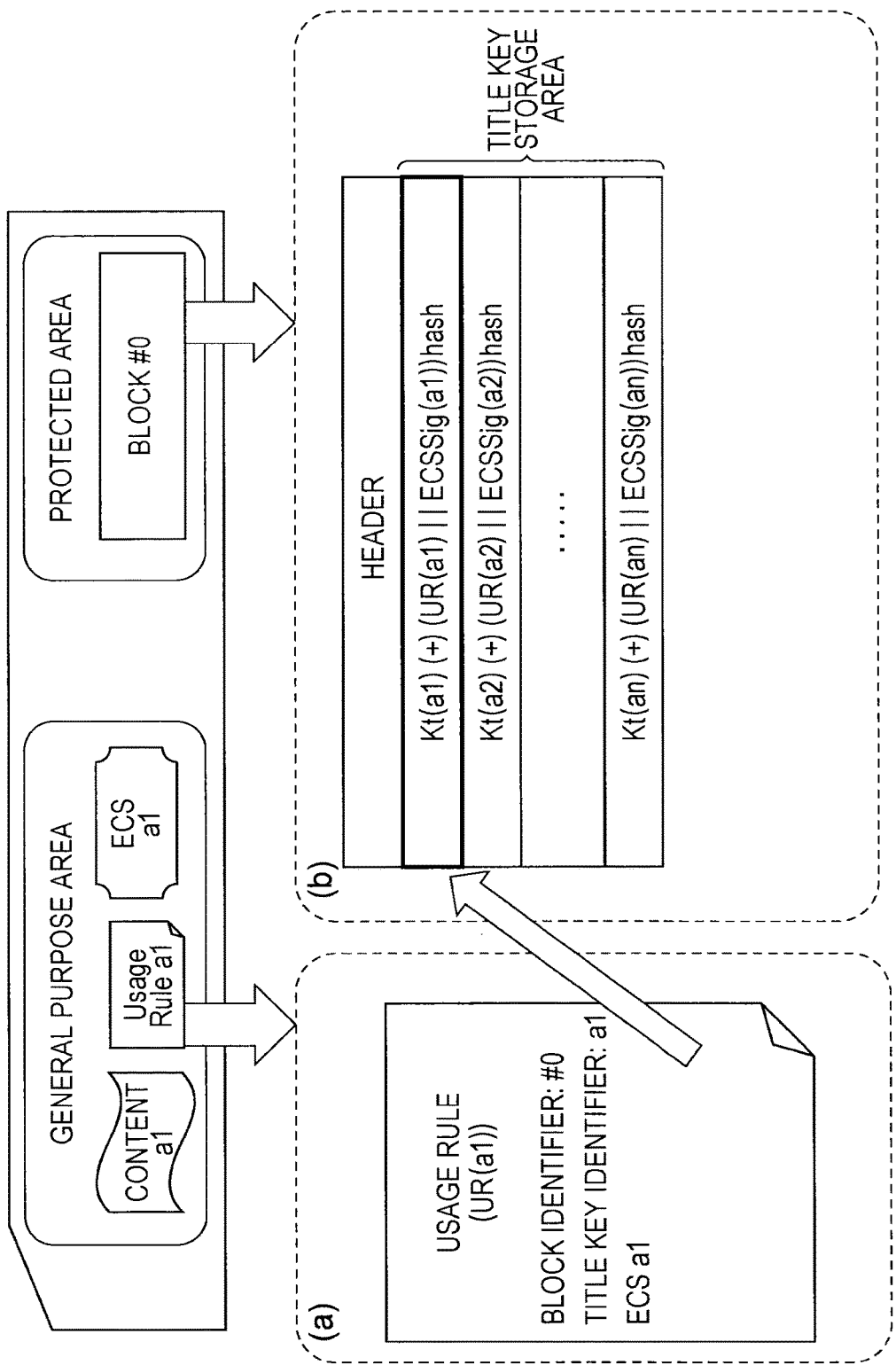
FIG. 23 is a diagram illustrating a configuration example of recorded data on a usage rule recorded in a general purpose area in the memory card.

Referring to FIGS. 23A and 23B, description will be given of an example of using a usage rule. FIG. 23A shows a specific example of the usage rule a1 corresponding to the content a1 recorded in the general purpose area in the memory card.

In the usage rule, data of
(1) block identifier (#0),
(2) title key identifier (a1), and
(3) ECS file identifier (a1)
is recorded.

The (1) block identifier is information indicating a block on which the title key Kt (a1) for the content Con (a1) corresponding to the usage rule UR (a1) is stored.

In this example, the block identifier=#0, and the user (host device) which reproduces the content can select the block #0.

The (2) title key identifier is information indicating which title key is a title key for the content Con (a1) corresponding to the usage rule UR (a1) among multiple title keys stored on the block #0.

In this example, the title key identifier=a1, and the title key Kt (a1) can be selected.

The (3) ECS file identifier (a1) is information for identifying the ECS file corresponding to the content (a1).

The user device (host) confirms on which block in the protected area the title key of the content Con (a1) to be used is stored with reference to the usage rule UR (a1) and reads the following data from the block.

$$Kt(a1)(+)(UR(a1)\|ECSSig(a1))hash$$

Next, processing for coupling
the usage rule UR (a1) and
the ECS issuer signature (ECSSig xy) stored on the ECS file ECS (a1) read from the general purpose area and processing for calculating the hash value are performed.

That is, $$P(a1)=(UR(a1)\|ECSSig(a1))hash$$

is calculated.

Thereafter, the title key Kt (xy) is obtained by performing the following calculation.

$$[\text{data read from block (title key conversion data)}] (+) P(xy) =$$
$$(Kt(a1)(+)(UR(a1)\|ECSSig(a1))hash)(+)P(a1) =$$
$$(Kt(a1)(+)(UR(a1)\|ECSSig(a1))hash)$$
$$(+)(UR(a1)\|ECSSig(a1))hash) = Kt(a1)$$

The title key Kt (a1) is obtained by the calculation processing, and the encrypted content is decoded and used with the obtained title key.

As described above, the title key recorded in the protected area in the memory card is stored as an exclusive OR (XOR) computation result with the hash value of the coupled data between the usage rule (UR) and the ECS issuer signature (ECSSig).

By performing such processing, it is possible to prevent improper use of content even in the case of divulging of a signature key (secret key) of the ECS issuer to be applied to the ECS issuer signature (ECSSig).

For example, the content providing server and the user device can prevent improper use of content by improper processing applying the divulged signature key (secret key) of the ECS issuer, specifically processing for replacing encrypted content.

In addition, the replacement means processing for encrypting other content (C2), (C3), (C4), . . . with a title key (Kt1) corresponding to certain content (C1) and providing the content to the user.

If such processing is performed, the user device which owns the title key (Kt1) can decode and reproduce other content (C2), (C3), (C4) . . . without legitimately purchasing the content (C2), (C3), (C4).

By storing the title key recorded in the protected area in the memory card as an exclusive OR (XOR) computation result with the hash value of the coupled data between the usage rule (UR) and the ECS issuer signature, (ECSSig) it is possible to prevent the aforementioned replacement.

Figure 24:
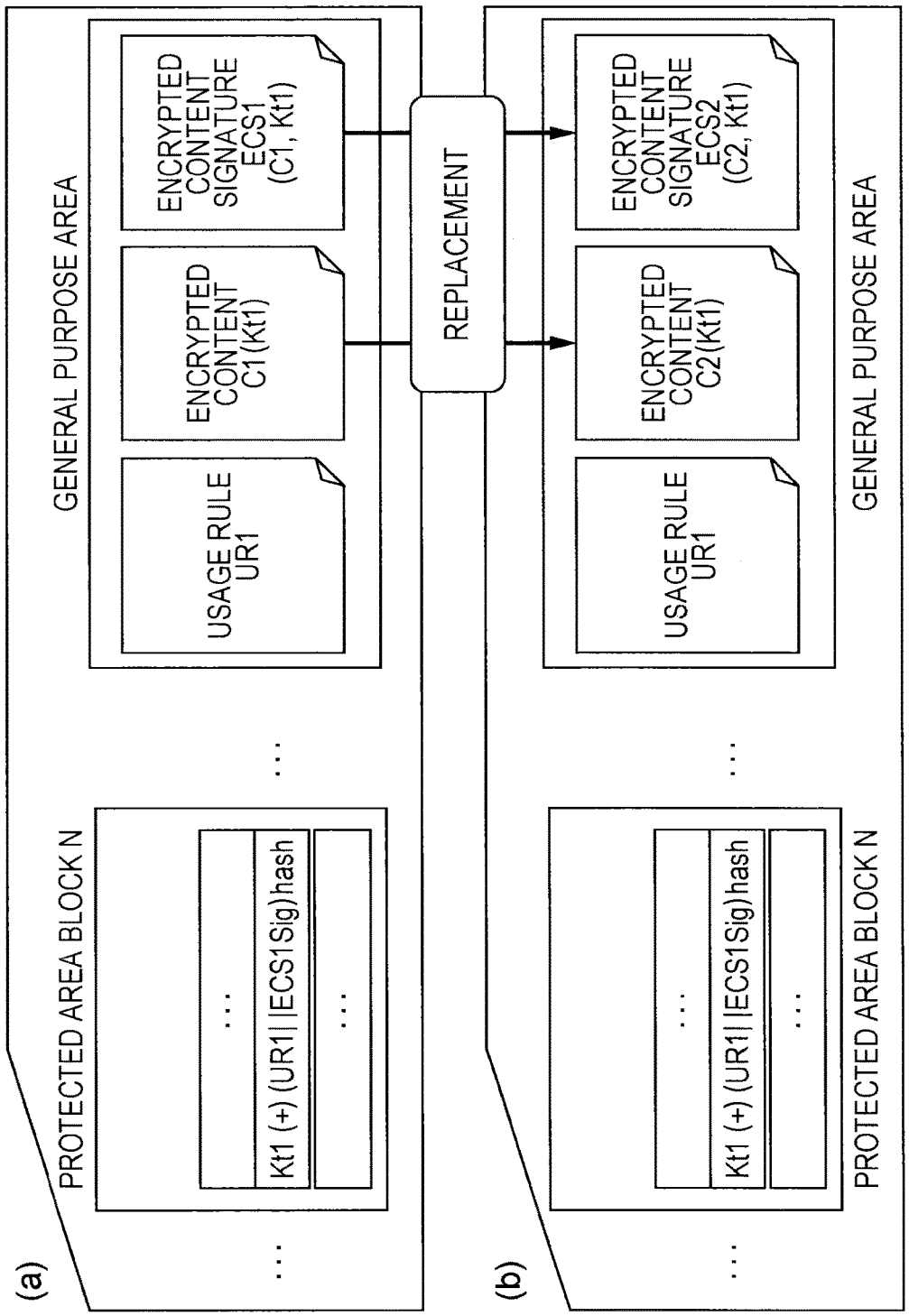
FIG. 24 is a diagram illustrating an example of use of improper content by replacement processing.

An effect obtained by preventing the replacement will be described with reference to FIGS. 24A and 24B and subsequent drawings.

FIG. 24A shows a configuration for storing proper data corresponding to the content (C1), and
FIG. 24B shows a configuration for storing replaced data by encrypting the content (C2) with the use of the title key (Kt1) corresponding to the content (C1).

In the configuration for storing proper data shown in FIG. 24A, (a1) encrypted content (C1 (Kt1)) encrypted with the proper title key (Kt1) for the content (C1),
(a2) a proper usage rule (UR1) for the content (C1), and
(a3) a properly encrypted content signature file (ECS file ECS1 (C1, Kt1)) for the content (C1)
are recorded in the general purpose area in the memory card.

In addition, the ECS issuer signature (ECSSig) is stored on the ECS file, and the ECS issuer signature (ECSSig) includes hash list collections of the content (C1) and an electronic signature generated based on data including the hash value of the title key (Kt1) as described above with reference to FIG. 13. In order to clearly show data on a generation source of the signature data, the ECS file is described as ECS1 (C1, Kt1).

In addition, in the configuration for storing proper data shown in FIG. 24A, conversion data of the title key (Kt1), namely the following data is recorded on a block N in the protected area in the memory card.

Kt1(+)(UR1∥ECS1Sig)hash, where UR1 represents the usage rule for the content 1, and ECS1Sig represents the signature by the ECS issuer as configuration data of the ECS file corresponding to the content 1.

In addition, the symbols as operators have following meanings. That is,
(+) represents exclusive OR computation,
∥ represents coupling of data, and a∥b means coupled data between data a and data b.

hash represents a hash value, and (a∥b) hash means a hash value of the coupled data between the data a and the data b.

For example, a malicious content providing server uses and provides the title key (Kt1) for the content (C1) as an encryption key for another content (C2) to the user.

As a result of delivering the improper content, "replaced data" shown in FIG. 24B is stored on the memory card.

In the configuration for storing the "replaced data" shown in FIG. 24B,
(b1) improperly encrypted content (C2 (Kt1)) encrypted with improper title key (Kt1) for the content (C2),
(b2) the usage rule (UR1) [=the usage rule (UR1) corresponding to the content (C1)] improperly associated with the content (C2), and
(b3) an encrypted content signature file (ECS2 [=ECS2 (C2, Kt1)] improperly generated so as to correspond to the content (C2)
are stored on the general purpose area in the memory card.

In addition, the improper ECS file, namely the ECS issuer signature (ECSSig) stored on the ECS2 includes hash list collections of the content (C2) and an electronic signature generated based on the divulged signature key (secret key) of the ECS issuer based on data including the hash value of the title key (Kt1) corresponding to the content (C1). In order to clearly show data on a generation source of the signature data, the ECS file is described as ECS2 (C2, Kt1).

In addition, in the configuration storing the "replaced data" shown in FIG. 24B, the conversion data of the title key (Kt1), namely the following data is recorded in the block N in the protected area in the memory card.

Kt1(+)(UR1∥ECS1Sig)hash

A processing sequence for recording the "replaced data" shown in FIG. 24B will be described with reference to a flowchart shown in FIG. 25.

Figure 25:
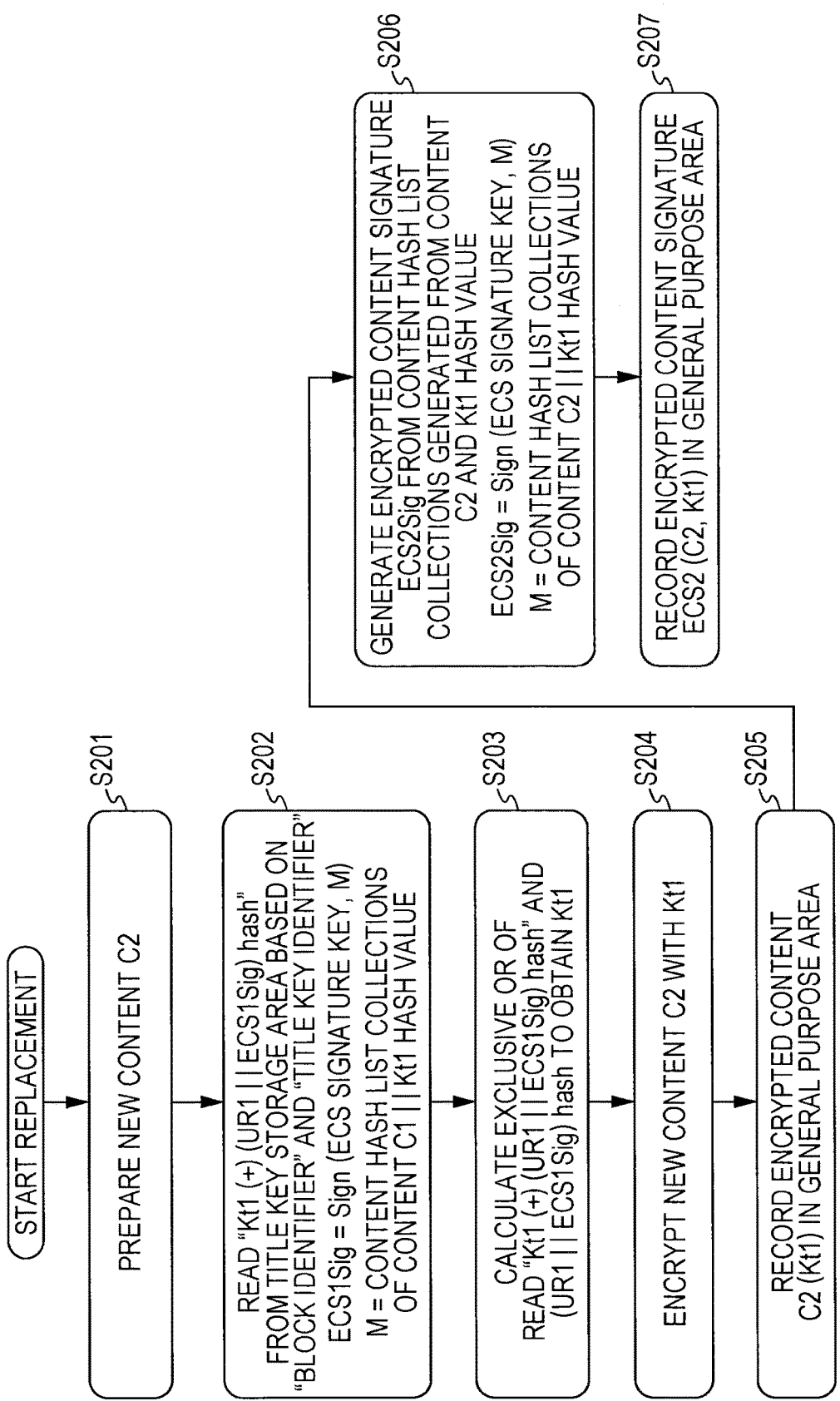
FIG. 25 is a diagram showing a flowchart illustrating an example of processing for recording improper content by the replacement processing.

In addition, the processing shown in FIG. 25 is processing executed using the memory card which stores thereon a proper data set corresponding to the content (C1) shown above in FIG. 24A and executed by an apparatus which owns a right to perform data reading processing as an access right to the block N in the protected area on the memory card, for example, by the content providing server or the user device.

First, in Step S201, new content C2 is prepared.

Next, in Step S202, a "block identifier" and a "title key identifier" are obtained from the usage rule (UR1) for the content (C1) recorded in the general purpose area in the memory card, and reads the following title key conversion data corresponding to the proper content (C1) from a predetermined block, namely a block which stores the title key thereon in the protected area based on the obtained information.

Kt1(+)(UR1∥ECS1Sig)hash

In addition, ECS1Sig=Sign (ECS signature key, M), and M=content hash list collections of the content C1∥the Kt1 hash value.

Next, in Step S203, a hash value of coupled data between the usage rule (UR1) corresponding to the content (C1) read from the general purpose area and the ECS file (ECS1 (C1, Kt1)) is calculated, and exclusive OR computation (XOR) between the calculation result and the title key conversion data read from the protected area is executed to obtain the proper title key (Kt1) corresponding to the content (C1).

That is, the title key (Kt1) is obtained based on the equation of $$Kt1 = (\text{data read from protected area})$$
$$(+) (\text{data read from general purpose area}) =$$
$$Kt1 (+) (UR1 \parallel ECS1Sig) \text{ hash} (+) (UR1 \parallel ECS1Sig) \text{ hash}.$$

In addition, (+) means the exclusive OR (XOR).

Next, in Step S204, the title key (Kt1) obtained in Step S203 is applied, and encryption of the new content (C2) is executed.

The encrypted content C2 (Kt1) is generated.

Next, in Step S205, the encrypted content C2 (Kt1) is recorded in the general purpose area in the memory card.

Next, in Step S206, an encrypted content signature ECS2Sig for the content hash list collections and the Kt1 hash value generated from the content C2 is generated. That is, the following signature data is generated.
ECS2Sig=Sign (ECS signature key, M)

Here, M=the content hash list collections of the content C2∥the Kt1 hash value.

In addition, the divulged signature key (secret key) of the encrypted content signature issuer is applied to the generation of the signature.

Finally, in Step S207, an ECS file including the ECS signature (ECS2Sig (C2, Kt1) improperly generated in Step S206 is generated and recorded in the general purpose area in the memory card.

By the series of processing shown in FIG. 25, the processing for recoding the "replaced data" shown in FIG. 24B is completed.

By the aforementioned replacement processing, the content C2 (Kt1) obtained by encrypting the content C2 with the title key (Kt1) for different content (C1) is generated.

In this example, it is assumed that the usage rule (UR1) of the content C1 is used as it is as the usage rule corresponding to the improperly recorded content C2 (Kt1).

Figure 26:
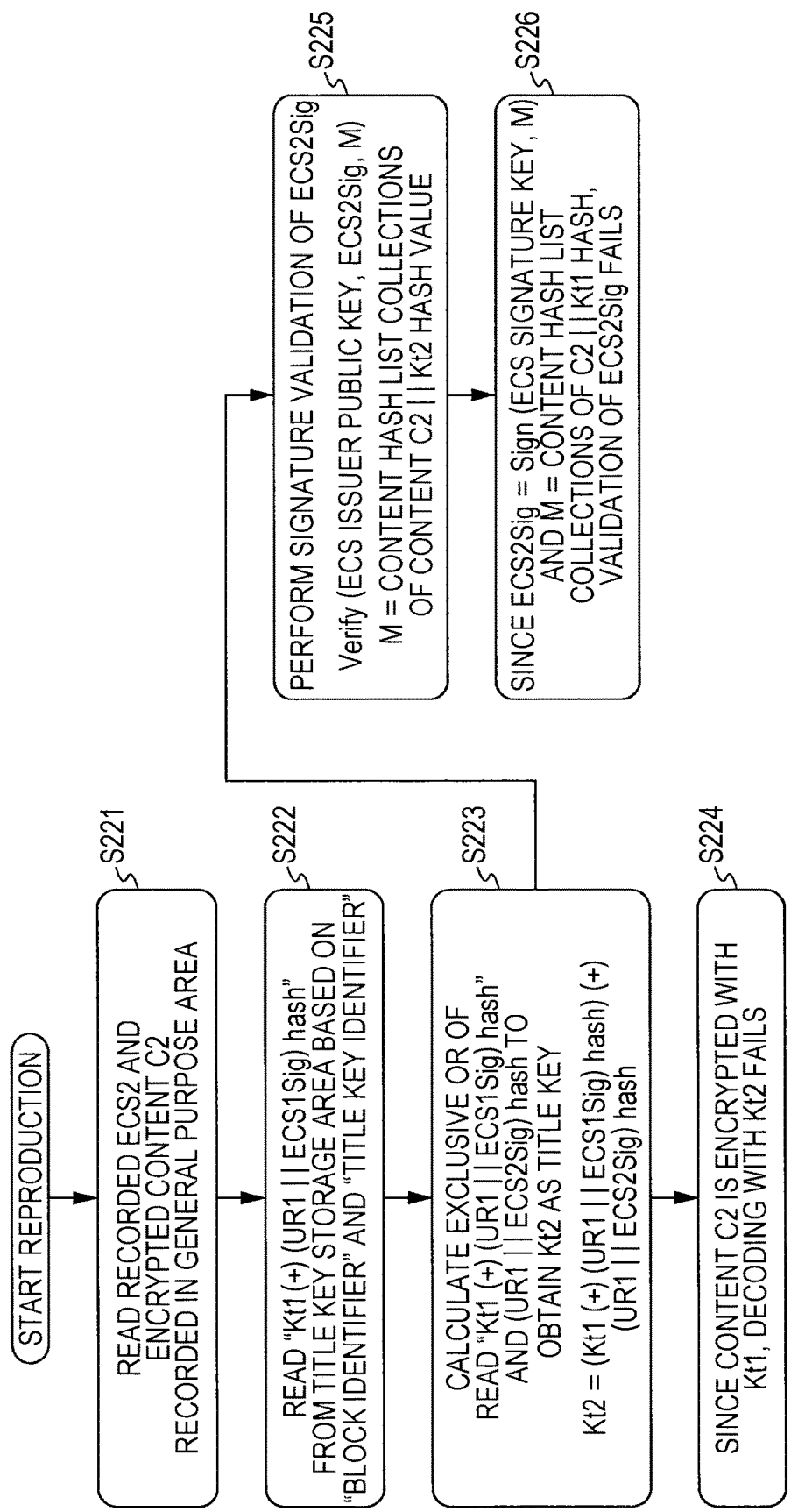
FIG. 26 is a diagram showing a flowchart illustrating that improper content recorded by the replacement processing is not reproduced.

Next, processing by the user device reproducing the content C2 with the use of the "replaced data" shown in FIG. 24B will be described with reference to a flowchart shown in FIG. 26.

First, in Step S221, the user device reads the encrypted content C2 (Kt1) to be reproduced and the ECS file (ECS2 (C2, Kt1)) generated for the content from the general purpose area in the memory card.

Next, in Step S222, the user device reads the block identifier representing the block, which stores the title key thereon, from the usage rule (UR1) recorded so as to correspond to the content C2 from the general purpose area in the memory card.

As described above, the usage rule (UR1) for the content C1 is used as it is as the usage rule corresponding to the improperly recorded content C2 (Kt1) in this example.

As described above with reference to FIG. 23, the block identifier which stores the title key thereon, the title key identifier, and the like are recorded in the usage rule (UR).

In Step S222, the user device reads the block identifier and the title key identifier from the usage rule (UR1) for the content C1.

The block identifier and the title key identifier are identifiers corresponding to a block which stores the proper title key Kt1 corresponding to the content C1 thereon and to a title key stored on the block.

Accordingly, the title key conversion data for the content C1, namely

Kt1(+)(UR1∥ECS1Sig)hash is read.

Next, in Step S223, the user device calculates the hash value of the coupled data between the usage rule (UR1) read from the general purpose area and the ECS file (ECS2 (C2, Kt1)) improperly generated so as to correspond to the content C2 and executes the exclusive OR (XOR) between the calculation result and the title key conversion data read from the protected area to try to obtain the title key Kt2 for decoding corresponding to the content C2.

Here, if the title key Kt2 which meets Kt2=Kt1 can be obtained, the title key has been successfully obtained.

That is, the user device tries to perform processing for calculating the title key based on the following equation.

$Kt2$ = (data read from protected area)

(+) (data read from general purpose area) =

$Kt1$ (+) ($UR1$ ∥ $ECS2Sig$) hash (+) ($UR1$ ∥ $ECS1Sig$) hash

The user device tries to obtain the title key (Kt2) based on the above equation for calculating the title key.

In addition (+) means the exclusive OR (XOR).

However, since ECS2Sig≠ECS1Sig in the above equation for calculating the title key, the value Kt2 obtained by the above equation is a value which is different from Kt1, that is, a relationship of Kt2≠Kt1 is obtained.

As a result, the title key Kt1 applied to the encryption of the content C2 is not obtained, and the user device fails to decode and reproduce the content C2. This corresponds to processing in Step S224.

In Step S225, the user device executes processing for verifying the ECS issuer signature (ECSSig) included in the ECS file read from the general purpose area based on a prescribed reproduction sequence.

The processing for verifying the signature is performed based on the following equation.

Verify(ECE issuer public key,ECS2Sig,M), where Verify (k, S, M) represents processing for verifying an electronic signature S for data M using a verification key k.

M=the content hash list collections of the content C2∥Kt2 hash.

A value calculated in Step S223 is used as Kt2.

ECS2Sig stored on the ECS file is an improper signature generated in Step S206 in the flow shown in FIG. 25 and is the following data:

ECS2Sig=Sign(ECS signature key,M), where M=the content hash list collections of the content C2∥the Kt1 hash value.

As described above, while the data M applied to the signature verification is data including the Kt2 hash value, the signature data ECS2Sig stored on the ECS file is generated for M including Kt1 hash.

Accordingly, the signature verification in Step S225 fails. This is as described in Step S226 in FIG. 26.

Even if the user device tries to decode and reproduce the content C2 by applying the "replaced data" shown in FIG. 24B, the user device
fails to decode the content C2 and
fails to verify the signature of the ECS file,
and as a result, the content C2 is not available for the user device.

The processing examples described above with reference to FIGS. 24A to 26 are processing examples in which the user device tries to encrypt and decode the new content C2 by applying the title key Kt1 for the content C1.

Next, description will be given of an example of improper processing in which the correct usage rule (UR1) corresponding to the content C1 is improperly falsified to generate a new usage rule (UR2).

In the usage rule, information on content expiration date, information on copy restriction, and the like are recorded, and there is a possibility of impropriety that an available period is extended by replacing the usage rule.

Figure 27:
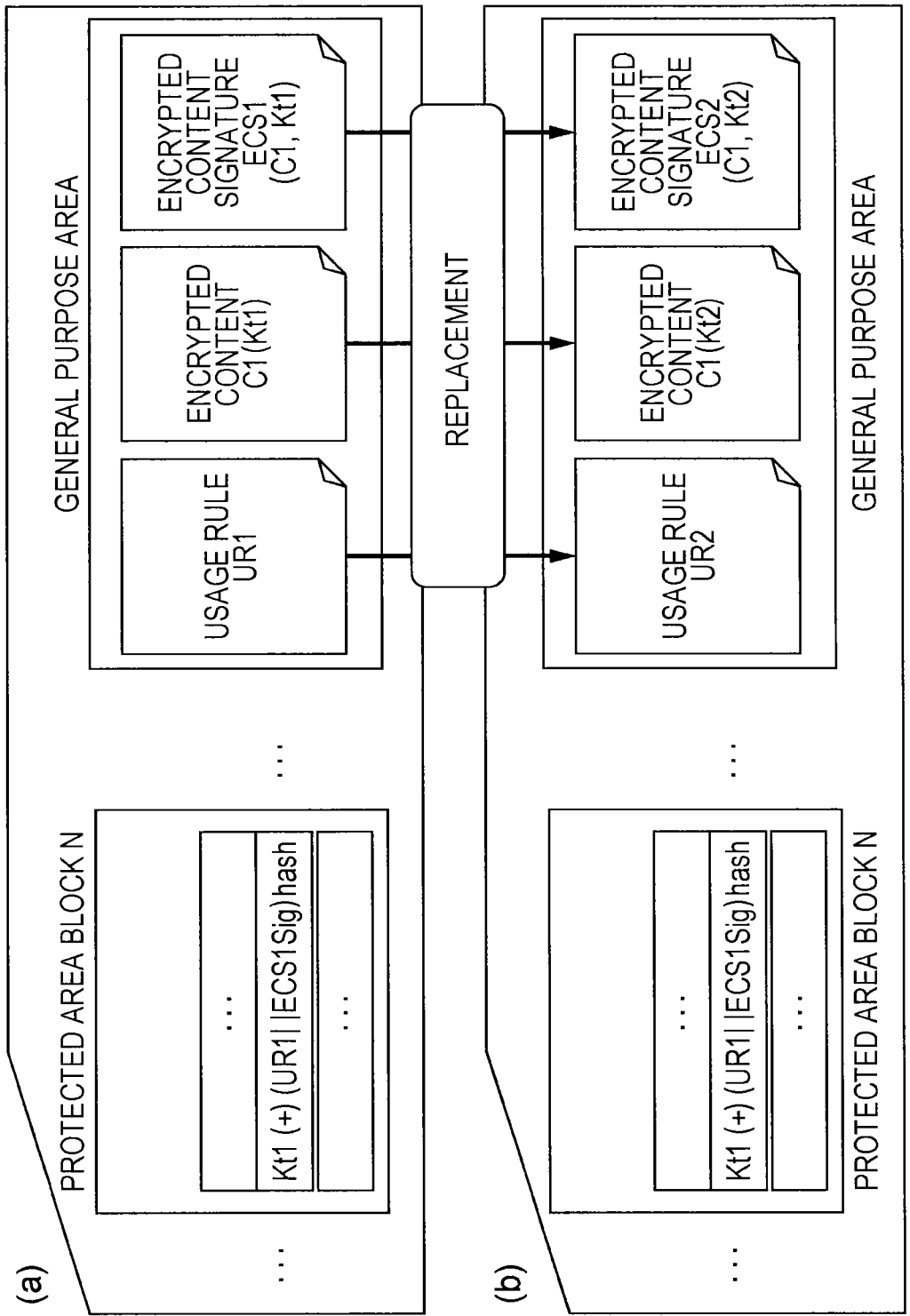
FIG. 27 is a diagram illustrating an example of use of improper content by the replacement processing.

FIG. 27A shows a configuration for storing proper data corresponding to the content (C1), and FIG. 27B shows a configuration for storing replaced data by encrypting the content (C2) with the use of the title key (Kt1) corresponding to the content (C1) in the same manner as in FIG. 24A to 24B described above.

In the configuration for storing proper data shown in FIG. 24A, (a1) encrypted content (C1 (Kt1)) encrypted with the proper title key (Kt1) for the content (C1),
(a2) a proper usage rule (UR1) for the content (C1), and
(a3) a properly encrypted content signature file (ECS file ECS1 (C1, Kt1)) for the content (C1)
are recorded in the general purpose area in the memory card.

In addition, the ECS issuer signature (ECSSig) is stored on the ECS file, and the ECS issuer signature (ECSSig) includes hash list collections of the content (C1) and an electronic signature generated based on data including the hash value of the title key (Kt1) as described above with reference to FIG. 13. In order to clearly show data on a generation source of the signature data, the ECS file is described as ECS1 (C1, Kt1).

In addition, in the configuration for storing proper data shown in FIG. 27A, conversion data of the title key (Kt1), namely the following data is recorded in a block N in the protected area in the memory card.

Kt1(+)(UR1∥ECS1Sig)hash, where UR1 represents the usage rule for the content 1, and ECS1Sig represents the signature by the ECS issuer as configuration data of the ECS file corresponding to the content 1.

In addition, symbols as operators have following meanings. That is, (+) represents exclusive OR computation,

|| represents coupling of data, and a||b means coupled data between data a and data b.

hash represents a hash value, and (a||b) hash means a hash value of the coupled data between the data a and the data b.

For example, a malicious content providing server or a user device rewrites the usage rule (UR1) for the content (C1).

As a result of the improper processing, the "replaced data" shown in FIG. 27B is stored on the memory card.

In the configuration for storing the "replaced data" shown in FIG. 27B, (b1) improperly encrypted content (C1 (Kt2)) encrypted with improper title key (Kt2) for the content (C1), (b2) the usage rule (UR2) improperly generated so as to be correspond to the content (C1), and (b3) an encrypted content signature file (ECS2 [=ECS2 (C1, Kt2)] improperly generated so as to correspond to the content (C1)

are stored on the general purpose area in the memory card.

In addition, the improper ECS file, namely the ECS issuer signature (ECSSig) stored on the ECS2 includes hash list collections of the content (C1) and an electronic signature generated based on the divulged signature key (secret key) of the ECS issuer based on data including the hash value of the improperly generated title key (Kt2). In order to clearly show data on a generation source of the signature data, the ECS file is described as ECS2 (C1, Kt2).

In addition, in the configuration storing the "replaced data" shown in FIG. 27B, the conversion data of the title key (Kt1), namely the following data is recorded in the block N in the protected area in the memory card.

$Kt1(+)(UR1||ECS1Sig)hash$

Figure 28:
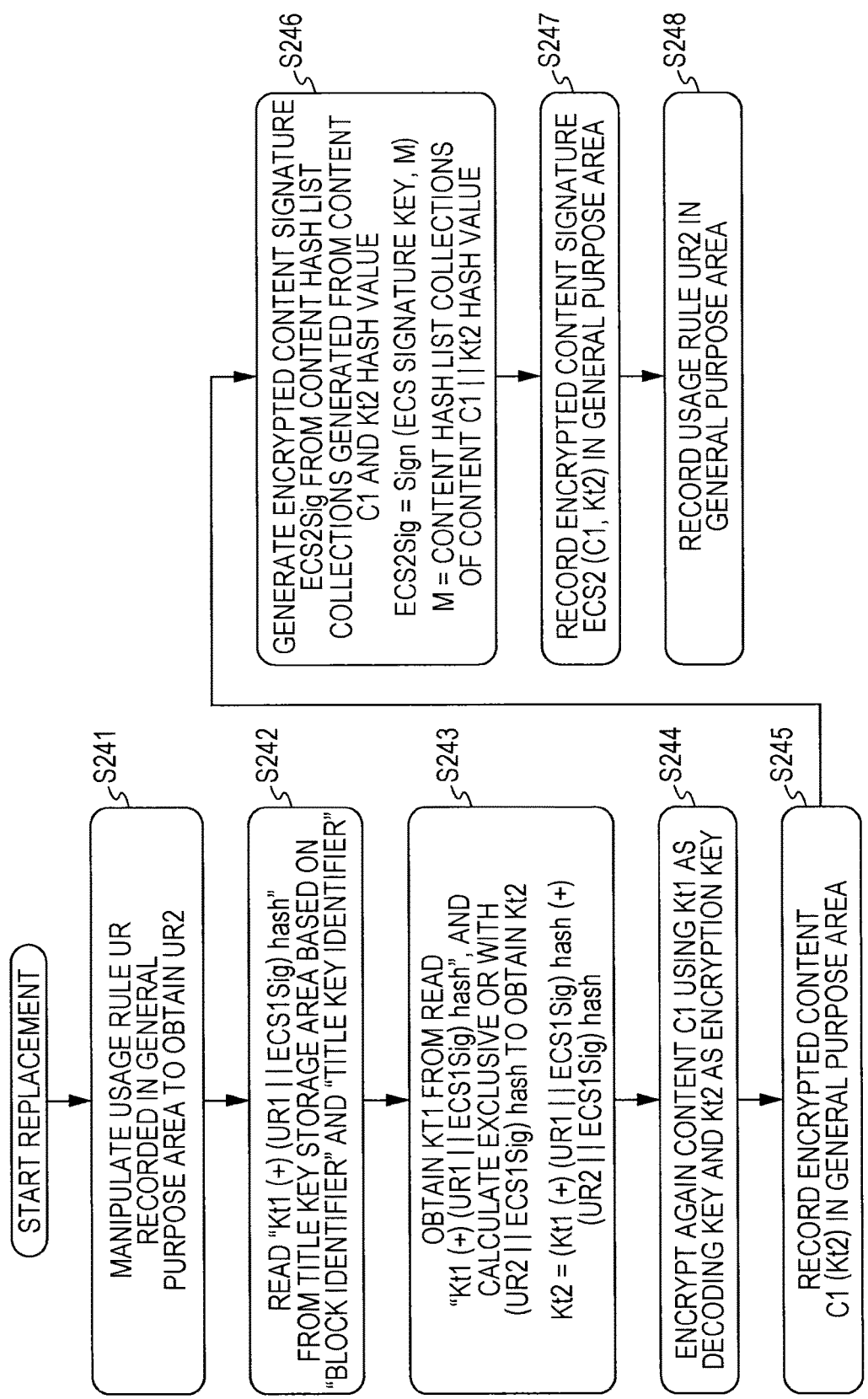
FIG. 28 is a diagram showing a flowchart illustrating an example of processing for recording improper content by the replacement processing.

A processing sequence for recording the "replaced data" shown in FIG. 27B will be described with reference to a flowchart shown in FIG. 28, In addition, the processing shown in FIG. 28 is processing executed using the memory card which stores thereon the proper data set corresponding to the content (C1) shown above in FIG. 27A and executed by an apparatus which owns a right to perform the processing for recoding data as an access right to the block N in the protected area in the memory card, for example, the content providing server or the user device.

First, in Step S241, the usage rule UR1 corresponding to the content C1 is read from the general purpose area, falsity such as rewriting of the information on the available period is made, and improper usage rule (UR2) is generated.

Next, in Step S242, the "block identifier" and the "title key identifier" are obtained from the usage rule (UR1) for the content (C1) recorded in the general purpose area in the memory card, and the following title key conversion data corresponding to the proper content (C1) is read from a predetermined block, namely the block which stores the title key thereon in the protected area based on the obtained information.

$Kt1(+)(UR1||ECS1Sig)hash,$ where ECS1Sig=Sign (ECS signature key, M), and M=the content hash list collections of the content C1||the Kt1 hash value.

Next, in Step S243, a hash value of the coupled data between the usage rule (UR1) corresponding to the proper content (C1) read from the general purpose area and the ECS file (ECS1 (C1, Kt1)) is calculated, and the exclusive OR (XOR) between the calculation result and the title key conversion data read from the protected area is executed to obtain the proper title key (Kt1) corresponding to the content (C1).

That is, the title key (Kt1) is obtained based on the equation of $Kt1 = $ (data read from general purpose area)

$(+)$ (data read from protected area) $=$ $(UR1 \; || \; ECS1Sig) \text{ hash } (+) \; Kt1 \; (+) \; (UR1 \; || \; ECS1Sig) \text{ hash.}$ In addition, (+) means the exclusive OR computation (XOR).

Furthermore, the title key Kt2 to be applied to encrypting and decoding of the content C2 is calculated based on the following equation.

$Kt2=(Kt1(+)(UR1||ECS1Sig)hash(+)(UR2||ECS1Sig)$
$\text{hash}$

Next, in Step S244, the content C1 (Kt1) is decoded by applying the title key Kt1 generated in Step S243, and further, the content C1 is encrypted by applying the new title key Kt2 generated in Step S243 to obtain encrypted content C1 (Kt2).

Next, in Step S245, the encrypted content C2 (Kt2) is recorded in the general purpose area in the memory card.

Next, in Step S246, an encrypted content signature ECS2Sig for the content hash list collections and the Kt2 hash value generated from the content C1 is generated. That is, the following signature data is generated.

ECS2Sig=Sign (ECS signature key, M), where M=the content hash list collections of the content C1||the Kt2 hash value.

In addition, the divulged signature key (secret key) of the encrypted content signature issuer is applied to the generation of the signature.

Next, in Step S247, the ECS file including the ECS signature (ECS2Sig (C1, Kt1)) improperly generated in Step S246 is generated and recorded in the general purpose area in the memory card.

Finally, in Step S248, the usage rule UR2 generated in Step S241 is recorded in the general purpose area.

By the series of processing shown in FIG. 28, the processing for recoding the "replaced data" shown in FIG. 27B is completed.

By such replacement processing, the improperly generated usage rule (UR2) is associated with the content C1. In addition, the content C1 is encrypted with the new title key Kt2 and then recorded.

Figure 29:
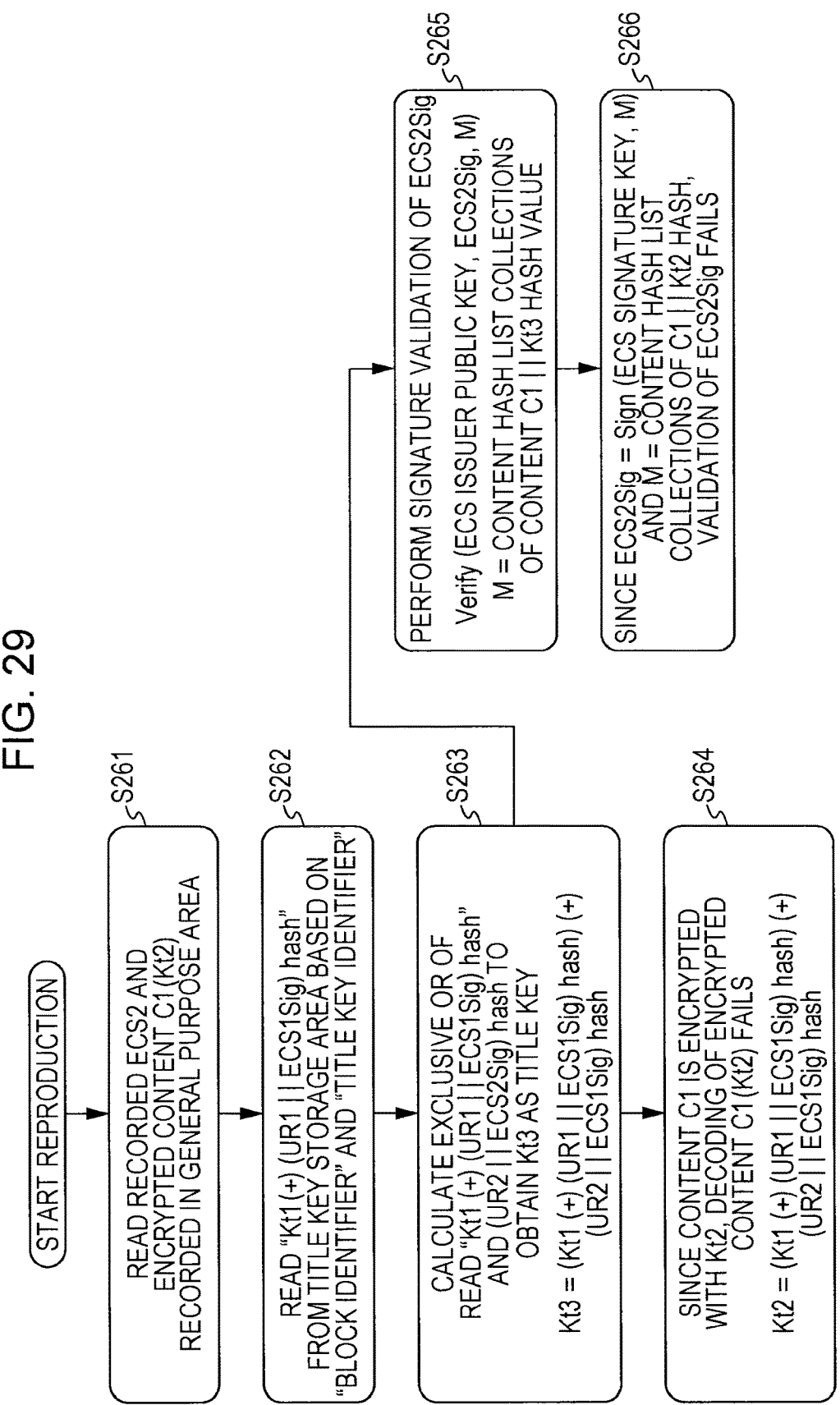
FIG. 29 is a diagram showing a flowchart illustrating that improper content recorded by the replacement processing is not reproduced.

Next, description will be given of processing by the user device reproducing the content C1 with the use of the "replaced data" shown in FIG. 27B with reference to a flowchart shown in FIG. 29.

First, in Step S261, the user device reads the encrypted content C1 (Kt2) to be produced and the ECS file (ECS2 (C1, Kt2) generated for the content from the general purpose area in the memory card.

Next, in Step S262, the user device reads the block identifier representing the block, which stores the title key thereon, and the title key identifier from the new usage rule (UR2) improperly generated so as to correspond to the content C1 from the general purpose area in the memory card.

The block identifier and the title key identifier are still set for the proper usage rule (UR1) before falsity.

That is, the block identifier and the title key identifier are identifiers corresponding to the block which stores the proper title key Kt1 for the content C1 and to the title key stored on the block.

Accordingly, the title key conversion data for the content C1, namely

Kt1(+)(UR1||ECS1Sig)hash is read.

Next, in Step S263, a hash value of the coupled data between the improperly generated usage rule (UR2) read from the general purpose area and the improperly generated ECS file (ECS2 (C1, Kt2)) is calculated, and the exclusive OR computation (XOR) between the calculation result and the title key conversion data read from the protected area is executed to try to obtain a title key Kt3 for decoding corresponding to the content C1.

Here, if the title key Kt3 which meets Kt3=Kt2 can be obtained, the title key has been successfully obtained.

In Step S263, the user device tries to perform processing for calculating the title key based on the following equation.

$$Kt3 = \text{(data read from protected area)}$$
$$(+) \text{(data read from general purpose area)} =$$
$$Kt1 (+) (UR1 \| ECS1Sig) \text{ hash } (+) (UR2 \| ECS2Sig) \text{ hash}$$

The title key (Kt3) is generated based on the above equation for calculating the title key.

In addition, (+) means the exclusive OR computation (XOR).

However, Kt2 is not obtained by the above equation for calculating the title key.

The value Kt3 obtained by the above equation is a value which is different from both Kt1 and Kt2, that is, relationships of Kt3≠Kt2 and Kt3≠Kt1 are obtained.

As a result, the title key Kt2 applied to re-encryption of the content C1 is not obtained, and the user device fails to decode and reproduce the content C1. This corresponds to processing in Step S264.

In Step S265, the user device executes processing for verifying the ECS issuer signature (ECSSig) included in the ECS file read from the general purpose area based on a prescribe reproduction sequence.

That is, the user device performs the signature verification processing base on the following equation.

Verify(ECE issuer public key,ECS2Sig,M), where Verify (k, S, M) represents processing for verifying an electronic signature S for data M using a verification key k.

M=the content hash list collections of the content C1||Kt3 hash.

As Kt3, a value calculated in Step S263 is used.

ECS2Sig stored on the ECS file is an improper signature generated in Step S246 in the flow shown in FIG. 28 and is the following data.

ECS2Sig=Sign(ECS signature key,M), where M=the content hash list collections of the content C1||the Kt2 hash value.

As described above, while the data M applied to the signature verification is data including the Kt3 hash value, the signature data ECS2Sig stored on the ECS file is generated for M including Kt2 hash.

Accordingly, the signature verification in Step S265 fails. This is as described in Step S266 in FIG. 29.

Even if the user device tries to decode and reproduce the content C1 by applying the "replaced data" shown in FIG. 27B, the user device fails to decode the content C1 and fails to verify the signature of the ECS file, and as a result, the content C1 is not available for the user device.

By storing the title key recorded in the protected area in the memory card as the exclusive OR (XOR) computation result with the hash value of the coupled data between the usage rule (UR) and the ECS issuer signature (ECSSig), it is possible to prevent improper use of content even in the case of divulging of a signature key (secret key) of the ECS issuer to be applied to the ECS issuer signature (ECSSig).

For example, the content providing server and the user device can prevent improper use of content by improper processing applying the divulged signature key (secret key) of the ECS issuer, specifically processing for replacing the encryption key of the encrypted content, falsity of usage rule, and the like.

[1. Concerning Processing for Applying Block Identifier Recorded in Encrypted Content Signature (ECS) File]

Next, description will be given of processing for applying the block identifier (PAD block number) recorded in the encrypted content signature (ECS) file.

As described above with reference to FIGS. 9A and 9B, the block identifier (PAD block number) is recorded in the encrypted content signature (ECS) file.

The block identifier (PAD block number) is data delivered from the content provider (content server) 103 to the encrypted content signature (ECS) issuer 102 as described above with reference to FIG. 13 and is an identifier of a block in the protected area in the medium, in which the title key as the encryption key corresponding to the content provided to the user device 104 by the content provider 103 is stored thereon. This is an identifier of a block in the protected area in the medium, which the content provider 103 can use.

As described above with reference to FIGS. 3, 6, and the like, the block in the protected area in the medium, which the content provider can use, is set in advance, and the access permitted block information is recorded.

In addition, the information corresponding to the block identifier (PAD block number) is also recorded in the ECS issuer certificate as described above with reference to FIGS. 9A and 9B.

As described above with reference to FIGS. 9A and 9B, (a) block identifier start number (start PAD block number) and (b) block identifier range (PAD block number counter) are recorded.

The (a) block identifier start number (start PAD block number) is a start number of an access permitted block in the protected area in the medium, which the ECS issuer 102 can permit the content provider 103 to access.

The (b) block identifier range (PAD block number counter) is information representing a range from the start number of the access permitted block in the protected area in the medium, which the ECS issuer 102 can permit the content provider 103 to access.

Furthermore, the block identifier is also recorded in the usage rule (UR) corresponding to the content as described above with reference to FIG. 23. The block identifier recorded in the usage information (UR) is a block identifier indicating a block on which the title key corresponding to the content is stored.

Figure 30:
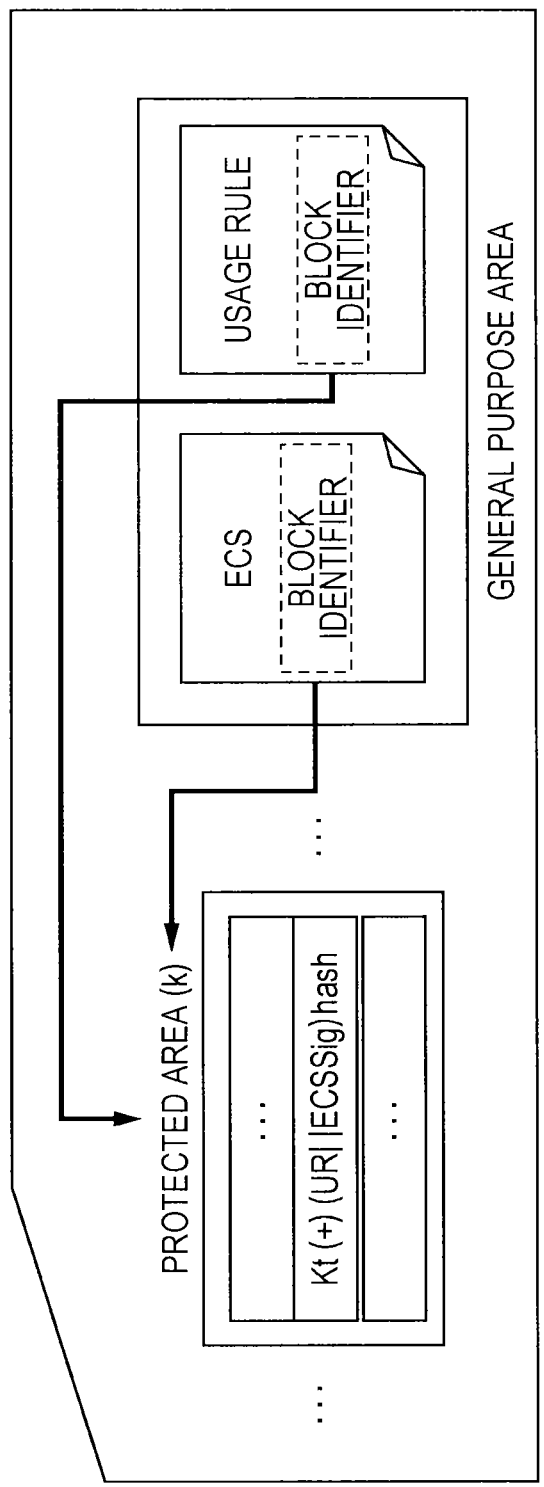
FIG. 30 is a diagram illustrating a block identifier recorded in the encrypted content signature file (ECS file) and a block identifier recorded in a usage rule file.

FIG. 30 shows an encrypted content signature (ECS) file, a usage rule (UR), and
a correspondence relationship between a block identifier recorded therein and a title key storing block (a block k in the example shown in the drawing) in the protected area.

As shown in FIG. 30, data of the encrypted content signature (ECS) file and the usage rule (UR)
corresponding to content is stored on the general purpose area in the memory card.

In addition,
conversion data of the title key corresponding to the content, namely Kt(+)UR∥ECSSig)hash is stored in the block k in the protected area.

The content provider which provides content to the user device compares the block identifier as information on a protected area access right recorded in its own host certificate (see FIG. 5) with information on a writing permitted block area as a block identifier in the ECS issuer certificate.

The content provider determines whether or not the content can be provided in accordance with the comparison result.

In addition, the user device which reproduces the content compares the block identifier in the usage rule with the block identifier in the ECS file.

The user device determines whether or not the content can be reproduced in accordance with the comparison result.

First, description will be given of a sequence for determining whether or not the content can be provided with the use of the block identifier by the content providing server with reference to a flowchart shown in FIG. 31.

Figure 31:
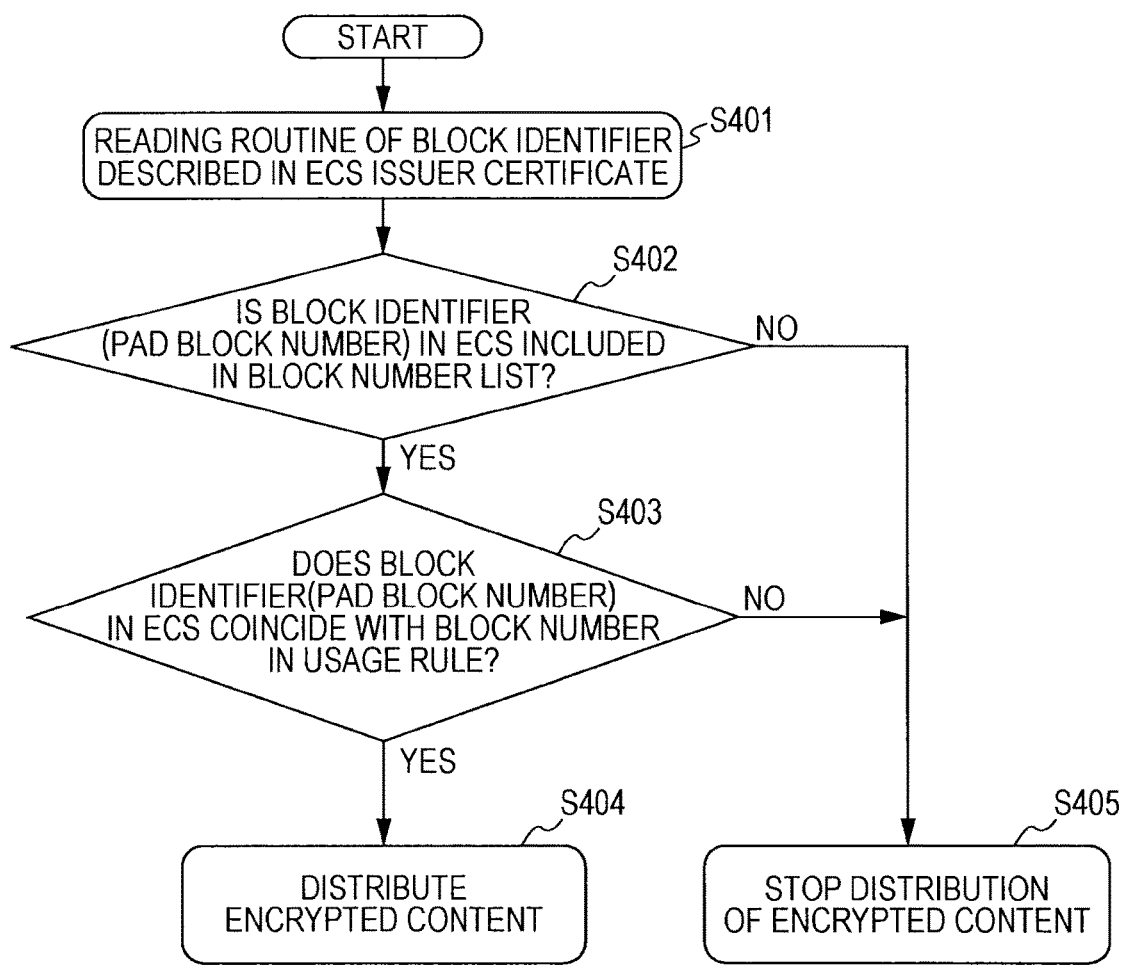
FIG. 31 is a diagram showing a flowchart illustrating a sequence of determining whether or not content can be provided by applying the block identifier recorded in the encrypted content signature file (ECS file) and the block identifier recorded in the usage rule file.

In addition, as pre-processing of Step S401 in the flowchart shown in FIG. 31, the content provider executes signature verification by applying the ECS issuer signature set in the encrypted content signature file (ECS file) received from the encrypted content signature file (ECS file) issuer.

When the signature verification is successfully made, and validity of the encrypted content signature file (ECS file) is confirmed, the content provider further executes signature verification on the ECS issuer certificate stored on the encrypted content signature file (ECS file). Under a condition that the above two kinds of signature verification are successfully made, processing in Step S401 and subsequent steps is performed.

When at least one of the two kinds of signature verification is not successfully made, validity of the encrypted content signature file (ECS file) or validity of the ECS issuer certificate is not confirmed, and therefore, the processing in Step S401 and subsequent steps is not executed. In such a case, the processing for providing the content is also not executed.

In relation to the content hash as an original source of the content hash list collections stored on the encrypted content signature file (ECS file), any of the content hash after encryption and the content hash before encryption may be set.

When the two kinds of signature verification performed on the encrypted content signature file (ECS file) and the ECS issuer certificate are successfully made, and validity of the encrypted content signature file (ECS file) and validity of the ECS issuer certificate are confirmed, the content provider executes processing in Step S401.

First, in Step S401, the content provider reads the ECS issuer certificate in the ECS file and reads the block identifier information recorded in the ECS issuer certificate.

Figure 32:
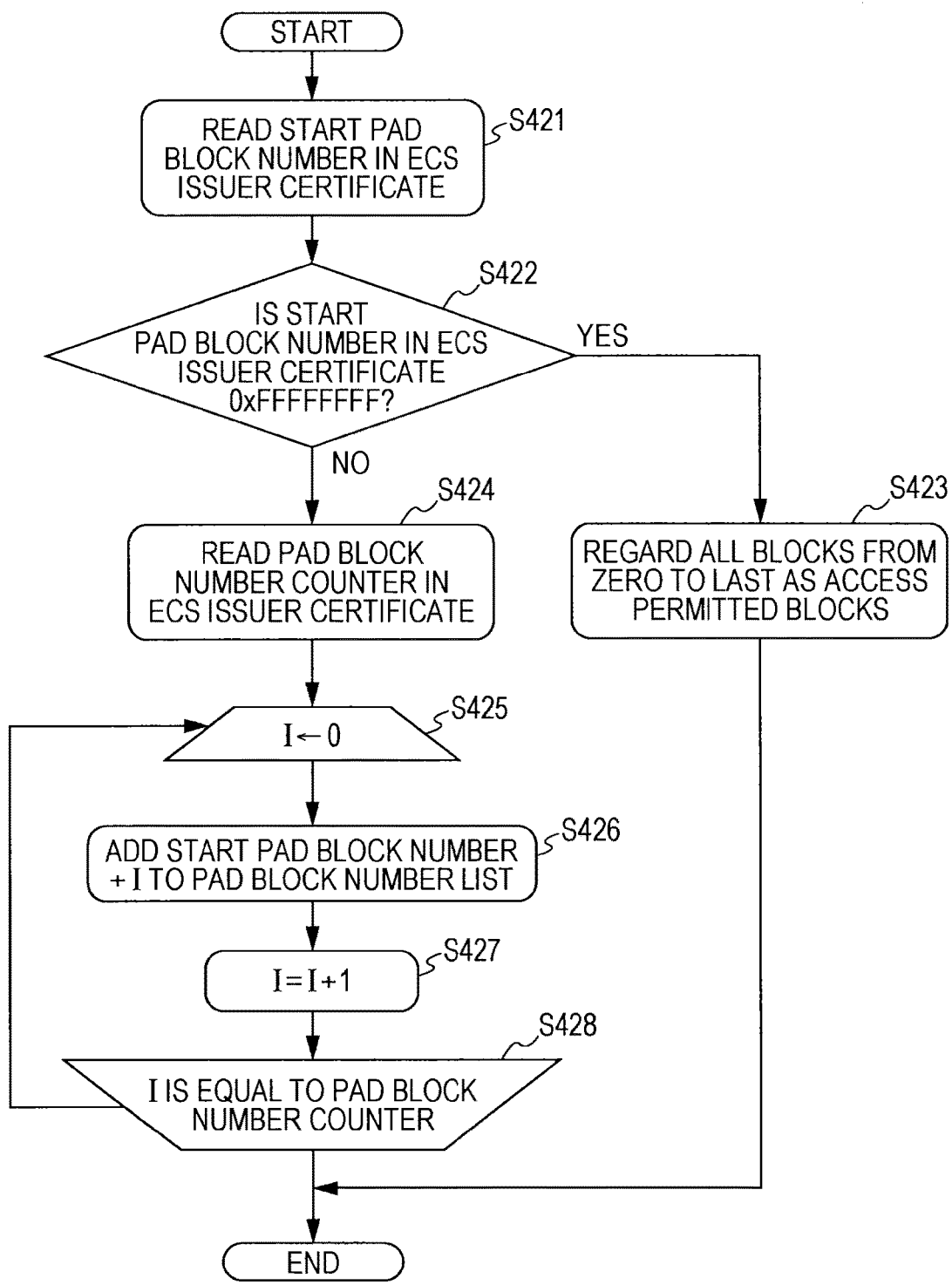
FIG. 32 is a diagram showing a flowchart illustrating a sequence of processing for reading the block identifier from an ECS issuer certificate.

Detailed description will be given of the processing in Step S401 with reference to a flow shown in FIG. 32.

In Step S421, the block identifier start number (start PAD block number) in the ECS issuer certificate is read.

The block identifier start number (start PAD block number) is a start number of an access permitted block in the protected area in the medium, which the ECS issuer 102 can permit the content provider 103 to access.

Next, in Step S422, it is determined whether or not the block identifier start number (start PAD block number) in the ECS issuer certificate is 0xFFFFFFFF.

The case in which the block identifier start number (start PAD block number) is 0xFFFFFFFF corresponds to a state in which access to all blocks is permitted.

When it is determined in Step S422 that the block identifier start number (start PAD block number) is 0xFFFFFFFF, the processing proceeds to Step S423, and a previous block set in the protected area in the medium is regarded as an access permitted block.

On the other hand, when it is determined in Step S422 that the block identifier start number (start PAD block number) is not 0xFFFFFFFF, the processing proceeds to Step S424.

In Step S424, the block identifier range information (PAD block number counter) in the ECS issuer certificate is read.

The block identifier range (PAD block number counter) is information representing a range from the start number of the access permitted block in the protected area in the medium, which the ECS issuer 102 can permit the content provider 103 to access.

The next processing in Steps S425 to S428 is a repeated routine executed while a variable I representing the block identifier is sequentially incremented from 0 to 1, 2, 3, . . . .

First, in Step S425, the variable I is set to satisfy I=1.

Next, in Step S426, the block identifier start number (start PAD block number)+I is added to a block identifier list (PAD block number list).

Next, in Step S427, I is set to satisfy I=I+1.

Next, in Step S428, it is determined whether I is equal to the block identifier range information (PAD block number counter).

When I is equal to the block identifier range information (PAD block number counter), the processing is completed. When I is not equal to the block identifier range information (PAD block number counter), the processing returns to Step S426 and is repeated.

Based on the above processing, processing in Step S401 in the flow shown in FIG. 31 is performed.

In Step S401, the block identifier start number (start PAD block number) in the ECS issuer certificate and the block identifier range information (PAD block number counter) are applied to calculate a prescribed access permitted range in the ECS issuer certificate, and the access permitted range is set as an access permitted block identifier list.

Next, in Step S402, it is determined whether or not the block identifier (PAD block number) described as data recorded in the encryption content signature (ECS) file is included in the access permitted block identifier list generated in Step S401.

When the block identifier (PAD block number) is not included in the access permitted block identifier list, the processing proceeds to Step S405, and the processing for providing the content to the user device is not executed.

On the other hand, when the block identifier (PAD block number) is included in the access permitted block identifier list, the processing proceeds to Step S403.

In Step S403, it is determined whether or not the block identifier (PAD block number) described as data recorded in the encrypted content signature (ECS) file coincides with the block identifier described in the usage rule (UR).

When the block identifier (PAD block number) does not coincide with the block identifier described in the usage rule (UR), the processing proceeds to Step S405, and the processing for providing the content to the user device is not executed.

On the other hand, when the block identifier (PAD block number) coincides with the block identifier described in the usage rule (UR), the processing proceeds to Step S404, and the processing for providing the content to the user is executed.

As described above, the content provider determines whether or not conditions
(a) that the block identifier (PAD block number) recorded in the encrypted content signature (ECS) file is within an access permitted block range recorded in the ECS issuer certificate, and
(b) that the block identifier (PAD block number) recorded in the encrypted content signature (ECS) file coincides with the block identifier recorded in the usage rule (UR) are satisfied, and only when the conditions are satisfied, the content provider provides the content to the user device.

Next, description will be given of processing for applying the block identifier by the user device which executes the processing for reproducing the content with reference to a flowchart shown in FIG. 33.

Figure 33:
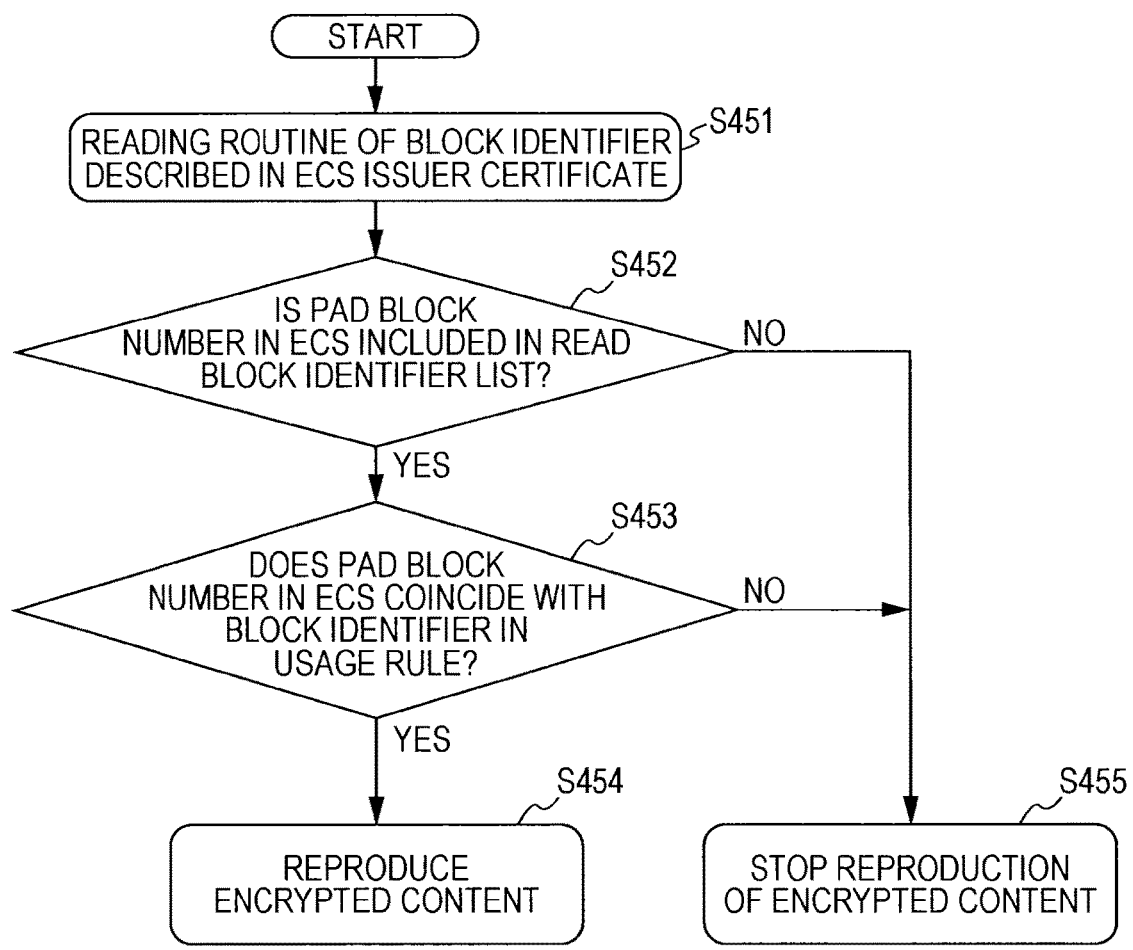
FIG. 33 is a diagram showing a flowchart illustrating a sequence of determining whether or not content can be reproduced by applying the block identifier recorded in the encrypted content signature file (ECS file) and the block identifier recorded in the usage rule file.

Before Step S451 shown in FIG. 33, the user device executes the signature verification by applying the ECS issuer signature set in the encrypted content signature file (ECS file) received from the content provider.

When the signature verification is successfully made, and validity of the encrypted content signature file (ECS file) is confirmed, the user device further executes the signature verification on the ECS issuer certificate stored on the encrypted content signature file (ECS file). Under the condition that the above two kinds of signature verification are successfully made, processing in Step S451 and subsequent steps is performed.

When at least one of the two kinds of signature verification is not successfully made, validity of the encrypted content signature file (ECS file) or validity of the ECS issuer certificate is not confirmed, and therefore, the processing in Step S451 and subsequent steps is not executed. In such a case, the processing for reproducing the content is also not executed.

When the two kinds of signature verification performed on the encrypted content signature file (ECS file) and the ECS issuer certificate are successfully made, and validity of the encrypted content signature file (ECS file) and validity of the ECS issuer certificate are confirmed, the user device executes the processing in Step S451.

In Step S451, the same processing as the processing in Step S401 in the flow shown in FIG. 31 described above as the processing by the content provider. That is, the block identifier start number (start PAD block number) in the ECS issuer certificate and the block identifier range information (PAD block number counter) are applied to calculate the prescribed access permitted range in the ECS issuer certificate, and the access permitted range is set as the access permitted block identifier list as described above in detail with reference to the flow shown in FIG. 32.

Next, in Step S452, it is determined whether or not the block identifier (PAD block number) described as data recorded in the encrypted content signature (ECS) file is included in the access permitted block identifier list generated in Step S451.

When the block identifier (PAD block number) is not included in the access permitted block identifier list, the processing proceeds to Step S455, and the processing for reproducing the content is not executed.

On the other hand, when the block identifier (PAD block number) is included in the access permitted block identifier list, the processing proceeds to Step S453.

In Step S453, it is determined whether or not the block identifier (PAD block number) described as data recorded in the encrypted content signature (ECS) file coincides with the block identifier recorded in the usage rule (UR).

When the block identifier (PAD block number) does not coincide with the block identifier recorded in the usage rule (UR), the processing proceeds to Step S455, and the processing for reproducing the content is not executed.

On the other hand, when the block identifier (PAD block number) coincides with the block identifier recorded in the usage rule (UR), the processing proceeds to Step S454, and the processing for reproducing the content is executed.

Before starting the processing for reproducing the content, processing for obtaining and generating a title key to be applied to the decoding of the encrypted content, and further, processing for cross-checking the hash value by applying the content hash list included in the encrypted content signature file are executed. When the cross-checking is successfully made in the hash value cross-check, and it is confirmed that no falsity has been made in the content, the reproduction of the content is permitted.

As described above, the user device which reproduces the content determines whether or not conditions (a) that the block identifier (PAD block number) recorded in the encrypted content signature (ECS) file is within an access permitted block range recorded in the ECS issuer certificate, and
(b) that the block identifier (PAD block number) recorded in the encrypted content signature (ECS) file coincides with the block identifier recorded in the usage rule (UR) are satisfied, and only when the conditions are satisfied, the user device reproduces the content.

[12. Concerning Hardware Configuration Example of Each Apparatus]

Finally, description will be given of a hardware configuration example of each apparatus which executes the aforementioned processing with reference to FIG. 34.

Figure 34:
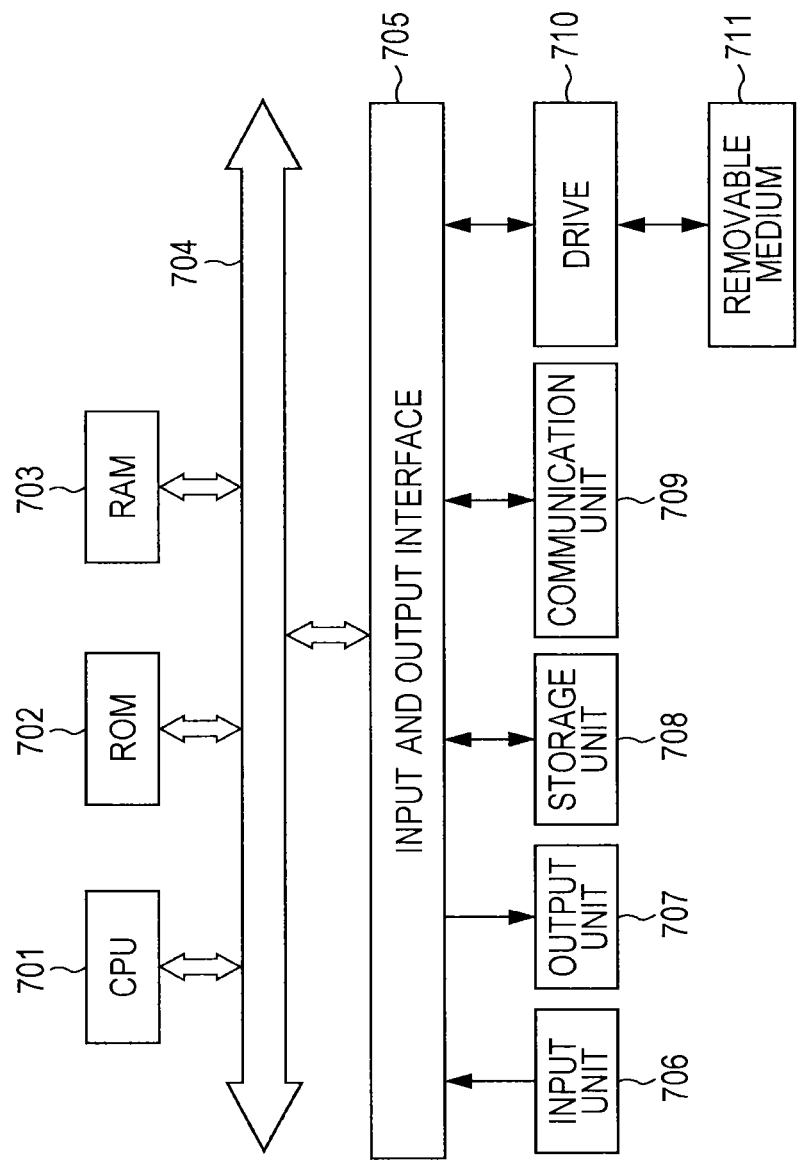
FIG. 34 is a diagram illustrating a hardware configuration example of an information processing apparatus.

FIG. 34 shows a hardware configuration example of an information processing apparatus which can be applied to any of the user device 104, the content provider 103, the encrypted content signature issuer 102, and the license issuer 101 which are shown in FIGS. 7 and 8.

A CPU (Central Processing Unit) 701 functions as the data processing unit which executes various kinds of processing based on a program stored on a ROM (Read Only Memory) 702 or a storage unit 708. For example, the CPU 701 executes processing based on each of the aforementioned flowcharts. A RAM (Random Access Memory) 703 appropriately stores thereon a program to be executed by the CPU 701, data, and the like. The CPU 701, the ROM 702, and the RAM 703 are connected to each other via a bus 704.

The CPU 701 is connected to an input and output interface 705 via the bus 704, and an input unit 706 which includes various switches, a keyboard, a mouse, a microphone, and the like and an output unit 707 which includes a display, a speaker, and the like are connected to the input and output interface 705. The CPU 701 executes various kinds of processing in response to a command input from the input unit 706 and outputs a processing result to the output unit 707, for example.

The storage unit 708 connected to the input and output interface 705 is configured by a hard disk or the like and stores a program to be executed by the CPU 701 and various kinds of data. A communication unit 709 communicates with an external device via a network such as the Internet or a local area network.

A drive 710 connected to the input and output interface 705 drives a removable medium 711 such as a magnetic disk, an optical disc, a magnet-optical disc, or a semiconductor memory such as a memory card and obtains various kinds of data such as recorded content and key information. For example, processing for decoding and reproducing content is performed based on a reproduction program executed by the CPU using obtained content or key data.

FIG. 35 shows a hardware configuration example of a memory card as an information storage apparatus.

A CPU (Central Processing Unit) 801 functions as the data processing unit which executes various kinds of processing based on a program stored on a ROM (Read Only Memory) 802 or a storage unit 807. For example, the CPU 801 executes processing for communicating with a server or a host device, processing for writing data in or reading data from the storage unit 807, processing for determining whether or not access can be permitted in units of divided areas in a protected area 811 in the storage unit 807, and the like which were described above in the embodiments. A RAM (Random Access Memory) 803 appropriately stores thereon a program executed by the CPU 801, data, and the like. The CPU 801, the ROM 802, and the RAM 803 are connected to each other via a bus 804.

The CPU 801 is connected to an input and output interface 805 via the bus 804, and a communication unit 806 and the storage unit 807 are connected to the input and output interface 805.

The communication unit 806 connected to the input and output interface 805 communicates with a server or a host, for example. The storage unit 807 is a data storage area and includes a protected area 811 with access restriction and a general purpose area 812 which data can be freely recorded in and read from as described above.

Although the above description was given of a representative example in which the content provided by the content provide is encrypted content in the aforementioned embodiment, the configuration of the present disclosure is not limited to a case in which provided content is encrypted content and can be also applied to a case of an unencrypted plain text content. In the case of plain text content, the same processing as the aforementioned processing for providing encrypted content can be performed while a known data sequence, for example, key data in which all values are zero is used as the title key described in the aforementioned embodiment.

[13. Conclusion of Configuration according to the Disclosure]

The above detailed description was given of the embodiment of the present disclosure referring to a specific embodiment. However, it is obvious that those skilled in the art can make modifications and replacements of the embodiment without departing from the scope of the present disclosure. That is, the present disclosure is described herein for illustrative purposes only and should not be exclusively understood. In order to determine a scope of the present disclosure, appended claims should be taken into consideration.

In addition, the technique disclosed herein can be implemented in the following configurations.

(1) An information processing apparatus including: a data processing unit which executes processing for decoding and reproducing encrypted content, wherein the data processing unit executes processing for determining whether or not the content can be reproduced by applying an encrypted content signature file set corresponding to the content to be reproduced, wherein the encrypted content signature file is a file which stores thereon information on the issue date of the encrypted content signature file and an encrypted content signature issuer certificate with a public key of an encrypted content signature issuer as an apparatus which generates the encrypted content signature file, wherein in the processing for determining whether or not the content can be reproduced, the data processing unit compares the expiration date of the encrypted content signature issuer certificate recorded in the encrypted content signature issuer certificate with the information on issue date of the encrypted content signature file, does not perform processing for decoding and reproducing the encrypted content when the expiration date of the encrypted content signature issuer certificate is before the issue date of the encrypted content signature file, and performs the processing for decoding and reproducing the encrypted content only when it is confirmed that the expiration date of the encrypted content signature issuer certificate is not before the issue date of the encrypted content signature file.

(2) The information processing apparatus according to (1), wherein when it is confirmed that the expiration date of the encrypted content signature issuer certificate is not before the issue date of the encrypted content signature file, the data processing unit further refers to a revocation list which records therein information on invalidation of the encrypted content signature issuer certificate and performs the processing for decoding and reproducing the encrypted content under a condition that it is confirmed that an identifier of the encrypted content signature issuer certificate is not registered in the revocation list.

(3) The information processing apparatus according to (1) or (2), wherein when it is confirmed that the expiration date of the encrypted content signature issuer certificate is not before the issue date of the encrypted content signature file, the data processing unit further refers to a revocation list which records therein information on invalidation of the encrypted content signature issuer certificate and obtains invalidated (revoked) date of the encrypted content signature issuer certificate from the revocation list and performs the processing for decoding and reproducing the encrypted content under a condition that it is confirmed that the issue date of the encrypted content signature file is before the invalidated (revoked) date, when an identifier of the encrypted content signature issuer certificate is registered in the revocation list.

(4) The information processing apparatus according to any one of (1) to (3), wherein the encrypted content signature file is a file which includes a hash value of content and an electronic signature for data including key information to be applied to decoding of the content and information on the issue date of the encrypted content signature file, and wherein the data processing unit executes the processing for determining whether or not the content can be reproduced after it is confirmed that no falsity has been made in the encrypted content signature file by executing signature verification on the electronic signature.

(5) The information processing apparatus according to any one of (1) to (4), wherein an electronic signature of a license issuer is set in the encrypted content signature issuer certificate, and wherein the data processing unit executes the processing for determining whether or not the content can be reproduced after it is confirmed that no falsity has been made in the encrypted content signature issuer certificate by executing signature verification on the electronic signature.

(6) An information processing apparatus including: a data processing unit which executes processing for providing encrypted content to a user device, wherein the data processing unit executes processing for determining whether or not the content can be provided by applying an encrypted content signature file set corresponding to encrypted content, wherein the encrypted content signature file is a file which stores thereon information on the issue date of the encrypted content signature file and an encrypted content signature issuer certificate with a public key of an encrypted content signature issuer as an apparatus which generates the encrypted content signature file, wherein in the processing for determining whether or not the content can be provided, the data processing unit compares the expiration date of the encrypted content signature issuer certificate recorded in the encrypted content signature issuer certificate with the information on issue date of the encrypted content signature file, executes the processing for determining whether or not the content can be provided with reference to a revocation list which records therein information on invalidation of the encrypted content signature issuer certificate when it is confirmed that the expiration date of the encrypted content signature issuer certificate is not before the issue date of the encrypted content signature file, and performs the processing for determining whether or not the content can be provided with reference to information on the expiration date of the encrypted content signature issuer certificate when it is confirmed that the expiration date of the encrypted content signature issuer certificate is before the issue date of the encrypted content signature file.

(7) The information processing apparatus according to (6), wherein when it is confirmed that the expiration date of the encrypted content signature issuer certificate is not before the issue date of the encrypted content signature file, the data processing unit compares the expiration date of the encrypted content signature issuer certificate with the actual time and does not perform the processing for providing the encrypted content to the user device if the expiration date of the encrypted content signature issuer certificate is before the actual time.

(8) The information processing apparatus according to (6) or (7), wherein when it is confirmed that the expiration date of the encrypted content signature issuer certificate is not before the issue date of the encrypted content signature file, the data processing unit compares the expiration date of the encrypted content signature issuer certificate with the actual time, compares the issue date of the encrypted content signature file with the actual time when the expiration date of the encrypted content signature issuer certificate is not before the actual date, and does not perform the processing for providing the encrypted content to the user device when the issue date of the encrypted content signature file is before the actual time.

(9) The information processing apparatus according to (8), wherein when it is confirmed that the issue date of the encrypted content signature file is not before the actual time, the data processing unit further executes the processing for determining whether or not the content can be provided with reference to the revocation list which records therein the information on invalidation of the encrypted content signature issuer certificate.

(10) The information processing apparatus according to any one of (6) to (9), wherein the data processing unit refers to the revocation list which records therein the information on invalidation of the encrypted content signature issuer certificate and executes the processing for providing the encrypted content to the user device under a condition that it is confirmed that an identifier of the encrypted content signature issuer certificate is not registered in the revocation list.

(11) The information processing apparatus according to any one of (6) to (10), wherein the data processing unit executes the processing for determining whether or not the content can be provided with reference to the revocation list which records therein the information on invalidation of the encrypted content signature issuer certificate, and obtains invalidated (revoked) date of the encrypted content signature issuer certificate from the revocation list and executes the processing for providing the encrypted content to the user device under a condition that it is confirmed that the issue date of the encrypted content signature file is before the invalidated (revoked) date when an identifier of the encrypted content signature issuer certificate is registered in the revocation list.

(12) An information processing system including: a user device which executes processing for reproducing content; a content provider which executes processing for providing the content to the user device; and an encrypted content signature issuer which executes processing for providing an encrypted content signature file to the content provider, wherein the content provider sends content hash list collections including hash values based on configuration data of the content and a content encryption key or a hash value of the encryption key to the encrypted content signature issuer, wherein the encrypted content signature issuer generates signature data for data as a target of the signature, namely data including the content hash list collections, the hash value of the content encryption key, and information on the date on which the encrypted content signature file is generated, generates an encrypted content signature file including the generated signature data and the content hash list collections, and sends the encrypted content signature file to the content provider, wherein the content provider executes processing for determining whether or not the content can be provided by applying the information on the date on which the encrypted content signature file is generated, and wherein the user device executes processing for determining whether or not the content can be reproduced by applying the information on date on which the encrypted content signature file is generated.

(13) An information storage apparatus including: a storage unit which stores encrypted content and an encryption key to be applied to the decoding of the encrypted content, wherein the storage unit includes a protected area, which stores thereon a converted encryption key as conversion data of the encryption key, for which an access restriction is set, and a general purpose area which stores thereon the encrypted content, wherein the general purpose area stores thereon an encrypted content signature file set corresponding to the encrypted content, wherein the encrypted content signature file is a file which stores thereon information on the issue date of the encrypted content signature file and an encrypted content signature issuer certificate with a public key of an encrypted content signature issuer as an apparatus which generates the encrypted content signature file, and wherein a reproduction apparatus which executes processing for reading and reproducing the encrypted content from the storage unit is made to determine whether or not the content can be reproduced by applying the information on the issue date of the encrypted content signature file.

(14) The information storage apparatus according to (13), wherein the encrypted content signature file includes an electronic signature for the information on the issue date, and wherein the reproduction apparatus which executes the processing for reading and reproducing the encrypted content from the storage unit is made to execute verification processing on the electronic signature of the encrypted content signature file and determine whether or not the content can be reproduced by applying the information on the issue date under a condition that the verification is successfully made.

Furthermore, a processing method implemented in the aforementioned apparatus and system and a program which causes the aforementioned apparatus and system to execute the processing are also included in the configurations of the present disclosure.

In addition the series of processing described herein can be executed by hardware, software, or a combined configuration of both. When the processing is executed by software, the program with a processing sequence recorded therein can be installed in a memory in a computer embedded in dedicated hardware and executed, or a program can be installed in a general computer which can execute various kinds of processing and executed. The program can be recorded in advance in a recording medium, for example. The program can not only be installed form the recording medium to the computer but also be received via a network such as a LAN (Local Area Network) or the Internet and installed in a recording medium such as built-in hard disk.

In addition, the various kinds of processing described herein may be executed in a time series manner in an order of the description or may be executed in parallel or individual manner depending on a processing capability of an apparatus which executes the processing depending on necessity. In addition, the system described herein is a logical complex configuration of a plurality of apparatuses, and apparatuses with various configurations are not necessarily provided in a same case body.

The present disclosure contains subject matter related to that disclosed in Japanese Priority Patent Application JP 2011-251733 filed in the Japan Patent Office on Nov. 17, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A first information processing apparatus, comprising: circuitry configured to:
receive, based on a first determination that an expiration date of an encrypted content signature issuer certificate is on or after time information associated with a second information processing apparatus, encrypted content from the second information processing apparatus;
compare the expiration date of the encrypted content signature issuer certificate recorded in the encrypted content signature issuer certificate with first information that indicates an issue date of an encrypted content signature file;
determine, based on the comparison and the encrypted content signature file that corresponds to the encrypted content to be reproduced, that the encrypted content is reproducible,
wherein the encrypted content signature file includes:
the first information that indicates the issue date of the encrypted content signature file, and
the encrypted content signature issuer certificate with a public key of an encrypted content signature issuer,
wherein the encrypted content signature issuer is configured to generate the encrypted content signature file,
refer, based on a second determination that the expiration date of the encrypted content signature issuer certificate is on or after the issue date of the encrypted content signature file, a revocation list corresponding to second information that indicates invalidation of the encrypted content signature issuer certificate;
obtain, based on the second determination that the expiration date of the encrypted content signature issuer certificate is on or after the issue date of the encrypted content signature file, and an identifier of the encrypted content signature issuer certificate is registered in the revocation list, an invalidated date of the encrypted content signature issuer certificate from the revocation list;
decode, based on a third determination that the issue date of the encrypted content signature file is before the invalidated date, the encrypted content; and
reproduce the decoded encrypted content.

2. The first information processing apparatus according to claim 1,
wherein the encrypted content signature file includes a hash value of the encrypted content and an electronic signature for data that includes key information to be applied to decode the encrypted content, and
wherein the circuitry is further configured to determine, based on a signature verification of the electronic signature, that the encrypted content is reproducible after confirmation of authentication of the encrypted content signature file.

3. The first information processing apparatus according to claim 1,
wherein an electronic signature of a license issuer is set in the encrypted content signature issuer certificate, and
wherein the circuitry is further configured to determine, based on a signature verification of the set electronic signature, that the encrypted content is reproducible confirmation of authentication of the encrypted after content signature issuer certificate.

4. The first information processing apparatus according to claim 1,
wherein the circuitry is further configured to:
obtain, based on the first determination that the expiration date of the encrypted content signature issuer certificate is on or after the issue date of the encrypted content signature file, and the identifier of the encrypted content signature issuer certificate is registered in the revocation list, the invalidated date of the encrypted content signature issuer certificate from the revocation list.

5. The first information processing apparatus according to claim 1,
wherein the time information is measured by a time clock included in the second information processing apparatus.

6. The first information processing apparatus according to claim 1,
wherein the time information is obtained from a time information providing server.

7. An information processing apparatus, comprising:
circuitry configured to:
  compare for a first result, an expiration date of an encrypted content signature issuer certificate recorded in the encrypted content signature issuer certificate with first information that indicates an issue date of an encrypted content signature file;
  determine, based on the compared first result and the encrypted content signature file that corresponds to the encrypted content, provision of encrypted content to a user device,
    wherein the encrypted content signature file includes:
      the first information that indicates the issue date of the encrypted content signature file, and
      the encrypted content signature issuer certificate with a public key of an encrypted content signature issuer, and
    wherein the encrypted content signature issuer is configured to generate the encrypted content signature file;
  compare for a second result, based on the compared first result that indicates the expiration date of the encrypted content signature issuer certificate is on or after the issue date of the encrypted content signature file, the expiration date of the encrypted content signature issuer certificate with time information associated with the information processing apparatus;
  compare for a third result, based on the compared second result that indicates the expiration date of the encrypted content signature issuer certificate is on or after the time information, the issue date of the encrypted content signature file with the time information;
  refer a revocation list corresponding to second information that indicates invalidation of the encrypted content signature issuer certificate;
  obtain, based on the compared first result that indicates the expiration date of the encrypted content signature issuer certificate is on or after the issue date of the encrypted content signature file, an invalidated date of the encrypted content signature issuer certificate from the revocation list; and
  provide the encrypted content to the user device, based on a determination that the issue date of the encrypted content signature file is before the invalidated date of the encrypted content signature issuer certificate and the compared third result that indicates the issue date of the encrypted content signature file is on or after the time information.

8. An information processing method, comprising:
in a first information processing apparatus:
  receiving, based on a first determination that an expiration date of an encrypted content signature issuer certificate is on or after time information associated with a second information processing apparatus, encrypted content from the second information processing apparatus;
  comparing the expiration date of the encrypted content signature issuer certificate recorded in the encrypted content signature issuer certificate with first information that indicates an issue date of an encrypted content signature file;
  determining, based on the comparison and the encrypted content signature file corresponding to the encrypted content to be reproduced, that the encrypted content is reproducible,
    wherein the encrypted content signature file includes:
      the first information that indicates the issue date of the encrypted content signature file, and
      the encrypted content signature issuer certificate with a public key of an encrypted content signature issuer,
    wherein the encrypted content signature issuer is configured to generate the encrypted content signature file;
  referring, based on a second determination that the expiration date of the encrypted content signature issuer certificate is on or after the issue date of the encrypted content signature file, a revocation list corresponding to second information that indicates invalidation of the encrypted content signature issuer certificate;
  obtaining, based on the second determination that the expiration date of the encrypted content signature issuer certificate is on or after the issue date of the encrypted content signature file, and an identifier of the encrypted content signature issuer certificate is registered in the revocation list, an invalidated date of the encrypted content signature issuer certificate from the revocation list;
  decoding, based on a third determination that the issue date of the encrypted content signature file is before the invalidated date, the encrypted content; and
  reproducing the decoded encrypted content.

9. An information processing method, comprising:
in an information processing apparatus:
  comparing for a first result, an expiration date of an encrypted content signature issuer certificate recorded in the encrypted content signature issuer certificate with first information that indicates an issue date of an encrypted content signature file;
  determining, based on the compared first result and the encrypted content signature file corresponding to the encrypted content, provision of encrypted content to a user device,
    wherein the encrypted content signature file includes:
      the first information that indicates the issue date of the encrypted content signature file, and
      the encrypted content signature issuer certificate with a public key of an encrypted content signature issuer, and
    wherein the encrypted content signature issuer is configured to generate the encrypted content signature file;
  comparing for a second result, based on the compared first result that indicates the expiration date of the encrypted content signature issuer certificate is on or after the issue date of the encrypted content signature file, the expiration date of the encrypted content signature issuer certificate with time information associated with the information processing apparatus;

comparing for a third result, based on the compared second result that indicates the expiration date of the encrypted content signature issuer certificate is on or after the time information, the issue date of the encrypted content signature file with the time information;

referring a revocation list corresponding to second information that indicates invalidation of the encrypted content signature issuer certificate;

obtaining, based on the compared first result that indicates the expiration date of the encrypted content signature issuer certificate is on or after the issue date of the encrypted content signature file, an invalidated date of the encrypted content signature issuer certificate from the revocation list; and providing the encrypted content to the user device, based on a determination that the issue date of the encrypted content signature file is before the invalidated date of the encrypted content signature issuer certificate and the compared third result that indicates the issue date of the encrypted content signature file is on or after the time information.

10. A non-transitory computer-readable medium having stored thereon, computer-executable instructions that, when executed by a processor, cause a first information processing apparatus to execute operations, the operations comprising:

receiving, based on a first determination that an expiration date of an encrypted content signature issuer certificate is on or after time information associated with a second information processing apparatus, encrypted content from the second information processing apparatus;

comparing the expiration date of the encrypted content signature issuer certificate recorded in the encrypted content signature issuer certificate with first information that indicates an issue date of an encrypted content signature file;

determining, based on the comparison and the encrypted content signature file corresponding to the encrypted content to be reproduced, that the encrypted content is reproducible, wherein the encrypted content signature file includes:
the first information that indicates the issue date of the encrypted content signature file, and
the encrypted content signature issuer certificate with a public key of an encrypted content signature issuer, and wherein the encrypted content signature issuer is configured to generate the encrypted content signature file;

referring, based on a second determination that the expiration date of the encrypted content signature issuer certificate is on or after the issue date of the encrypted content signature file, a revocation list corresponding to second information that indicates invalidation of the encrypted content signature issuer certificate;

obtaining, based on the second determination that the expiration date of the encrypted content signature issuer certificate is on or after the issue date of the encrypted content signature file, and an identifier of the encrypted content signature issuer certificate is registered in the revocation list, an invalidated date of the encrypted content signature issuer certificate from the revocation list;

decoding, based on a third determination that the issue date of the encrypted content signature file is before the invalidated date, the encrypted content; and reproducing the decoded encrypted content.

11. A non-transitory computer-readable medium having stored thereon, computer-executable instructions that, when executed by a processor, cause an information processing apparatus to execute operations, the operations comprising:

comparing for a first result, an expiration date of an encrypted content signature issuer certificate recorded in the encrypted content signature issuer certificate with first information that indicates an issue date of an encrypted content signature file;

determining, based on the compared first result and the encrypted content signature file corresponding to the encrypted content, provision of encrypted content to a user device, wherein the encrypted content signature file includes:
the first information that indicates the issue date of the encrypted content signature file, and
the encrypted content signature issuer certificate with a public key of an encrypted content signature issuer, and wherein the encrypted content signature issuer is configured to generate the encrypted content signature file, comparing for a second result, based on the compared first result that indicates the expiration date of the encrypted content signature issuer certificate is on or after the issue date of the encrypted content signature file, the expiration date of the encrypted content signature issuer certificate with time information associated with the information processing apparatus;

comparing for a third result, based on the compared second result that indicates the expiration date of the encrypted content signature issuer certificate is on or after the time information, the issue date of the encrypted content signature file with the time information;

referring a revocation list corresponding to second information that indicates invalidation of the encrypted content signature issuer certificate;

obtaining, based on the compared first result that indicates the expiration date of the encrypted content signature issuer certificate is on or after the issue date of the encrypted content signature file, an invalidated date of the encrypted content signature issuer certificate from the revocation list; and providing the encrypted content to the user device, based on a determination that the issue date of the encrypted content signature file is before the invalidated date of the encrypted content signature issuer certificate and the compared third result that indicates the issue date of the encrypted content signature file is on or after the time information.

* * * * *